US009176605B2

(12) United States Patent
Yoshida

(10) Patent No.: US 9,176,605 B2
(45) Date of Patent: Nov. 3, 2015

(54) INPUT-OUTPUT DEVICE AND INFORMATION INPUT-OUTPUT SYSTEM

(76) Inventor: Kenji Yoshida, Tokyo (JP)

( * ) Notice: Subject to any disclaimer, the term of this patent is extended or adjusted under 35 U.S.C. 154(b) by 11 days.

(21) Appl. No.: 13/575,344

(22) PCT Filed: Jan. 28, 2011

(86) PCT No.: PCT/JP2011/051774
§ 371 (c)(1),
(2), (4) Date: Sep. 25, 2012

(87) PCT Pub. No.: WO2011/093458
PCT Pub. Date: Aug. 4, 2011

(65) Prior Publication Data
US 2013/0011065 A1    Jan. 10, 2013

(30) Foreign Application Priority Data

Jan. 28, 2010  (JP) .................................. 2010-017459
Jul. 13, 2010  (JP) .................................. 2010-159160

(51) Int. Cl.
  *G06K 9/00*   (2006.01)
  *G06F 3/0354*   (2013.01)
  *G06F 3/03*   (2006.01)

(52) U.S. Cl.
  CPC .......... *G06F 3/03545* (2013.01); *G06F 3/0304* (2013.01); *G06F 3/0317* (2013.01)

(58) Field of Classification Search
  CPC ... G06K 9/00; G06K 9/2054; G06K 2209/01; G06K 9/00469; G06K 9/222; G06F 3/04883
  USPC .................................. 382/181–187; 235/375
  See application file for complete search history.

(56) References Cited

U.S. PATENT DOCUMENTS

| | | |
|---|---|---|
| 2002/0104884 A1 | 8/2002 | Meier |
| 2004/0136083 A1 | 7/2004 | Wang |
| 2004/0206821 A1 | 10/2004 | Longacre |
| 2006/0154559 A1 | 7/2006 | Yoshida |
| 2009/0091530 A1 | 4/2009 | Yoshida |

FOREIGN PATENT DOCUMENTS

| | | |
|---|---|---|
| JP | 2006-190270 A | 7/2006 |
| JP | 2008-152746 A | 7/2008 |
| JP | 2009-181182 A | 8/2009 |
| WO | WO2008-156222 A1 | 12/2008 |

OTHER PUBLICATIONS

Int'l Search Report, Aug. 9, 2011, Yoshida.
Supplementary European Search Report completed on Jul. 2, 2014; and European Search Opinion dated Oct. 7, 2014 corresponding to European Application No. 11737168.2-1972-2530563, PCT/JP/2011051774.

*Primary Examiner* — Ruiping Li
(74) *Attorney, Agent, or Firm* — Duane Morris LLP

(57) ABSTRACT

The technical subject is realizing a highly useful input-output device which can be used alone to independently input and output information, and, when connected with an information processing device, can function as an input device that depends on the applications of the information processing device. The input-output device comprises: a function of recognizing whether a connection with the information processing device through a connection unit is present by the connection recognition unit and transmitting a code value and/or a coordinate value converted by a processing unit to the information processing device through the connection unit; and a function of outputting the content data from the output unit or controlling operation based on the operation instruction when the connection recognition unit does not recognise a connection between the connection unit and the information processing device. The provided functions make the disclosed input-output device highly useful.

46 Claims, 45 Drawing Sheets

FIG. 2A

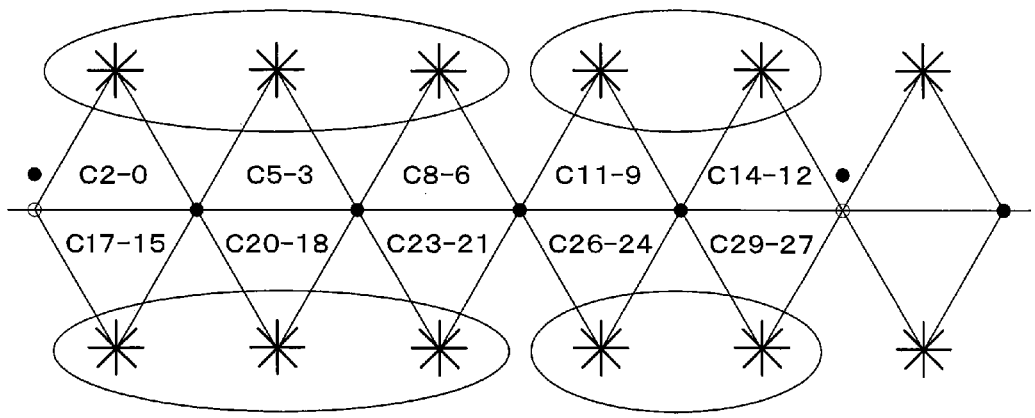

FIG. 2B

| c29 c28 | c27 c26 c25 c24 c23 c22 c21 c20 | c19 c18 c17 c16 c15 c14 c13 c12 | c11 c10 c9 c8 c7 c6 c5 c4 c3 c2 c1 c0 |
|---|---|---|---|
| PARITY | Z COORDINATE VALUE | Y COORDINATE VALUE | X COORDINATE VALUE |

| c29 c28 | c27 c26 c25 c24 | c23 c22 c21 c20 c19 c18 c17 c16 | c15 c14 c13 c12 c11 c10 c9 c8 | c7 c6 c5 c4 c3 c2 c1 c0 |
|---|---|---|---|---|
| PARITY | CODE VALUE | Z COORDINATE VALUE | Y COORDINATE VALUE | X COORDINATE VALUE |

| c29 c28 | c27 c26 c25 c24 | c23 c22 c21 c20 c19 c18 c17 c16 c15 c14 c13 c12 | c11 c10 c9 c8 c7 c6 c5 c4 c3 c2 c1 c0 |
|---|---|---|---|
| PARITY | CODE VALUE | Y COORDINATE VALUE | X COORDINATE VALUE |

| c29 c28 | c27 c26 c25 c24 c23 c22 c21 c20 c19 c18 c17 c16 c15 c14 c13 c12 c11 c10 c9 c8 c7 c6 c5 c4 c3 c2 c1 c0 |
|---|---|
| PARITY | CODE VALUE |

| c29 c28 | c27 c26 c25 c24 c23 c22 c21 c20 c19 c18 c17 c16 c15 c14 | c13 c12 c11 c10 c9 c8 c7 c6 c5 c4 c3 c2 c1 c0 |
|---|---|---|
| PARITY | Y COORDINATE VALUE | X COORDINATE VALUE |

| c29 c28 | c27 c26 c25 c24 c23 c22 | c21 c20 c19 c18 c17 c16 c15 | c14 c13 c12 c11 c10 c9 c8 c7 | c6 c5 c4 c3 c2 c1 c0 |
|---|---|---|---|---|
| PARITY | CODE VALUE | CODE VALUE | CODE VALUE | CODE VALUE |

FIG. 3A

| X COORDINATE VALUE | |
|---|---|
| Y COORDINATE VALUE | AUDIO DATA A |
| Z COORDINATE VALUE | |

FIG. 3B

| CODE VALUE | |
|---|---|
| X COORDINATE VALUE | AUDIO DATA B |
| Y COORDINATE VALUE | |

FIG. 3C

| CODE VALUE | STARTING AUDIO INPUT |
|---|---|

FIG. 3D

| CODE VALUE | |
|---|---|
| X COORDINATE VALUE | MOTION PICTURE DATA D |

FIG. 3E

| CODE VALUE | |
|---|---|
| X COORDINATE VALUE | |
| Y COORDINATE VALUE | TEXT DATA E |
| Z COORDINATE VALUE | |

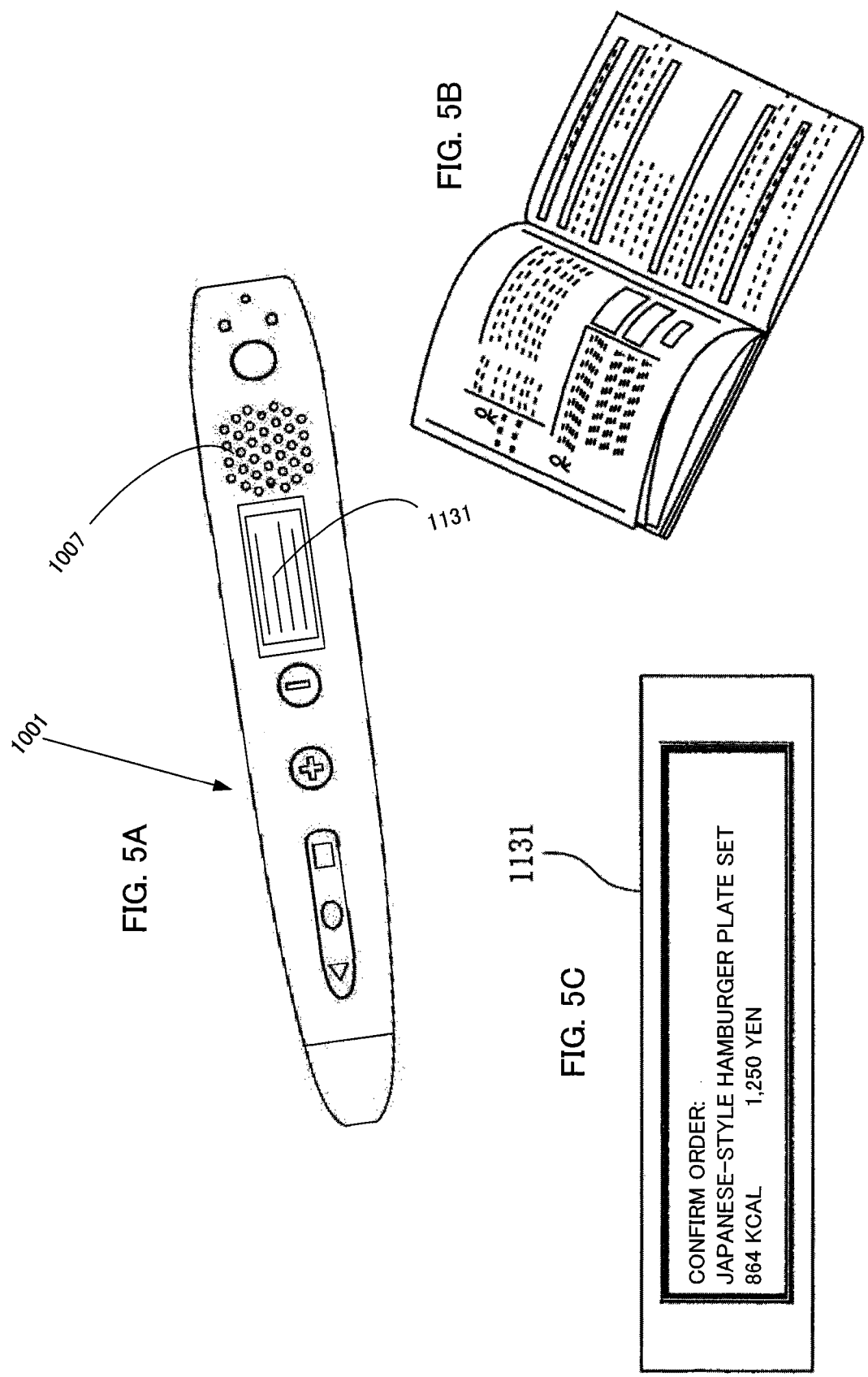

WIRELESS TYPE

| LINK TABLE ||
| CODE VALUE | FILE NAME (OR ADDRESS) |
|---|---|
| 559 | ■■■■■■■■ |
| 560 | B-1 |
| | B-2 |
| | B-3 |
| | B-4 |
| 561 | ■■■■■■■■ |

| CONTENT FILE ||
| FILE NAME (OR ADDRESS) | CONTENT DATA |
|---|---|
| B-1 | Good morning. (AUDIO DATA) |
| B-2 | How are you? (AUDIO DATA) |
| B-3 | I'm fine. Thank you. (AUDIO DATA) |
| B-4 | And you? (AUDIO DATA) |
| ■■■ | ■■■■■■■■■■■ |

FIG. 17A

| C31 | C30 | C29 | C28 | C27 | C26 | C25 | C24 | C23 | C22 | C21 | C20 | C19 | C18 | C17 | C16 | C15 | C14 | C13 | C12 | C11 | C10 | C9 | C8 | C7 | C6 | C5 | C4 | C3 | C2 | C1 | C0 |
|---|---|---|---|---|---|---|---|---|---|---|---|---|---|---|---|---|---|---|---|---|---|---|---|---|---|---|---|---|---|---|---|
| | | | | | | | | | | | | | | | 560 | | | | | | | | | | | | | | | | |

PARITY      CODE VALUE

| C31 | C30 | C29 | C28 | C27 | C26 | C25 | C24 | C23 | C22 | C21 | C20 | C19 | C18 | C17 | C16 | C15 | C14 | C13 | C12 | C11 | C10 | C9 | C8 | C7 | C6 | C5 | C4 | C3 | C2 | C1 | C0 |
|---|---|---|---|---|---|---|---|---|---|---|---|---|---|---|---|---|---|---|---|---|---|---|---|---|---|---|---|---|---|---|---|
| | | | | | | | | | | | | | | | 572 | | | | | | | | | | | | | | | | |

PARITY      CODE VALUE

| C31 | C30 | C29 | C28 | C27 | C26 | C25 | C24 | C23 | C22 | C21 | C20 | C19 | C18 | C17 | C16 | C15 | C14 | C13 | C12 | C11 | C10 | C9 | C8 | C7 | C6 | C5 | C4 | C3 | C2 | C1 | C0 |
|---|---|---|---|---|---|---|---|---|---|---|---|---|---|---|---|---|---|---|---|---|---|---|---|---|---|---|---|---|---|---|---|
| | | | | | | | | | | | | | | | 583 | | | | | | | | | | | | | | | | |

PARITY      CODE VALUE

FIG. 17B

DOT CODE-LINKING TABLE

| ... | ... |
|---|---|
| 560 | — |
| 572 | 583 |
| 583 | 560 |
| ... | ... |
| ... | ... |

FIG. 18 A

| LINK TABLE | |
|---|---|
| CODE VALUE | FILE NAME (OR ADDRESS) |
| 560 | B−2 |
| 572 | B−3 |
| 583 | B−1 |
| | |

CONTENT FILE NAME (PREVIOUS)  CONTENT FILE NAME (NEXT)

| CONTENT FILE | | |
|---|---|---|
| FILE NAME (OR ADDRESS) | | CONTENT DATA |
| B−1 | — | Good morning. |
| | B−2 | |
| B−2 | B−1 | How are you? |
| | B−3 | |
| B−3 | B−2 | I'm fine. Thank you. |
| | — | |

FIG. 18B

| LINK TABLE | |
|---|---|
| CODE VALUE | FILE NAME (OR ADDRESS) |
| 560 | B−2 |
| 572 | B−3 |
| 583 | B−1 |
| | |

CONTENT FILE NAME (PREVIOUS)  CONTENT FILE NAME (NEXT)

| CONTENT FILE | | |
|---|---|---|
| FILE NAME (OR ADDRESS) | | CONTENT DATA |
| B−1 | — | Good morning. |
| | ② | |
| B−2 | ① | How are you? |
| | ③ | |
| B−3 | ② | I'm fine. Thank you. |
| | — | |

| INDEX TABLE | |
|---|---|
| INDEX | FILE NAME (OR ADDRESS) |
| ① | B−1 |
| ② | B−2 |
| ③ | B−3 |
| | |

FIG. 19

⟨CONTINUOUS OUTPUT RANGE 200-203⟩

| LINK TABLE | |
|---|---|
| CODE VALUE | FILE NAME (OR ADDRESS) |
| ... | ... |
| 200 | B-1 |
| 201 | B-2 |
| 202 | B-3 |
| 203 | B-4 |
| ... | ... |

| CONTENT FILE | |
|---|---|
| FILE NAME (OR ADDRESS) | CONTENT DATA |
| ... | ... ... |
| B-1 | Good morning. (AUDIO CONTENT) |
| B-2 | How are you? (AUDIO CONTENT) |
| B-3 | I'm fine. Thank you. (AUDIO CONTENT) |
| B-4 | And you? (AUDIO CONTENT) |
| ... | ... ... |

FIG. 20

| LINK TABLE | |
|---|---|
| CODE VALUE | FILE NAME (OR ADDRESS) |
| ... | ..... |
| 556 | C-1 |
| 557 | A-3 |
| 558 | A-6 |
| 559 | A-4 |
| 560 | A-1 |
| 561 | B-3 |
| 564 | A-2 |
| 572 | A-5 |
| 573 | B-1 |
| 583 | B-2 |
| ... | ..... |

| CONTENT FILE | |
|---|---|
| FILE NAME (OR ADDRESS) | CONTENT DATA |
| ... | ..... ... |
| A-1 | How are you ? (AUDIO CONTENT) |
| A-2 | Http://www. ********** .co.jp/ |
| A-3 | INCREASE AUDIO VOLUME |
| A-4 | DECREASE AUDIO VOLUME |
| A-5 | I' m fine. Thank you. (AUDIO CONTENT) |
| A-6 | MOTION PICTURE CONTENT |
| B-1 | TEXT CONTENT |
| B-2 | And you ? (AUDIO CONTENT) |
| B-3 | Http://www. ********** .co.jp/ |
| C-1 | Good morning. (AUDIO CONTENT) |
| ... | ......... |

FIG. 21 A

| CONTENT FILE | |
|---|---|
| FILE NAME (ADDRESS) | CONTENT DATA |
| ... | ... |
| A-1 | Good morning. |
| A-2 | How are you ? |
| A-3 | I' m fine. Thank you. |
| A-4 | And you ? |
| ... | ... |

| LINK TABLE | |
|---|---|
| CODE VALUE | FILE NAME (ADDRESS) |
| ... | ... |
| 556 | (REGISTERING SPACE) |
| 560 | (REGISTERING SPACE) |
| 572 | (REGISTERING SPACE) |
| 580 | (REGISTERING SPACE) |
| ... | ... |

⇨

| LINK TABLE | |
|---|---|
| CODE VALUE | FILE NAME (ADDRESS) |
| ... | ... |
| 556 | A-1 |
| 560 | A-2 |
| 572 | A-3 |
| 580 | A-4 |
| ... | ... |

FIG. 21B

| CONTENT FILE | |
|---|---|
| FILE NAME (ADDRESS) | CONTENT DATA |
| ... | ... |
| A-1 | Good morning. |
| A-2 | How are you ? |
| A-3 | I' m fine. Thank you. |
| A-4 | And you ? |
| ... | ... |

| LINK TABLE | |
|---|---|
| CODE VALUE | FILE NAME (ADDRESS) |
| ... | ... |
| 556 | A-1 |
| 560 | A-2 |
| 572 | A-3 |
| ... | ... |

⇨

| LINK TABLE | |
|---|---|
| CODE VALUE | FILE NAME (ADDRESS) |
| ... | ... |
| 556 | A-1 |
| 560 | A-2 |
| 572 | A-3 |
| | A-4 |
| ... | ... |

FIG. 24A
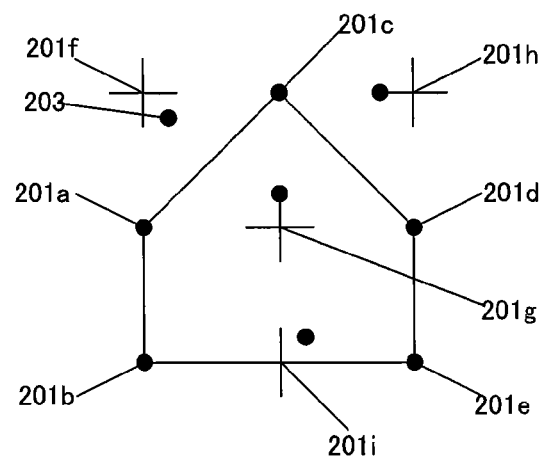
FIG. 24B　　NO INFORMATION DOT EXITS
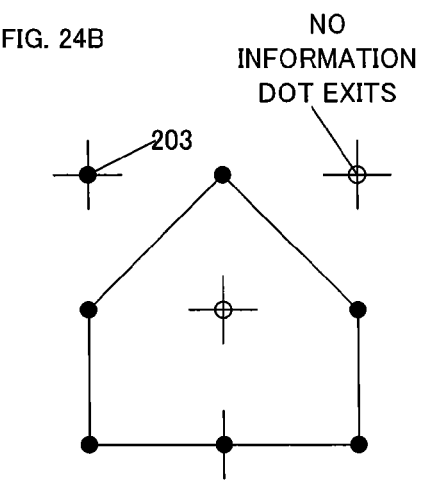
FIG. 24C
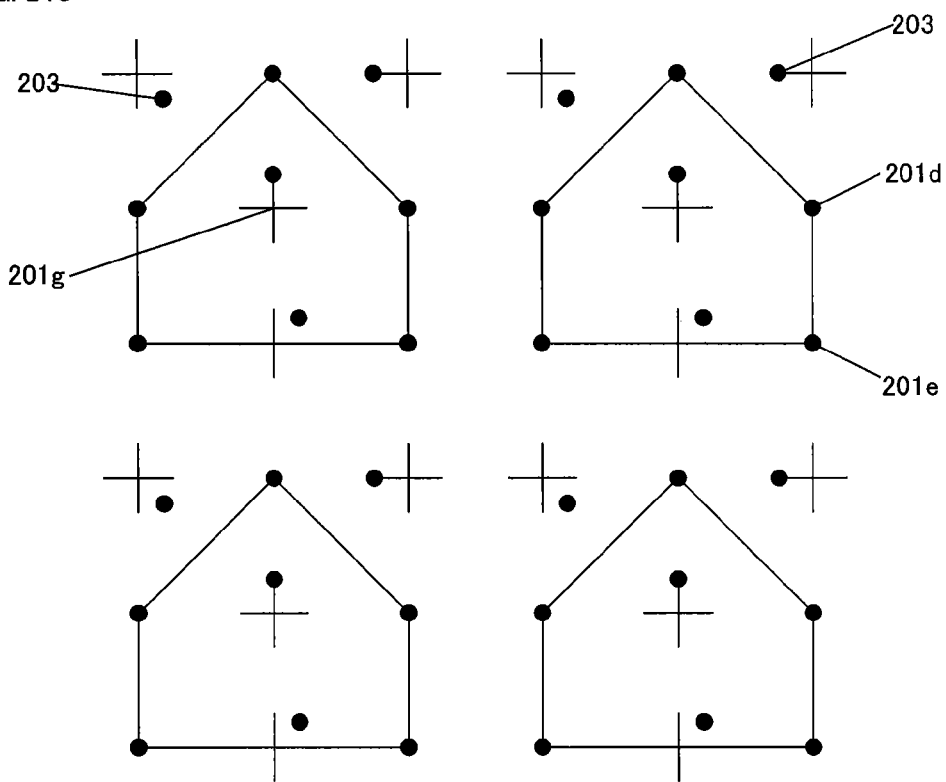

FIG. 27

| $C_{31}$ | $C_{30}$ | $C_{29}$ | $C_{28}$ | $C_{27}$ | $C_{26}$ | $C_{25}$ | $C_{24}$ | $C_{23}$ | $C_{22}$ | $C_{21}$ | $C_{20}$ | $C_{19}$ | $C_{18}$ | $C_{17}$ | $C_{16}$ | $C_{15}$ | $C_{14}$ | $C_{13}$ | $C_{12}$ | $C_{11}$ | $C_{10}$ | $C_9$ | $C_8$ | $C_7$ | $C_6$ | $C_5$ | $C_4$ | $C_3$ | $C_2$ | $C_1$ | $C_0$ |
|---|---|---|---|---|---|---|---|---|---|---|---|---|---|---|---|---|---|---|---|---|---|---|---|---|---|---|---|---|---|---|---|
| PARITY | | OPERATION DETERMINATION CODE | | | | CODE VALUE | | | | | | | | | | Y COORDINATE | | | | | | | | X COORDINATE | | | | | | | |

FIG. 30

| $C_{31}$ | $C_{30}$ | $C_{29}$ | $C_{28}$ | $C_{27}$ | $C_{26}$ | $C_{25}$ | $C_{24}$ | $C_{23}$ | $C_{22}$ | $C_{21}$ | $C_{20}$ | $C_{19}$ | $C_{18}$ | $C_{17}$ | $C_{16}$ | $C_{15}$ | $C_{14}$ | $C_{13}$ | $C_{12}$ | $C_{11}$ | $C_{10}$ | $C_9$ | $C_8$ | $C_7$ | $C_6$ | $C_5$ | $C_4$ | $C_3$ | $C_2$ | $C_1$ | $C_0$ |
|---|---|---|---|---|---|---|---|---|---|---|---|---|---|---|---|---|---|---|---|---|---|---|---|---|---|---|---|---|---|---|---|
| PARITY | | WRITING AREA IDENTIFICATION CODE | | | | | CODE VALUE | | | | | | | | | Y COORDINATE | | | | | | | | | X COORDINATE | | | | | |

FIG. 43

⑥ WHEN CONTENTS ARE DOWNLOADED, DOT CODE MANAGEMENT TABLE
TO START CONTENTS IS DOWNLOADED TOGETHER WITH CONTENTS AND IS
ADDED TO DOT CODE MANAGEMENT TABLE ALREADY PRESENT ON PC.
THEREAFTER, WHEN REGISTERED DOT CODE IS READ BY TOUCHING PAPER SHEET
BY eSCANNER, IT IS PROCESSED IN PC AND CORRESPONDING CONTENTS
ARE STARTED.

⑦ WHEN INTERNET SHOPPING OR PAID CONTENT IS USED, VARIOUS SERVICES
CAN BE EXECUTED WHILE BILLING. BY AUTHENTICATING DOT CODE PRINTED
ON PLASTIC ID AT 2 BY DOT CODE MANAGING SERVER REGISTERED
WITH PERSONAL INFORMATION, AND BY INPUTTING PASSWORD.

AS DESCRIBED, IF GAM IS INSTALLED IN PC, NEWSPAPER OR MAGAZINE, FREE PAPER, CATALOG,
ADVERTISEMENT, AND VARIOUS DM ARE DELIVERED TO COMPANIES AND INDIVIDUALS.
JUST BY TOUCHING PLASTIC TAG AND PAPER SHEET, DOT CODE IS VERIFIED SO THAT
CONTENTS ARE BROWSED THROUGH INTERNET, AND VARIOUS MEMBERSHIP SERVICES SUCH AS
SHOPPING AND PAID CONTENTS CAN BE RECEIVED.
FURTHER, TAG ID ENABLES ANALYZING ALL LOGS INDICATING WHO ACCESSED WHAT AT WHAT TIME,
AND IT CAN BE APPLIED TO STRATEGIC INTERNET MARKETING.

○ ADVANTAGES OF GridOnput (TM)

1. NO LOSS OF PRINT DESIGN!

BECAUSE DOTS CAN BE PRINTED ANYWHERE ON GRAPHICS SUCH AS PHOTOGRAPH AND
   ILLUSTRATION OR TEXT WITH INVISIBLE STEALTH INK, FIRST PRIORITY CAN BE GIVEN
   TO DESIGN UNLIKE CONVENTIONAL BARCODE OR QR CODE.

2. INTUITIVE INTERFACE!

BY ARRANGING ONE DOT CODE IN EACH 2MM SQUARE, DOTS ARE REPEATEDLY
   PRINTED ON GRAPHICS OR TEXT. THEREFORE, DOT CODE CAN BE READ
   BY TOUCHING ANYWHERE IN ARBITRARY AREA, AND ENABLES EASY USE EVEN
   BY CHILDREN, ELDERLY, OR PHYSICALLY DISABLED PERSONS.

3. STRONG SECURITY!

ALL DOT CODES ISSUED FOR CUSTOMERS ARE UNIQUE CODES, AND SUCH INK THAT
   REACTS IN INFRARED REGION TO PREVENT COPY IS USED.
   THEREFORE, HIGH LEVEL SECURITY IS ACHIEVED.

4. HARMONY OF PAPER WITH INTERNET
   ADVANTAGE OF PUSH-TYPE PAPER MEDIUM THAT IS LIGHT AND HAS HIGH
   VIEWABILITY AND HIGH STORAGE STABILITY AND ADVANTAGE OF INTERNET
   THAT ENABLES SEARCHING AND DISTRIBUTING ENORMOUS AND LATEST
   MULTIMEDIA INFORMATION AND MAKING ORDERS FOR GOODS AND SERVICES ON
   SITE ARE HARMONIZED.

INPUT-OUTPUT DEVICE AND INFORMATION INPUT-OUTPUT SYSTEM

CROSS REFERENCE TO RELATED APPLICATIONS

The present application is a U.S. national stage application under 35 U.S.C. §371 of International Patent Application No. PCT/JP2011/051774, filed Jan. 23, 2011, which claims priority to JP 2010-017459 filed on Jan. 28, 2010, and JP 2010-159160 filed on Jul. 13, 2010, the entirety of which in incorporated by reference herein.

FIELD OF THE INVENTION

The present invention relates to an input-output device and an information input-output system that use a dot pattern, which, by optically reading dot pattern information formed on a medium, allows input and output of a variety of information corresponding to the dot pattern.

BACKGROUND OF THE INVENTION

Conventionally, in order to input and output a lot of information and programs, there has been proposed a method for inputting and outputting information, in which: a dot pattern in which fine dots are two-dimensionally arranged according to a predetermined rule is formed by printing, instead of a barcode, on a medium surface; those dots are captured and retrieved as image data by an optical reading device and digitized; and, information, such as a sound, is output.

For example, there has been proposed a method that registers information corresponding to given code information and X and Y coordinates to a storage unit in advance (for example, content data such as a sound of a text and the like visually printed on an area where a dot pattern is formed), and outputs a variety of information or executes programs by searching based on the code information and X and Y coordinates that are read out by the optical reading unit (WO2004/084125, WO2004/029871).

SUMMARY OF THE INVENTION

Problems that the Invention is to Solve

However, the reading device related to the dot pattern technique proposed by the same inventor (WO2004/084125, WO2004/029871), has only either of functions: as an input device that depends on an application of an information processing device in a state in which the reading device is connected with the information processing device; or as a speaking pen that, for example, reproduces a sound corresponding to code information and X and Y coordinates when used alone. For this reason, there has been a problem in which the dot pattern technique cannot be utilized in a convenient way, such as information is input and output only by the reading device when the reading device cannot be connected with an information processing device, and code information and X and Y coordinates are transmitted to the information processing device when the reading device is connected with the information processing device to output from the information processing device or independent output means with high processing rate (for example, viewing or outputting by printing of a high resolution video image, and outputting through the Internet).

The present invention is devised in consideration of the above point, and aims as a technical target to realize a dot pattern technique that caters to the state of using the input-output device, in which the input-output device is used alone (for example, as a voice recorder or a digital camera) when not connected with an information processing device, or, as an input device, transmits a code value and/or a coordinate value or an operation instruction to the information processing device based on a predetermined condition when connected with the information processing device, and outputs corresponding information.

Means to Solve the Problems

The input-output device of the present invention comprises: a storage unit that registers a link table that associates and registers a code value and/or a coordinate value with content data and/or an operation instruction and the content data and/or operation instruction; an optical reading unit that reads a dot pattern formed on a medium surface; a processing unit that analyzes the dot pattern from image information of the dot pattern read by the optical reading unit and converts into a code value and/or a coordinate value; a connection unit that wiredly or wirelessly connects an information processing device; a connection recognition unit that recognizes whether or not a connection with the information processing device exists; an output unit that outputs by retrieving, from the storage unit, the content data that is associated with the code value and/or coordinate value converted by the processing unit after reading the dot pattern by the optical reading unit; and a control unit that controls operation of the optical reading unit, the processing unit, the connection unit, the connection recognition unit, and the output unit and/or operation based on the operation instruction, wherein the control unit switches operation based on whether or not the connection recognition unit recognizes a connection between the connection unit and the information processing device, when the connection recognition unit recognizes a connection between the connection unit and the information processing device, the control unit transmits the code value and/or coordinate value converted by the processing unit or the operation instruction that is associated and registered with the code value and/or coordinate value through the connection unit to the information processing device, and, when the connection recognition unit does not recognize a connection between the connection unit and the information processing device, the control unit outputs the content data via the output unit, or controls operation based on the operation instruction.

In this way, there can be realized a highly convenient input-output device that enables independently inputting and outputting information when the input-output device is used alone, while, when connected with an information processing device (including a personal computer, a PDA, a mobile telephone and the like; the same applies hereinafter), functioning as an input device that depends on software of the information processing device.

Also, even when a code value and/or a coordinate value or an operation instruction are transmitted to the information processing device, the input-output device by itself can also output content data, such as sounds, light, texts, and graphics, depending on the application. Further, the information processing device that receives a code value and/or a coordinate value or an operation instruction can also control the input-output device by transmitting control information to the input-output device. For the connection, in addition to wired means such as a conventional USB connection, wireless communications, such as infrared communications, BLUETOOTH (registered trademark), ZigBee, and weak radio waves, can also be used.

It should be noted that, even if the connection unit and the information processing device are physically connected (connected with wires) or waiting for a connection, the control unit does not switch the operation when the connection recognition unit does not recognize the connection or the input-output device and/or information processing device do not request for a connection or reject the connection.

Also, in the input-output device according to the first aspect of the invention, when the connection recognition unit recognizes a connection between the connection unit and the information processing device, the control unit switches operation, based on the operation instruction registered in the link table by being associated with the code value and/or coordinate value converted by the processing unit, among: transmitting the code value and/or coordinate value converted by the processing unit to the information processing device through the connection unit; outputting the content data from the output unit; and controlling operation based on the operation instruction.

In this way, the input-output device can switch operation by an operation instruction that is associated with a code value and/or a coordinate value.

Thus, as processing of the input-output device are switched by reading a dot pattern instead of operation of a button provided on the input-output device, an advantage in production is created eliminating a need for making a button for switching processing. That is, by providing data that records an operation instruction for switching processing on WEB, and delivering a manual and a paper controller for easy switching, it is possible to provide a set of input-output device that allows switching of a variety of processing without producing and selling a new input-output device with additional buttons.

As a specific example, it is possible that, while listening to an audio explanation using a printed medium adapted for a speaking pen (which alone reproduces sounds), such as an educational material or a how-to book, operation of the input-output device is switched by reading a WEB icon on the paper surface of the paper controller, then, a dot pattern superimposingly printed on a URL on the printed medium is read, and a code value and/or a coordinate value that is automatically converted from the dot code is transmitted to the information processing device to access a corresponding WEB site. It will be appreciated that the WEB icon may be provided on the printed medium surface instead of using a paper controller.

It should be noted that the dot code is information of an information dot that is defined by a distance and a direction from a virtual reference point, that is, a series of binary numbers that are allocated for defining a code value and/or a coordinate value and a parity check.

Further, a dot pattern may be read from a URL on the printed medium surface, the converted code value and/or coordinate value may be associated with an operation instruction for switching, and the converted code value and/or coordinate value may be transmitted to the information processing device while switching operation of the input-output device. In this way, an icon dedicated for switching is not necessarily provided. To end the switching, an icon for switching or ending switching may be used to switch to the standalone speaking pen, or a dot pattern on a printed medium adapted for the speaking pen (for reproducing sounds) may be read for automatic switching.

Also, older and younger persons with a difficulty of conducting processing using buttons can easily perform operation as the processing of the input-output device can be switched while recognizing by seeing user-friendly descriptions by visual information such as pictures or icons formed on the predetermined medium surface.

Also, in the input-output device according to the first aspect of the invention, when the connection recognition unit recognizes a connection between the connection unit and the information processing device, the control unit switches operation based on whether or not the code value and/or coordinate value converted by the processing unit is associated and registered with the content data and/or the operation instruction in the link table, if registered, outputs the content data from the output unit or controls operation based on the operation instruction, and, if not registered, transmits the code value and/or coordinate value converted by the processing unit to the information processing device through the connection unit.

In this way, a function as an input-output device that can be used alone and a function as an input-output device that depends on the application of a PC side can be switched in a variety of methods and conditions, which is the feature of the invention, and, thus, the operation can be performed even when the link table does not associate and register a code value with content data.

In this way, it is possible that, when connected with the information processing device, the input-output device alone inputs and outputs information if there is no need to transmit an operation instruction for outputting a code value and/or a coordinate value or content data corresponding thereto to the information processing device, and, if a code value and/or a coordinate value are not registered in the link table by being associated with the content data and/or the operation instruction, the code value and/or coordinate value are transmitted to the information processing device and a link table is referred to in the information processing device to output a content or access a WEB site. In addition, at the same time, the link table and/or the content data can be downloaded from the information processing device to the storage unit of the input-output device to output from the input-output device. The instruction of downloading may be automatically performed, or a message indicating if downloading is possible may be output from the input-output device or the information processing device, and downloading may be performed by operation of an enter/cancel button or a download button provided on the input-output device, or by reading an enter/cancel icon or a download icon.

It will be appreciated that, when the storage unit of the input-output device does not register the link table but register content data itself, only the table of the information processing device may be referred to and the input-output device may output corresponding content data. It should be noted that content data that is registered in the storage unit of the information processing device may be output not only from the output unit of the information processing device or the input-output device but also from other output units that are connected with the information processing device.

Also, in the input-output device according to the first aspect of the invention, when the connection recognition unit recognizes a connection between the connection unit and the information processing device, the control unit switches operation based on whether or not the storage unit registers content data that is associated and registered with the code value and/or coordinate value in the link table, if the content data is registered, outputs the content data from the output unit, and, if the content data is not registered, transmits the operation instruction for outputting the code value and/or coordinate value converted by the processing unit or for outputting the content data to the information processing device through the connection unit to output the content data registered in the storage unit of the information processing device.

In this way, when connected with an information processing device, only the input-output device may input and output information if there is no need to transmit an operation instruction for outputting a code value and/or a coordinate value or content data corresponding thereto, and, if the content data is associated and registered in the link table but the amount of the content data is large and cannot be registered in the storage unit of the input-output device, the content of the data varies, or the content data itself is deleted from the input-output device, the operation instruction may be transmitted to the information processing device to output the content from the information processing device. At this time, the content data can be downloaded from the information processing device to the storage unit of the input-output device to output from the input-output device.

The instruction of downloading may be automatically performed, or a message indicating if downloading is possible may be output from the input-output device or the information processing device or the instruction of downloading may be performed by operation of an enter/cancel button or a download button provided on the input-output device, or by reading an enter/cancel icon or an download icon. According to the invention, as the processing is automatically performed, there can be provided an advantage in which the number of connections with the information processing device can be minimized as well as the storage unit of the information processing device side that can register enormous content data can be effectively used.

It should be noted that not only the output unit provided on the input-output device or the information processing device but also other output units connected with the information processing device may be used to output content data registered in the storage unit of the information processing device.

Also, in the input-output device according to the first aspect of the invention, the input-output device further comprises a link button, the control unit, when at least one predetermined dot pattern is read by the optical reading unit by operating the link button, associates the code value and/or coordinate value converted by the processing unit with the predetermined content data, and registers association between the code value and/or coordinate value and the content data to the link table of the storage unit, and, when the predetermined dot pattern is read once again by the optical reading unit, the control unit refers to the link table, retrieves the corresponding content data from the storage unit, and outputs through the output unit.

In such a case, when the content data has already been associated and registered with other dot pattern, a new link table may be created to register the association so that the same content can be output from a plurality of dot patterns. Alternatively, the association may be registered by overwriting the existing link table so that the content data can be output only from the most recently read dot pattern.

In this way, content data can be associated at a flexible position tailored to a demand of the user of the input-output device, enabling defining a variety of information including sound information in any medium such as organizers, story telling picture books, English conversation learning materials, and stickers/cards.

Also, it is possible that, if a dot pattern is read, while operating a link button, in an area where new content data is not supposed to be linked, attention is called by a predetermined method such as an alarm, a voice, light, and a text, based on a code value and/or a coordinate value defined in the predetermined range of the dot code or the operation is processed as an error. Further, a plurality pieces of content data may be linked to a code value or a coordinate value, and content data as an output subject may be selected from the plurality pieces of content data and output in a predetermined order.

Here, "a predetermined dot pattern" is a dot pattern to be associated and registered with content data in a link mode by a user. Superimposingly printing a text, a figure and the like that indicates the dot pattern to the user can enhance user-friendliness and usability. It should be noted that, when linking content data that is selected with a predetermined method after or during outputting the content data, a predetermined dot pattern may be read by the optical reading unit after pressing and releasing the link button or while pressing the link button.

Also, in the input-output device according to the first aspect of the invention, when a dot pattern for linking that is formed in a predetermined area on a medium surface is read by the optical reading unit, the control unit, based on an operation instruction associated and registered with the code value and/or coordinate value converted by the processing unit, switches operation for associating and registering the code value and/or coordinate value corresponding to a predetermined dot pattern with the content data, when the predetermined dot pattern is read after reading the dot pattern for linking, the control unit associates the code value and/or coordinate value converted by the processing unit with the predetermined content data, and registers association between the code value and/or coordinate value and the content data to the link table of the storage unit, and, when the predetermined dot pattern is read once again by the optical reading unit, the control unit refers to the link table, retrieves the corresponding content data from the storage unit, and outputs through the output unit.

Here, "a dot pattern for linking" is a dot pattern provided to link, by a user, a predetermined dot pattern with content data on a medium surface on which dot patterns are formed by printing, and, in most of the case, a text, a figure, a symbol and the like are visually printed around or superimposingly printed on the dot pattern for linking so that users can easily recognize. A code value and/or a coordinate value corresponding to this dot pattern for linking is registered in the link table by being associated with an operation instruction for switching the input-output device to the link mode, which is described later. Also, "a predetermined dot pattern" refers to a dot pattern to be associated and registered with content data in the link mode by a user. In most of the cases, superimposingly printing a text, a figure, and the like that indicates the dot pattern to the user can enhance user-friendliness and usefulness.

In the input-output device according to the first aspect of the invention, when a dot pattern for starting/ending multi-linking formed in a predetermined area on a medium surface is read by the optical reading unit, the control unit, based on an operation instruction that is associated and registered with the code value and/or coordinate value converted by the processing unit, switches operation for associating and registering a code value and/or a coordinate value corresponding to a predetermined dot pattern with the content data, when the predetermined dot pattern is continuously read twice or more after reading the dot pattern for starting/ending multi-linking, the control unit associates the code value and/or coordinate value converted by the processing unit with the predetermined content data, and registers association between the code value and/or coordinate value and the content data to the link table of the storage unit, when the dot pattern for starting/ending multi-linking formed in the predetermined area on the medium surface is read by the optical reading unit, the control unit ends operation for associating and registering the code value and/or coordinate value with the content data, and, when the predetermined dot pattern is read once again by the optical reading unit, the control unit refers to the link table, retrieves the corresponding content data from the storage unit, and outputs from the output unit.

In this way, as there is no need to read a dot pattern for linking for each time when linking content data with a predetermined dot pattern and to switch the operation of the input-output device to the link mode, continuous identical content data can be easily linked to a plurality of different dot patterns.

Here, "a dot pattern for starting/ending multi-linking" refers to an area provided to continuously link, by a user, the same content data to a plurality of dot patterns on a medium surface on which dot patterns are formed by printing. In most of the cases, a text, a figure, a symbol and the like are printed around or superimposingly printed on the dot pattern for starting/ending multi-linking. A code value and/or a coordinate value corresponding to this dot pattern for starting/ending multi-linking is associated with an operation instruction for switching the input-output device to the multi-link mode and an operation instruction for switching from the multi-link mode to a general input-output mode and registered in the link table.

The multi-link mode refers to a mode for associating and registering a plurality of dot patterns that are read during the mode with the same content data. During this mode, linking continues without outputting even if a predetermined dot pattern associated with content data is read, until the dot pattern for starting/ending multi-linking is read again.

Also, in the input-output device according to the first aspect of the invention, the input-output device further comprises an input unit for inputting content data, and the control unit starts/ends input of the content data by the input unit by operating an input start/end button further provided on the input-output device or by reading a dot pattern for starting/ending input formed in a predetermined area on a medium surface using the optical reading unit, and registers the content data input by the input unit to the storage unit.

That is, the control unit, by reading a dot pattern for starting/ending input formed in a predetermined area on the medium surface by the optical reading unit or by operation of the input start/end button further provided on the input-output device, controls starting of inputting content data by the input unit based on an operation instruction that is associated and registered with a code value and/or a coordinate value that is defined in the dot pattern for inputting, and, similarly, controls ending of inputting content data by operating the input start/end button further provided on the input-output device once again or reading the dot pattern for starting/ending input again.

Here, "a dot pattern for starting/ending input" refers to a dot pattern used for starting/ending input by the input unit, and is formed by printing near or by superimposingly printing on visual information that indicates starting and/or ending recording sounds or images so that users can appropriately recognize.

The code value and/or coordinate value corresponding to this dot pattern for starting/ending input is associated with an operation instruction for switching the input-output device to an input mode and an operation instruction for switching from the input mode to the normal mode and registered to the link table. It will be appreciated that either a dot pattern for starting input or a dot pattern for ending input may be used as a toggle so that starting and ending input can be alternatively operated each time when the one dot pattern is read.

Also, in the input-output device according to the eighth aspect of the invention, when a predetermined dot pattern is read by the optical reading unit while inputting content data by the input unit, the control unit ends input of the content data, registers the content data to a storage unit, associates a code value and/or a coordinate value converted by the processing unit with the content data, registers association between the code value and/or coordinate value and the content data to the link table of the storage unit, and, when the predetermined dot pattern is read once again by the optical reading unit, the control unit refers to the link table, retrieves the corresponding content data from the storage unit, and outputs through the output unit.

In this way, it is possible that, while using the input-output device, for example, as a video camera, a digital camera, a mobile telephone, an audio recording device and the like, a dot pattern is touched in arbitrary timing to associate and register the input motion picture/image data and audio data with the touched dot pattern to the link table, then, when the dot pattern is read again, the associated and registered image/motion picture data and audio data is output through the output unit. As the feature of the shooting location or notes can be directly written in the medium printed with dot patterns with a pencil and the like, the input-output device can function conveniently, such as, inputting and outputting motion picture/image data and audio data while having convenience as a paper medium, when compared with general video cameras, digital cameras, mobile telephones, and audio recording devices.

An input start/end button or a dot pattern for starting/ending input is used to start inputting content data, and a predetermined dot pattern that is touched during input is used to end inputting. That is, when a predetermined dot pattern is read while inputting by the input unit, the control unit ends the input (performed by a program), a code value and/or a coordinate value corresponding to the dot pattern is associated with the input content data, such as sounds, motion pictures and the like, and registered in the link table. By ending the input by the input unit upon reading a predetermined dot pattern, a user can quickly and intuitively define information by checking the position of a dot pattern that is associated and registered with the input content data, while saving the step of ending the input of the content data.

Also, in the input-output device according to the eighth aspect of the invention, when operation of a divide button further provided on the input-output device is performed or a dot pattern for dividing that is formed in a predetermined area on a medium surface is read N times by the optical reading unit while inputting the content data, the control unit partitions and registers content data from when starting input until operation of the divide button or when reading of the dot pattern for dividing that is formed in the predetermined area on the medium surface is performed by the optical reading unit as first content data to the storage unit, subsequently, when operation of the divide button is performed or the dot pattern for dividing that is formed in the predetermined area on the medium surface is read by the optical reading unit at least once while inputting the content data, the control unit partitions and registers content data from when i−1th division is performed until when ith division is performed as ith content data to the storage unit, and, at last, the control unit ends inputting of the content data by the input unit by operation of the input start/end button or by reading the dot pattern for starting/ending input that is formed in the predetermined area on the medium surface by the optical reading unit, and partitions and registers content data from when Nth division is performed until when input of the content data ends as N+1th content data to the storage unit.

In this way, even when recording sounds and images for long hours, the recording can be arbitrary divided and registered in predetermined terms of the theme, time, and a variety of objects, without being interrupted. Thereafter, a code value and/or a coordinate value that is defined in a dot pattern can be associated with the newly divided and registered content data to facilitate cueing and continuous outputting.

Also, in the input-output device according to the tenth aspect of the invention, the control unit registers, in addition to a first file name indicating at least each first to Nth content data that was divided and registered, a second file name indicating content data that was divided and registered continuously next thereto to the storage unit.

According to the above configuration, when continuously outputting content data, without associating and registering a code value and/or a coordinate value with the divided and input content data to the link table, by reading a content file name that is stored in a content file, the content file name can be used as instruction information that indicates whereabouts of the content data that is output after outputting desired content data. Thus, even when continuously outputting content data in the above configuration, at least one set of content data and a code value and/or a coordinate value may be associated and registered in the link table registered in the storage unit. It should be noted that, in addition to the first file name that indicates content data, the second file name that indicates content data to be registered next can be arbitrary associated, separately from the division and registration. Further, in addition to the first file name that indicates the content data and the second file name that indicates content data to be registered next, a third file name that indicates previously registered content data can also be registered, and the contents can be continuously reproduced in a reverse order.

Also, in the input-output device according to the tenth aspect of the invention, the control unit associates code values and/or coordinate values that are defined by predetermined N+1 dot patterns and converted by the processing unit with the divided first to N+1th content data according to a predetermined method, registers association of the code values and/or coordinate values and the divided content data to the link table of the storage unit, and, when the ith dot pattern is read by the optical reading unit, the control unit refers to the link table, retrieves the corresponding ith to N+1th content data from the storage unit according to a predetermined method, and continuously outputs through the output unit.

In this way, it is possible to read an arbitrary dot pattern that is linked to divided content data and continuously reproduce the content data, as the lead, and the following content data according to a predetermined order. It should be noted that, after continuously reproducing content data until N+1th content data in a predetermined order, the first content data to predetermined content data may be subsequently continuously reproduced, or may be continuously reproduced in a reverse order.

Also, in the input-output device according to the eighth aspect of the invention, when a predetermined first dot pattern is read by operation of a divide/link button further provided on the input-output device or by reading a dot pattern for dividing/linking formed in a predetermined area on a medium surface by the optical reading unit while inputting the content data, the control unit partitions and registers content data from when starting input until operation of the divide/link button or when reading of the dot pattern for dividing/linking that is formed in the predetermined area on the medium surface is performed by the optical reading unit as first content data to the storage unit, associates a code value and/or a coordinate value defined by the predetermined first dot pattern converted by the processing unit with the registered first content data, and registers association between the code value and/or coordinate value and the first content data to the link table of the storage unit, subsequently, when a predetermined ith dot pattern is read by the optical reading unit by operating the divide/link button or by reading the dot pattern for dividing/linking formed in the predetermined area on the medium surface by the optical reading unit at least once while inputting the content data, if the number of operation of the divide/link button is N times (N is a natural number) including time when the first predetermined dot pattern is read, the control unit partitions and registers content data from when i−1th division is performed until when ith division is performed as ith content data to the storage unit, associates an ith code value and/or coordinate value converted from the predetermined ith dot pattern by the processing unit with the registered ith content data, and registers association between the ith code value and/or coordinate value and the ith content data to the link table of the storage unit, finally, the control unit ends input of the content data by the input unit by operation of the input start/end button or by reading the dot pattern for starting/ending input formed in a predetermined area on the medium surface by the optical reading unit, and, when the ith dot pattern is read once again by the optical reading unit, refers to the link table, retrieves the corresponding ith content data from the storage unit, and outputs through the output unit.

In this way, it is possible that, in a meeting, for example, while using the input-output device as a voice recorder, a dot pattern is touched a plurality of times at arbitrary timing to associate and register the input motion picture/image data and audio data with the touched dot pattern to the link table, and, when the dot pattern is read again, the motion picture/image data and audio data that are associated and registered are output from the output unit. As the points or notes can be directly written in the medium printed with dot patterns with a writing material, the input-output device can have a useful inputting and outputting function, such as, inputting and outputting motion pictures/images and sounds while retaining convenience as a paper medium when compared with conventional video cameras, digital cameras, mobile telephones, audio recording devices and the like.

Also, in the input-output device according to the first aspect of the invention, the code value and/or coordinate value defined in the dot pattern is associated with at least two pieces of content data, the association is further registered in the link table of the storage unit, and the control unit, when the dot pattern is read once again by the optical reading unit, refers to the link table, retrieves at least two pieces of corresponding content data in a predetermined order from the storage unit, and continuously outputs through the output unit.

According to the above configuration, as the link table associates and registers a code value and/or a coordinate value with two or more pieces of content data, the code value and/or coordinate value and the content data that is associated and registered therewith can be continuously output only by reading and analyzing the one dot pattern and converting the dot code into a code value and/or a coordinate value.

In general, a predetermined link table is created in the information processing device (PC) to continuously output a plurality pieces of content data. However, according to the input-output device that is provided with the input unit of the invention, the link table can be created by reading a predetermined dot pattern while inputting content data.

In the input-output device according to the first aspect of the invention, the dot pattern defines, in addition to a first code value and/or coordinate value associated with the content data, at least one second to Nth code values and/or coordinate values associated with other content data, and, when the dot pattern is read by the optical reading unit, the control unit refers to the link table, retrieves content data corresponding to the first code value and/or coordinate value from the storage unit, and outputs through the output unit, subsequently, refers to the link table, retrieves content data corresponding to the at least one second to Nth code values and/or coordinate values in a predetermined order from the storage unit, and continuously outputs through the output unit.

When continuously outputting content data in the above configuration, the link table stored in the storage unit does not necessarily associate and register a code value and/or a coordinate value with two or more pieces of content data.

According to the above configuration, as the dot pattern (a dot code) has a function as instruction information that indicates other content data to be output after outputting desired content data, in order to start outputting continuous content data, the user only need to conduct operation of reading one dot pattern that is associated with one of the continuous content data without a need to perform operation of reading different dot patterns one after another.

Also, the dot code is converted into not only a code value and/or a coordinate value that is associated with content data to be output by reading a dot pattern formed in each printed area in the link table but also a code value and/or a coordinate value that indicates other content data (for example, content data that is supposed to be output after the currently outputting content data, or content data that has been previously output), which is treated as instruction information that indicates a code value of other content data to be output after outputting desired content data. Thus, as the instruction information specifies only a code value and/or a coordinate value that is associated and registered with content data to be continuously output next, there is an advantage that the order in which content data is continuously output can be flexibly changed only by changing association between the code and the content data in the link table.

Also, as the dot pattern defines a code value and/or a coordinate value of content data before or after the outputting content data, if a user does not want to start outputting content data from the first (for example, contents until Chapter 3 of a novel has been listened and a content that is desired to be listened next is a content from Chapter 4), even when the content data is started outputting from the middle, the content data can be continuously output from the content of the Chapter 4 by reading a dot pattern formed and defined in the beginning of the Chapter 4. Further, by changing the playback mode of the content data, the content data can also be reproduced easily in a reverse order.

It should be noted that a unique code value and/or coordinate value may be provided for each different printed area, or the printed area may be divided into certain ranges and a unique code value and/or coordinate value may be provided for each range.

The content data to be secondly output or thereafter is preferably associated with a code value and/or a coordinate value that is indicated by a difference value from a code value and/or a coordinate value that indicates association with the content data that is output first. That is, by analyzing a dot pattern that defines the content data that is output first, a code value and/or a coordinate value that indicates association with at least one other content data is expressed by a difference value, in addition to a code value and/or a coordinate value that indicates association with predetermined content data that is output first.

As described above, when a code value and a coordinate value that indicates association with content data that is output first and a code value and a coordinate value that indicates association with content data that is secondly output or thereafter are converted from one dot code, by expressing the code value and coordinate value that indicates the association with other content data using a difference value from the code value and coordinate value that indicates association with the predetermined content data that is output first, the difference value can be instruction information for indicating the code value of other content data that is output after outputting desired content data while saving the information amount that one dot code retains.

As the difference value can be instruction information for indicating a code value of other content data that is output after outputting desired content data while saving the information amount, for example, the available code value range can be increased and the dot code can define enhanced security and X and Y coordinate values.

It should be noted that there may be a plurality of second code values and/or coordinate values.

Also, in the input-output device according to the first aspect of the invention, the storage unit further registers a dot code linking table that associates and registers first to Nth code values and/or coordinate values that are defined by the different dot patterns in a predetermined order, and the control unit, when ith dot pattern is read by the optical reading unit, refers to the dot code linking table using an ith code value and/or coordinate value converted by the processing unit, searches the first to Nth code values and/or coordinate values, then, refers to the link table in an order from the ith to Nth code values and/or coordinate values, retrieves at least two pieces of corresponding content data from the storage unit, and continuously outputs through the output unit.

As in the above configuration, if a dot code linking table is registered in the storage unit and code values and/or coordinates value that are converted from the dot code are associated one another and registered therein, the control unit can refer to the dot code linking table and the link table to continuously output the following content data after outputting desired content data. Also, as the linking of code values and/or coordinate values can be confirmed by referring to the dot code linking table, content data to be continuously output can be read and output without restricting to the information amount that one dot code retains.

It should be noted that, when content data is continuously output in the above configuration, a code value and/or a coordinate value is not necessarily associated and registered with two or more pieces of content data in the link table that is registered in the storage unit. It should also be noted that, in this invention, using a dot code linking table that registers code values and/or coordinate values that are respectively associated with content data according to the order of continuous output with a predetermined method, the storage unit may continuously output the content data at least once according to the descending or ascending order of that order.

Also, a repeat function may also be added in which, after outputting content data that is associated with a code value and/or a coordinate value that is defined first or last in the ascending or descending order, content data is continuously output again from the content data that is associated with the code value and/coordinate value that is defined last or first therein.

Also, in the input-output device according to the first aspect of the invention, the storage unit further registers, in addition to a first file name that indicates the content data, a second file name that indicates different content data, and, by treating the second file name that indicates the different content data as a first file name so as to link a second file name that indicates further different content data in a chained manner, registers a chained file name, the dot pattern defines a code value and/or a coordinate value that is associated with content data indicated by the file name, the control unit, when the dot pattern is read by the optical reading unit, sequentially retrieves content data indicated by the file names registered in a chained manner in the storage unit from the storage unit, and continuously outputs through the output unit.

According to the above configuration, when continuously outputting content data, by reading a content file name that is stored in a content file, the content file name can be instruction information that indicates whereabouts of content data that is desired to be output after outputting the desired content data without associating and registering a code value and/or a coordinate value with the content data to the link table. Thus, even when continuously outputting content data in the above configuration, at least one set of content data and a code value and/or a coordinate value may be associated and registered in the link table that is registered in the storage unit. Further, a third file name that indicates previously registered content data may be registered in addition to the first file name that indicates content data and the second file name that indicates content data that is registered next, which can also be continuously reproduced in a reverse order.

Also, in the input-output device according to the first aspect of the invention, the storage unit further registers a control code that is associated with the code value and/or coordinate value in the link table, the control code is a code for controlling an electronic device, and the control unit, when a dot pattern that defines the code value and/or coordinate value is read by the optical reading unit, refers to the link table, converts a control code corresponding to the code value and/or coordinate value into one or a plurality of optical signals or wireless signals, and outputs the one or plurality of optical signals or wireless signals through the output unit.

It should be noted that, the optical signals that control the electronic device include a communication using an infrared method, and the wireless signals include a communication using an RF method and BLUETOOTH (registered trademark). This electronic device includes any home appliances such as TVs, STBs, video recording/playback devices, audio recording/playback devices, and air conditioners, mobile telephones, PDAs, PCs, game machines, and toys.

Also, in the input-output device according to the first aspect of the invention, the storage unit further registers one or a plurality of mouse operation codes that are associated with the code value and/or coordinate value in the link table, and the control unit, when the control recognition unit recognizes a connection between the connection unit and the information processing device, and the dot pattern that defines the code value and/or coordinate value is read by the optical reading unit, refers to the link table, and transmits a mouse operation code corresponding to the code value and/or coordinate value to the information processing device through the connection unit.

The mouse operation code is a code standard that defines mouse operation, keyboard operation, tablet operation and the like for controlling an information processing device, and can cater to a variety of standards for an input device including ASCII code, HID code, and the like.

Also, in the input-output device according to the 19th aspect of the invention, when the connection recognition unit recognizes a connection between the connection unit and the information processing device, the control unit comprises: a normal mode in which a code value and/or a coordinate value converted by the processing unit is transmitted to the information processing device through the connection unit; and a mouse mode in which a mouse operation code corresponding to the code value and/or coordinate value is transmitted to the information processing device through the connection unit, which can be switched by operation of a button separately provided on the input-output device or by an operation instruction registered by being associated with a code value and/or a coordinate value corresponding to a dot pattern formed in a predetermined area on a medium surface.

The normal mode is a mode in which a code value and/or a coordinate value converted by the processing unit is transmitted without being converted to other codes, and processing corresponding to the code value and/or coordinate value is performed by an application of the information processing device side. It should be noted that the code value and/or coordinate value are often encrypted and transmitted. Also, a variety of additional information including a state code such as a rotation angle of a dot pattern (an axis rotation of the optical reading unit), brightness (an inclination angle between the optical reading unit and the medium), and error information may also be transmitted.

Also, in the input-output device according to the first aspect of the invention, the storage unit further registers a driver and/or content data to be used by connecting the input-output device with the information processing device, and the control unit, when the connection recognition unit recognizes a connection between the connection unit and the information processing device, automatically installs the driver and/or content data to the information processing device by operation of an install button further provided on the input-output device or by reading a dot pattern for installation formed in a predetermined area on a medium surface by the optical reading unit.

Here, "the dot pattern for installation" refers to an area that is provided, for a user to install a driver and/or content data to the information processing device, on a medium surface on which dot patterns are formed by printing. In most of the cases, a text, a figure, a symbol, and the like are visually printed around or by superimposing on the dot pattern so that the user can easily understand.

By reading this dot pattern for installation, operation of the input-output device is switched to the install mode based on an operation instruction that is associated and registered with the corresponding code value and/or coordinate value, and a driver and/or content data is installed in the information processing device.

Also, in the input-output device according to the first aspect of the invention, when the connection recognition unit recognizes a connection between the connection unit and the information processing device, the control unit causes the input-output device to function as a USB memory by operation of a USB memory button further provided on the input-output device or by reading a dot pattern for USB memory formed in a predetermined area on a medium surface by the optical reading unit, and the link table that associates and registers a code value and/or a coordinate value and content data and/or an operation instruction, and the content data and/or the operation instruction, which are registered in a storage unit of the input-output device or a storage unit of the information processing device, can be mutually copied, transferred, and deleted between the storage unit of the input-output device and the storage unit of the information processing device.

Here, "the dot pattern for USB memory" refers to an area, provided for a user to use the input-output device as a USB memory, on a medium surface on which dot patterns are formed by printing. In most of the cases, a text, a figure, a symbol and the like are printed around or by superimposing on the dot pattern so that the user can easily recognize.

By reading this dot pattern for USB memory, operation of the input-output device is switched to a USB memory mode based on an operation instruction that is associated and registered with a corresponding code value and/or coordinate value, and the storage units of the information processing device and the input-output device can be mutually used. In this way, a link table and content data that is stored in the PC side can be copied to the input-output device, and content data input by the input unit of the input-output device and a created link table can be easily copied to the information processing device.

Also, in the input-output device according to any one of the first to 22nd aspects of the invention, the content data is audio data.

In this way, when the input-output device is used as a speaking pen in a variety of fields, such as education related materials including language education and music, a variety of guides of sightseeing sites, art museums, science museums, events, manuals and the like, and story telling of picture books, novels and the like, not only comprehension is deepened by reproducing target sounds, but also comprehension of the before and after relationship is deepened by continuously reproducing the following sounds.

Also, in the input-output device according to any one of the eighth to 13th aspects of the invention, the input unit is an audio input unit.

In this way, in addition to divide and record meetings, presentations, and Q&As for each theme, speaker, and time elapsed, and to continuously reproduce them, only the target sound can be reproduced to deepen comprehension.

Also, in the input-output device according to any one of the first to 24th aspects of the invention, the storage unit is detachably mounted on the input-output device.

The detachably mounted storage unit, for example, includes a USB memory that uses flash memory, an SD card, a memory stick, SmartMedia, CompactFlash (registered trademark), and the like.

Also, in the input-output device according to any one of the first to 25th aspects of the invention, the storage unit comprises an internal memory and an external memory.

In such a case, the internal memory preferably registers a driver, a dot code analysis program, a basic program and the like to function by connecting with the information processing device, and the external memory preferably registers content data, a link table and the like.

Also, in the input-output device according to the first aspect of the invention, the input-output device further comprises a text recognition unit that receives handwriting input operation by a user and recognizes a text or a text string including a plurality of character classes, such as hiragana, katakana, kanji, alphameric characters, symbols and the like, as a recognition result of receiving the handwriting input operation, the storage unit further registers a link table that associates and registers a text or a text string that is recognized by the text recognition unit and content data and/or an operation instruction, the control unit, when receiving the handwriting input operation, recognizes a trajectory of the optical reading unit based on changes in coordinate values that are converted by the processing unit, recognizes a text or a text string corresponding to the trajectory by the text recognition unit, refers to the link table, and outputs content data corresponding to the text or the text string that is recognized by the text recognition unit through the output unit or controls operation based on the operation instruction.

In this way, it is possible to realize both operations of outputting information corresponding to a dot pattern printed on a touched position when a user touches a predetermined position on a medium with a pen type scanner (referred to as "touch input operation" in the invention), and outputting information corresponding to a trajectory by recognizing the trajectory by reading dot patterns on the traced trajectory that a user traced on the medium using a pen type scanner, just as writing by hand with a pen (referred to as "handwriting input operation" in the invention). That is, without performing a special operation before starting, the handwriting input operation is recognized as being started and the processing is performed just by touching and tracing the writing area using the pen type scanner.

Also, in the input-output device according to the first aspect of the invention, the input-output device further comprises a text recognition unit that receives handwriting input operation by a user and recognizes a text or a text string including a plurality of character classes, such as hiragana, katakana, kanji, alphameric characters, symbols and the like, as a recognition result of receiving the handwriting input operation, and the control unit, when receiving the handwriting input operation, recognizes a trajectory of the optical reading unit based on changes in coordinate values that are converted by the processing unit, recognizes a text or a text string corresponding to the trajectory by the text recognition unit, converts the recognized text or text string into a text code or a text string code, and, when the connection recognition unit recognizes a connection between the connection unit and the information processing device, transmits the text code or text string code through the connection unit to the information processing device.

In this way, in addition to the format of the output unit of the input-output device and a content that is registered in the storage unit, a lot of fascinating contents utilizing the Internet and the like can also be output using output units of a variety of formats that are embedded in or connected to the information processing device.

Also, in the input-output device according to the first aspect of the invention, the input-output device receives handwriting input operation by a user, and the control unit, when receiving the handwriting input operation, recognizes a trajectory of the optical reading unit based on changes in coordinate values that are converted by the processing unit, and, when the connection recognition unit recognizes a connection between the connection unit and the information processing device, transmits the trajectory to the information processing device through the connection unit.

In this way, the text recognition unit of the information processing device side can be used, which can accurately and quickly perform enormous processing than the text recognition unit of the input-output device. Recognizing texts requires a variety of dictionaries, and the input-output device does not have enough capacity and processing speed therefor. It should be noted that the Internet connected with the information processing device can also be utilized for recognizing texts.

Also, in the input-output device of the invention, an information input-output system includes: the input-output device according to the 28th aspect of the invention; and an information processing device that is connected wiredly or wirelessly with the input-output device by the connection unit that comprises: a storage unit that registers a link table that associates and registers the text code or text string code with content data and/or an operation instruction; an output unit that outputs the text code or text string code and/or the content data; and a control unit that controls operation of the storage unit and the output unit and/or operation based on the operation instruction, wherein the control unit of the information processing device outputs, from the output unit, the text code or text string code transmitted from the input-output device via the connection unit, and/or refers to a link table of the information processing device, and outputs content data corresponding to the text code or text string code from the output unit of the information processing device, or controls operation based on the operation instruction.

The information input-output system of the invention includes: the input-output device according to the 29th aspect of the invention; an information processing device that is connected wiredly or wirelessly with the input-output device by the connection unit that comprises: a text recognition unit that recognizes a text or a text string including a plurality of character classes, such as hiragana, katakana, kanji, alphameric characters, symbols and the like, as a recognition result of receiving the handwriting input operation; a storage unit that registers a link table that associates and registers the text and/or text string with content data and/or an operation instruction, an output unit that outputs a text code or a text string code converted from the text or text string and/or the content data, and a control unit that controls operation of the text recognition unit, the storage unit, and the output unit and/or operation based on the operation instruction, wherein the control unit of the information processing device recognizes, by the text recognition unit, a text or a text string that corresponds to the trajectory transmitted from the input-output device via the connection unit, converts into a text code or a text string code, and outputs the text code or text string code through the output unit, and/or refers to the link table and outputs content data corresponding to the text or text string from the output unit of the information processing device, or controls operation based on the operation instruction.

The input-output device according to any one of 27th to 29th aspects of the invention starts/ends receiving the handwriting input operation by operation of a further provided handwriting input start/end button or by reading a dot pattern for starting/ending handwriting input formed in a predetermined area on a medium surface by the optical reading unit.

In this way, the same area used for associating the code value and/or coordinate value with the content data and/or operation instruction can be used as the writing area. As the writing area requires coordinate values for drawing trajectories, and the coordinate values require many different dot codes, so as to effectively utilize the limited dot codes, the same dot codes can be used for different writing areas and each writing area can be identified by each dot pattern for starting/ending handwriting input.

The input-output device according to 27th to 29th aspect of the invention further comprises a determination unit that determines whether the handwriting input operation by a user is received or not, an operation determination code for the determination unit to determine reception of the handwriting input operation is defined in at least part of the code value, and the control unit determines, by the determination unit, reception of the handwriting input operation for each time when a dot pattern is read by the optical reading unit based on the operation determination code.

In this way, the operation identification code can be read just by touching, and the handwriting input operation can be accurately and quickly started to be received, without tracing with the scanner pen. Also, this clearly helps distinguishing the invention from a medium that is used by associating the code value and/or coordinate value with content data and/or operation instruction. That is, even if such a medium is traced with the pen, the handwriting input operation is not immediately accepted due to the operation identification code. In general, if the read code value and/or coordinate value is registered in the link table is searched, and the handwriting input is accepted only when the medium is traced using the pen when the value is not registered. As this process requires calculation time, high speed CPU is required to increase the speed of reaction.

In the input-output device according to any one of 27th to 29th aspects of the invention, a writing area identification code for identifying a writing area used upon handwriting-input by a user is defined in at least part of the code value, and the control unit identifies a writing area based on the writing area identification code and recognizes a trajectory on the writing area.

In this way, the writing area identification code is read only by touching without tracing with the scanner pen, the handwriting input operation can be accurately and quickly started to be accepted, and, moreover, which writing area is written in can be identified. Thus, if the writing area is an address field, the text or text string can be easily recognized by matching the written trajectory with the address database (a dictionary). That is, by identifying the writing area, dictionaries dedicated for the written text or text string are identified and the text recognition rate largely enhanced. It should be appreciated that, as the writing area identification code can be read only by touching, if a high speed CPU is used, a text can be recognized in real time while tracing with a pen.

The information input-output system of the invention includes: the input-output device of the first aspect; and an information processing device that is wiredly or wirelessly connected with the input-output device by the connection unit, wherein the input-output device receives handwriting input operation by a user, the information processing device comprises: a determination unit that determines handwriting input operation received by the input-output device; a text recognition unit that recognizes a text or a text string including a plurality of character classes, such as hiragana, katakana, kanji, alphameric characters, symbols and the like, as a recognition result of receiving the handwriting input operation; a storage unit that registers a link table that associates and registers the text or text string with content data and/or an operation instruction; an output unit that outputs the content data; and a control unit that controls operation of the determination unit, the text recognition unit, the storage unit, and the output unit and/or operation based on the operation instruction, wherein a control unit of the input-output device transmits a code value and/or a coordinate value converted by the processing unit to the information processing device via the connection unit, the determination unit determines reception of handwriting input by a user based on an operation determination code that is defined in at least part of the code value, and the control unit of the information processing device recognizes a trajectory of the optical reading unit of the input-output device based on changes in the coordinate values, recognizes a text or a text string corresponding to the trajectory by the text recognition unit, refers to the link table, and outputs content data corresponding to the text or text string recognized by the text recognition unit through the output unit, or controls operation based on the operation instruction.

In the input-output device according to any one of the first to 29th and 32nd to 34th aspects, or the input-output system according to any one of the 30th, 31st, and 35th aspects of the invention, the dot pattern is formed by arranging one or a plurality of stream dot patterns arranged in accordance with the steps of: disposing a plurality of reference dots continuously in a line in accordance with a predetermined rule; providing a first virtual reference line that comprises a straight line, a polygonal line and/or a curved line that connects the plurality of reference dots; providing at least one second virtual reference line that is defined at a predetermined position from the reference dots and/or the first virtual reference line and comprises a straight line and/or a curved line; providing a plurality of virtual reference points at predetermined positions on the second virtual reference line; and disposing an information dot that defines X and Y coordinate values and/or a code value by a distance and a direction from the virtual reference point, at an end point of a vector expressed with the virtual reference point as a start point.

According to this, by forming a plurality of dot patterns with certain intervals of reference points, X and Y coordinate values are tightly arranged and defined on the medium surface. Further, when texts, staff notions, maps, figures, and the like are printed on the medium, and a scanner pen is used to trace or touch on the line segment, the dot patterns can be effectively arranged if stream dot patterns are formed only along the line segment. Also, without restricting to the shape of the rectangular area in which dot patterns that define X and Y coordinate values as two-dimensional codes are formed (used as an index), dot patterns of repeated set of certain information can be formed in a flexible shape tailored to an information area that is visually formed on the medium surface.

In the input-output device or the input-output system according to the 36th aspect of the invention, in the stream dot, a reference dot is further provided, at a predetermined position, that is a reference for defining the second virtual reference line and/or defining a direction of the dot pattern and a set of X and Y coordinate values and/or a code value.

According to this, providing a new reference point, the orientation of the stream dot pattern and a set of certain information can be easily defined without using an information dot, suppressing decrease of unnecessary information. Further, the position of a virtual reference point as a start point of the information dot can be accurately indicated based on the position of the new reference point.

Advantageous Effects of the Invention

According to the invention, a useful dot pattern technique can be realized, in which the input-output device can be used alone when not connected with an information processing device (for example, as an audio input-output device) and transmit a code value and/or a coordinate value or an operation instruction to the information processing device based on a predetermined condition when being able to be connected with the information processing device, whereby corresponding information can be output.

BRIEF DESCRIPTION OF THE DRAWINGS

FIGS. 2A and 2B are diagrams showing a relationship between a dot code and a code value and/or a coordinate value.

FIGS. 3A to 3E are diagrams showing relationships between code values and/or coordinate values and content data and/or operation instructions.

FIGS. 5A to 5C are explanatory views showing another configuration of the pen type scanner.

FIGS. 15A to 15C are explanatory views showing an example of a dot code, a link table, and a content file.

FIGS. 17A and 17B are explanatory views showing examples of dot code formats.

FIGS. 18A and 18B are explanatory views showing examples in which code values and content data are associated and registered.

FIG. 19 is an explanatory view showing an example in which code values and content data are associated and registered.

FIG. 20 is an explanatory view showing an example in which code values and content data are associated and registered.

FIGS. 21A and 21B are explanatory views showing an example of a link table in which code values and content file names or content data are associated and registered.

FIGS. 24A to 24C are diagrams illustrating a configuration of GRID5.

FIG. 27 is a diagram illustrating, among the dot pattern formats, a format that uses 1 bit to define an operation determination code.

FIG. 30 is a diagram illustrating a format that defines an area identification code.

FIG. 43 is a diagram illustrating a basic use method of GAM.

MODE FOR CARRYING OUT THE INVENTION

Next, the invention will be described with reference to the drawings.

Figure 1:
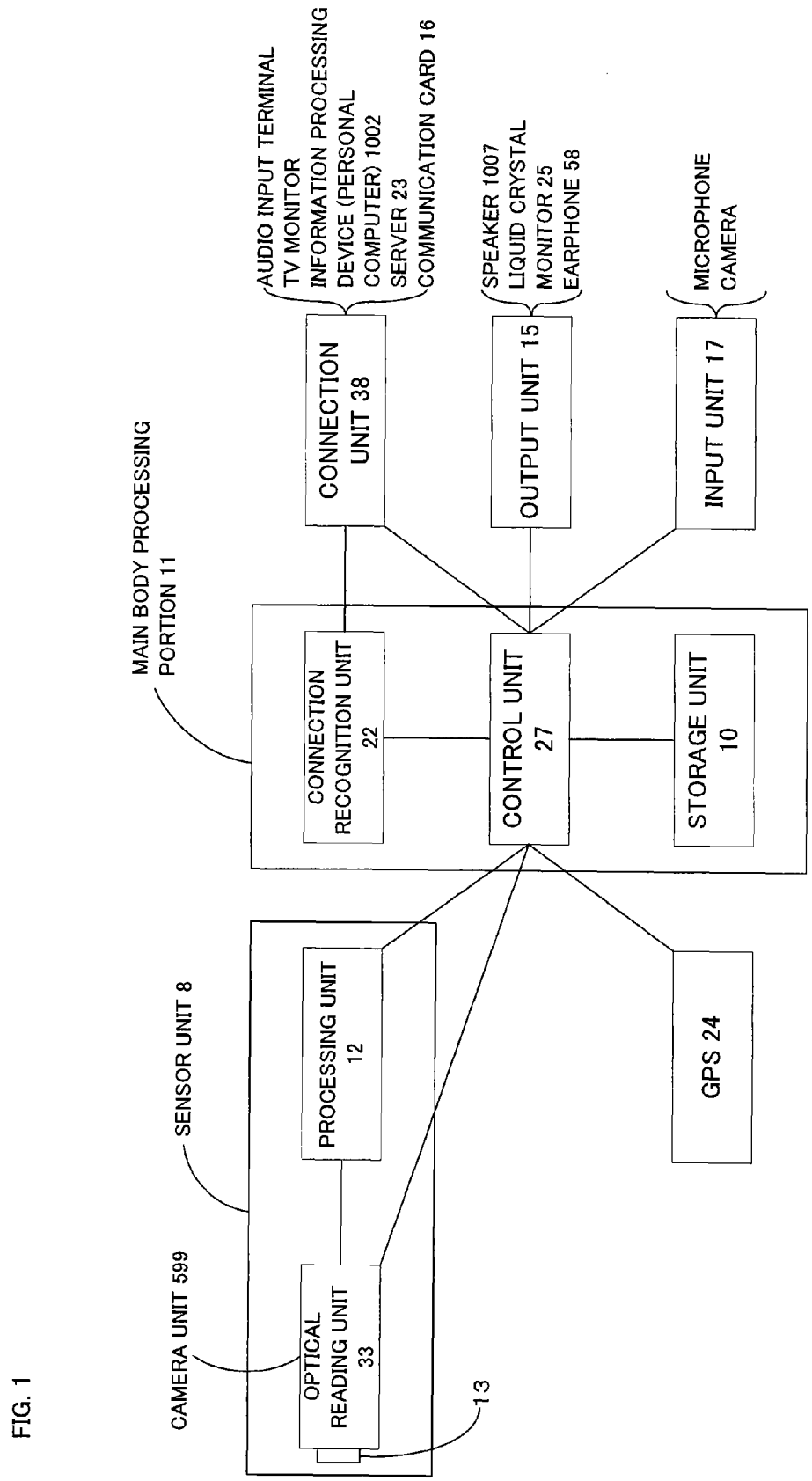
FIG. 1 is a functional block diagram illustrating an input-output device using an information input-output method based on input by a camera.

FIG. 1 is a diagram for illustrating a configuration of an embodiment of the input-output device of the invention, which is a functional block diagram for illustrating the input-output device using an information input-output method based on input by a camera.

First, the basic configuration of the input-output device will be described with reference to FIG. 1.

The input-output device comprises a sensor portion 8 that has a camera unit 599 as an optical reading unit 33, and a main body processing portion 11 that has a control unit 27 and a storage unit (a memory) 10. This sensor portion 8 comprises a camera unit 599 that retrieves only image data of a dot pattern portion in a printed material and a processing unit 12 that digitizes this image data into numerical values. An infrared emitting unit 13 that irradiates infrared light to the printed material is provided near this camera unit 599.

The main body processing portion 11 comprises a connection recognition unit 22 that recognizes a wired or wireless communication connection between a connection unit 38 and an information processing device 1002 (e.g., a personal computer, a PDA, a mobile telephone, and an audio device), a link table that associates and registers a code value and/or a coordinate value and content data and/or an operation instruction, a storage unit 10 that registers the content data and/or operation instruction, a control unit 27 (which controls operation of the optical reading unit, processing unit, connection unit, connection recognition unit, and output unit and/or operation based on an operation instruction) that outputs content data that corresponds to a dot pattern portion and is registered in advance in the storage unit (a memory) 10 based on the numerical value obtained by image processing of the processing unit 12.

The dot code is a code digitized by the processing unit 12, and the code value and/or coordinate value are information converted from the dot code. If the coordinate value is not used, the dot code may be used as-is as a code value.

This main body processing portion 11 connects to an output unit 15 such as a speaker 1007, an earphone 28, a liquid crystal monitor 25 or the like. It should be noted that, instead of outputting as a sound, it is possible to output a sound (line) through the connection unit 38, or output as an image to a television monitor or an information processing device 1002.

In addition to registering content data and/or operation instructions in advance, the storage unit 10 can register content data and/or operation instructions afterwards. For example, the storage unit 10 can register content data of a sound, a photograph, and a motion picture using a microphone and a camera separately provided as an input unit 17.

Using audio data, the input-output device functions as a speaking pen in a variety of fields, such as education related materials including language education and music, a variety of guides of sightseeing sites, art museums, science museums, events, manuals and the like, and story telling of picture books, novels, and the like, whereby not only comprehension is deepened by reproducing target sounds, but also comprehension of the before and after relationship is deepened by continuously reproducing the following sounds. In addition, such effects can be further enhanced using photograph/motion picture data.

Also, there can be considered an embodiment in which the storage unit 10 is configured by two components—an internal flash memory that registers operation instructions and a detachable micro SD card (registered trademark) that registers content data and a link table—and the micro SD card (registered trademark) is detached once to connect an information processing device to register content data and/or operation instructions, then, attached again. When the storage unit 10 is configured by two components of an internal memory and an external memory, the internal memory may store a driver, a processing program, and the like to be used for connecting the input-output device to the information processing device, and the external memory may store content data, operation instructions, link tables, and the like.

Next, the following describes a method for linking content data to an arbitrary dot pattern.

In this case, first, a user uses an optical reading unit 33 to read a dot pattern for linking, and switches the input-output device to a linking mode. The dot pattern for linking refers to a dot pattern provided for a user to start operation of linking to a predetermined dot pattern on a medium surface on which dot patterns are formed by printing. The dot pattern for linking is generally visually printed around or by superimposing a text, a figure, a symbol and the like for users to easily recognize.

The code value and/or coordinate value that is defined by this dot pattern for linking is registered in the link table by being associated with an operation instruction for switching the input-output device to the linking mode. The input-output device is switched to the linking mode based on the operation instruction by reading this dot pattern for linking. This linking mode is a mode for associating a predetermined dot pattern that is read during the mode with content data that is registered in the storage unit 10 and registering them in the link table, allowing linking content data to flexible areas/positions that are arbitrary selected by a user on the medium surface printed with dot patterns. This predetermined dot pattern refers to a dot pattern with which a user associates and registers content data in the linking mode, and is generally formed by superimposingly printing on a text, a figure and the like that indicates the dot pattern.

The dot pattern for linking may be formed on a paper controller, which is described later, with dot patterns that define other operation instructions (reproducing of a sound, adjusting of a sound volume, and the like) or formed on the same printed medium with a predetermined dot pattern to be linked.

When the input-output device is switched to the linking mode, the control unit 27 associates and registers a predetermined dot pattern that is read thereafter and content data such as a sound to the link table of the storage unit 10, and, when the predetermined dot pattern is read again, corresponding content data is output via the output unit 15. That is, when the predetermined dot pattern is read, content data that is associated and registered with a code value and/or a coordinate value converted by a processing unit 12 is selected. The content data to be associated can be arbitrary determined by a user. The content data includes content data that is input, just before switching to the link table, by a microphone that inputs sounds and a camera that inputs photographs/motion pictures that are provided on the input-output device as an input unit 17, content data that is selected by operation of a button portion (refer to an illustration of FIG. 4) separately provided on the input-output device, and content data that is output via the output unit 15 when the dot pattern is read.

Although linking to content data that is being input or has been input will be described in detail later, content data that has been already registered may be linked by: after operating a button for sequentially outputting the already registered content data and/or the index thereof (a display of a file name, a number or the like) and outputting the corresponding content data, or after reading a predetermined dot pattern that has already been associated and registered with content data by the optical reading unit 33 and outputting the content data, immediately switching to the linking mode, reading a predetermined dot pattern by the optical reading unit 33, and associating and registering the content data with the code value and/or coordinate value converted by the processing unit 12 to the link table. It will be appreciated that the content data may be selected by button operation or other methods during linking. It should be noted that the timing of linking may be in the middle of outputting the content data or within a predetermined time period after finishing the output. The method of switching to the linking mode and the method of linking may be: linking by reading a predetermined dot pattern after or while operating the button that is separately provided on the input-output device; or linking by reading a predetermined dot pattern subsequently to reading the dot pattern for linking.

In this way, content data can be associated at flexible positions tailored to a demand of the user of the input-output device. A variety of information, such as sound information and photographs/motion pictures, can be defined on any and all mediums including organizers, story-telling picture books, English conversation learning materials, and stickers/cards.

Association of the content data and arbitrary dot pattern can be performed while inputting the content data by the input unit. For example, input by the input unit is started by operation of an input start/end button that is separately provided on the input-output device or by reading a dot pattern for starting/ending input that is formed on the medium surface. It may be possible to program processing to finish the input when the input-output device is switched to the linking mode while the input unit 17 is inputting content data.

The dot pattern for starting/ending input may also be formed on a paper controller together with dot patterns that define other operation instructions (e.g., reproducing a sound, adjusting an audio volume) or formed on the same printed medium with a predetermined dot pattern to be linked.

The relationship between input content data and a predetermined dot pattern becomes clear to the user, as linking can be performed after finishing input for each time or for predetermined times by finishing input of content data when switching to the linking mode.

Using an audio input unit as the input unit, in addition to divide and record meetings, presentations, and Q&As for each theme, speaker, and time elapsed, and to continuously reproduce them, only the target sound can be reproduced to deepen comprehension. Similarly, the effect can be further enhanced using a video input unit as the input unit.

Association of this content data and a predetermined dot pattern can be performed by a separately provided link button on the input-output device as well as by the above-described dot pattern for linking. That is, when a predetermined dot pattern is read by operating the link button using the optical reading unit 33, association between the predetermined dot pattern and the existing content data or the inputting content data is registered to the link table. This operation of the link button may be performed by linking during the operation or by linking after the operation.

In this way, user-friendly linking operation is possible without a need to perform operation of reading a predetermined dot pattern after once switching the input-output device to the linking mode by reading a dot pattern for linking. As an embodiment of operation of this link button, touching, sliding, pushing and long pressing may be considered.

If content data has already been associated and registered with other dot pattern, the control unit 27 may control to associate the content data with only newly read dot pattern, or to associate the content data with both the already associated dot pattern and newly read dot pattern. Association may be performed according to the use purpose, such as, defining only one content data with one dot pattern or outputting the same content data from two or more dot patterns.

It should be noted that, if it is desired to link content data while inputting the content data using the input unit 17, an input button for starting input that is separately provided is operated, and the button is operated again as a toggle button when finishing the input, whereby the costs can be reduced in a simple design with a decreased number of buttons. It will be appreciated that, if it is desired to finish input without linking content data that is being input, which is done by operating either the input button or the dot pattern for ending input.

In this way, it is possible that, while using the input-output device, for example, as a video camera, a digital camera, a mobile telephone, an audio recording device and the like, a dot pattern is touched in arbitrary timing to associate and register the input motion picture/image data and audio data with the touched dot pattern to the link table, then, when the dot pattern is read again, the associated and registered image/motion picture data and audio data is output through the output unit. Here, if a writing area is provided next to an icon where a dot pattern is superimposingly printed, as the feature of the shooting location or notes can be directly written in the writing area, a convenient input-output function can be realized, such as, inputting and outputting motion picture/image data and audio data while having convenience as a paper medium, when compared with general video cameras, digital cameras, mobile telephones, and audio recording devices.

In addition, when a plurality of dot patterns are read while operating the link button in the middle of inputting content data by the input device 17, if the content data is divided and linked according to the number of reading of the content data and time intervals of reading of the plurality of dot patterns, and one or a plurality of dot patterns are immediately read while operating the link button after finishing the input, content data that is input from starting to ending input can be linked to the one or plurality of dot patterns without being divided. It should be noted that if the content data is linked to a dot pattern immediately after being divided and linked, the input-output device may be set to link either the series of content data that are input from starting till ending the input or only content data that is lastly input after being divided.

Operation for linking the same content data to a plurality of dot patterns (multi-linking) can be performed by a multi-link start button and a multi-link end button that are separately provided on the input-output device.

That is, when the multi-link start button is operated, the input-output device is switched to a multi-link mode, then, after linking to a plurality of dot patterns, the multi-link mode may be terminated by the multi-link end button.

The input-output device that is switched to the multi-link mode, can continuously link the same content data to dot patterns by continuously reading predetermined dot patterns. In this mode, as the end of linking is required to be defined, it is preferable that the user operates the multi-link end button and the control unit 27 recognizes the operation to finish the multi-link mode.

Alternatively, the multi-link mode can be terminated when a dot pattern associated with other operation instruction other than the predetermined dot patterns is read. After finishing this multi-linking, the content data can be output by reading the predetermined dot pattern that is associated and registered with the content data, and the same content data is output from the dot patterns that were linked during the multi-link mode.

In addition, as described above, switching to and ending the multi-link mode can be performed by an operation instruction that is associated and registered in a dot pattern. Operation based on the operation instruction that is associated and registered with a code value and/or a coordinate value that is converted by the processing unit 12 may be performed by providing a dot pattern for starting/ending multi-linking on a medium used by a user and reading the dot pattern by the optical reading unit 33.

In this way, there is no need to read a dot pattern for linking for each time linking the content data with a predetermined dot pattern and switching the operation of the input-output system to the link mode, allowing easier and convenient multi-linking of the same continuous content data to different dot patterns.

Further, when linking different content data to a predetermined dot pattern in the multi-link mode, the content data may be selected and linked by button operation and the like. Also, content data that is reproduced by reading a dot pattern to which the content data has already been linked may be linked to one or a plurality of dot patterns. In such a case, it is possible to realize user-friendly operation by setting, such as, that a content is reproduced when a predetermined dot pattern that has been linked to the content data or a dot pattern that is dedicated for reproducing is read, and only a predetermined dot pattern that has not been linked can be linked, or a content reproduced by reading a dot pattern that is dedicated for reproducing can be linked to a predetermined dot pattern no matter if the content data has already been linked or not. That is, the condition for reproducing a content when a dot pattern is read in the multi-link mode and the condition of which predetermined dot pattern can be linked to should not conflict.

In this way, by the operation of reproducing a content by reading a dot pattern and linking the content to a predetermined dot pattern, reproducing/multi-linking of different contents can be repeated any number of times while in the multi-link mode.

It should be noted that, by using either a dot pattern for starting multi-linking or a dot pattern for ending multi-linking as a toggle, starting and ending of multi-linking may be alternately operated for each time reading the dot pattern. In such a case, of course, it is necessary to clearly indicate, to the user, being in the multi-link mode by sounds and light.

It should be noted that a link button, a multi-link start button, and a multi-link end button can realize respective functions using the same button by differentiating handling of the button, such as, long-pressing, double-pressing, and the like.

For example, pressing once may be a single mode, pressing twice (or long pressing) may be a multi-link mode, and pressing once while in the multi-link mode may be ending the multi-link mode. Also, by the operation of linking predetermined dot patterns by the input-output device while operating (pressing) a link button, one or a plurality of dot patterns can be linked while operating (pressing) the link button. In this way, the costs can be reduced in a simple design with a decreased number of buttons.

Content data that is associated and registered with a code value and/or a coordinate value of a predetermined dot pattern by such an operation instruction corresponding to a dot pattern or operation of a link button is output via the output unit 15 by reading the predetermined dot pattern again and referring to a link table and retrieving from the storage unit 10 by a control unit 27. It will be appreciated that it is possible to select operation based on an operation instruction corresponding to a dot pattern and switching by button operation in a variety of ways, and the technical scope of the invention includes an embodiment that can be obtained by combining, as necessary, technical means that are disclosed in different embodiments as well as the above-described embodiments.

Next, the following describes a case in which the input-output device has a function as a USB memory. In such a case, a USB button is provided on the input-output device, the control unit 27 recognizes whether or not the USB memory button is operated, the input-output device functions as a USB memory when the USB memory button is operated and the input-output device is connected to an information processing device such as a personal computer through a connection unit 38, and the storage unit 10 of the input-output device registers a link table that associates and registers a code value and/or a coordinate value and content data and/or an operation instruction, that is registered in the storage unit of the personal computer, and the content data and/or operation instruction.

It will be appreciated that it is possible to operate to mutually copy, transfer and delete a content that is registered in the storage unit 10 of the input-output device and a content that is registered in the storage unit of the personal computer each other. If the input-output device is already connected to the information processing device, the input-output device may function as a USB memory, when a USB memory button is operated in a normal mode for transmitting a code value and/or a coordinate value.

Also, when an install button is provided on the input-output device; a control unit 27 recognizes whether the install button is operated or not; and the input-output device is connected to an information processing device such as a personal computer or other input-output device by operation of the install button, a driver and/or content data registered in the storage unit 10 so as to use the input-output device by connecting with the personal computer may be automatically installed in the information processing device or the other input-output device. Similarly, when the install button is not operated upon connection, yet operated while recognizing a connection, the driver and the like that is registered in the input-output device may also be transmitted to the information processing device.

That is, if an install button or a USB memory button is provided on the input-output device, the control unit 27 recognizes whether or not such a button is operated, and the corresponding processing is performed. If the connection recognition unit 22 recognizes a connection with an information processing device through a connection unit 38 when none of the buttons is operated, the control unit 27 transmits a code value and/or a coordinate value that are converted by the processing unit 12 to the information processing device through the connection unit 38, and, if the connection recognition unit 22 recognizes operation of the install button upon or during a connection, a driver and/or content data for using the information input-output device by connecting with the information processing device is automatically installed to the information processing device. This driver and/or content data is stored in the storage unit 10.

When operation of the USB button is recognized upon or during connection, the information input-output device functions as a USB memory, a link table that associates and registers a code value and/or a coordinate value and content data and/or an operation instruction and the content data and/or operation instruction that are registered in the storage unit of the information input-output device or the storage unit of the information processing device, are mutually copied/moved/deleted between the storage unit of the input-output device and the storage unit of the information processing device.

In this way, it is easily performed to copy a link table and content data that are registered in the personal computer side to the input-output device, and copy content data input by the input unit of the input-output device and the created link table to the information processing device.

It is also possible to switch processing, instead of operation of an install button and a USB memory button, by a dot pattern for installing formed on a medium surface or a code value and/or a coordinate value that is retrieved by converting the dot pattern for USB memory. That is, this is a case in which the storage unit 10 registers a link table that associates and registers a code value and/or a coordinate value with the above-described operation instruction (for switching operation), and operation based on the registered operation instruction is performed after obtaining the value and when the input-output device is connected with the information processing device. It will be appreciated that such operation can be performed by reading the dot pattern in the middle of recognizing a connection.

In this way, the processing of the input-output device can be switched while seeing and recognizing user-friendly descriptions using visual information such as pictures and icons formed on a predetermined medium surface (in most of the cases, formed around or by superimposing on the dot pattern for installing and the dot pattern for USB memory), whereby even younger and older persons who have difficulty with performing processing using buttons can easily perform operation.

As such, the feature of the present invention is to concurrently serve both a function as an input-output device that can be used alone and a function as an input-output device that depends on applications of the information processing device side when connected with the information processing device.

As for the method of switching the functions, the switching can be performed, as well as based on the existence of a connection with the information processing device through the connection unit 38, by immediately switching based on an operation instruction that is associated with a code value and/or a coordinate value corresponding to the read dot pattern, and by providing a predetermined operation button.

In such a case, the operation instruction may be created so as to automatically perform a wireless communication to connect with the information processing device upon switching, or the input-output device stands by after being switched to a mode depending on applications of the information processing device side, and code values and/or coordinate values that have been read so far may be transmitted to the information processing device upon a connection with the information processing device through a USB cable and other communication means. The connection by a wireless communication may be performed by providing a connection button on the input-output device, or based on an operation instruction in the link table that is associated with the code value and/or coordinate value converted from the dot code by touching a dot pattern on the medium surface.

Next, the following describes a case in which operation of the input-output device is switched by a content registered in the storage unit 10.

In such a case, it is considered that switching of operation is performed based on whether or not a code value and/or a coordinate value corresponding to a dot pattern read by the optical reading unit 33 is associated with content data and/or an operation instruction and registered in the link table in the storage unit 10.

For example, in a case in which the input-output device recognizes a connection with the information processing device, if the link table does not register content data or an operation instruction corresponding to a code value and/or a coordinate value, or no content data or operation instruction is registered in the storage unit 10, the code value and/or coordinate value converted by the processing unit 27 is transmitted wiredly or wirelessly through the connection unit 38 to the information processing device, and the corresponding content data is output by the information processing device. If content data or an operation instruction corresponding to a code value and/or a coordinate value is registered, or the content data or operation instruction itself is registered in the storage unit 10, content data corresponding to the code value and/or coordinate value converted by the processing unit 27 is output or operation based on the operation instruction corresponding thereto is performed by the input-output device alone.

When a connection with the information processing device is not recognized, if the link table does not register content data or an operation instruction corresponding to a code value and/or a coordinate value, or no content data or operation instruction is registered in the storage unit 10, the control unit 27 automatically starts a wireless communication to connect with the information processing device through the control unit 27, and transmits the code value and/or coordinate value converted by the processing unit 27 to the information processing device after recognizing the connection.

In this way, when connected with the information processing device, if there is no need to transmit an operation instruction for outputting content data corresponding to the code value and/or coordinate value to the information processing device, information is input and output only by the input-output device, and if a code value and/or a coordinate value is not associated with the content data and/or the operation instruction and registered in the link table, the code value and/or coordinate value can be transmitted to the information processing device and outputting of a content or accessing WEB may be performed by referring to a link table in the information processing device.

In this way, an advantage is provided that, while minimizing the number of connections with the information processing device, the storage unit of the information processing device side that can register a large volume of content data can be effectively utilized.

Further, when transmitting a code value and/or a coordinate value to the information processing device, it is possible to download the content data and the link table therein to the storage unit 10 of the input-output device.

Outputting of content data relating to the transmitted code value and/or coordinate value may be performed by the input-output device in accordance with the characteristic of the content data or by the information processing device.

Further, if the volume of content data is too large to expect to be registered in the storage unit 10 of the input-output device, or latest data is required to be obtained from a network, it is possible to define the operation instruction associated with the code value and/or coordinate value as processing of starting a communication connection with an adjacent information processing device, and outputting a large volume of data that is registered in the storage unit of the information processing device from the input-output device, the information processing device, or a content data output device connected with the information processing device, or as processing of downloading associated content data by browsing WEB through the information processing device.

In this way, not only based on whether or not content data or an operation instruction is registered in the storage unit, but also based on the content of the operation instruction, that is, based on the operation instruction that is associated with the code value and/or coordinate value converted by the processing unit and registered in the link table, operation can be switched to whether transmitting the code value and/or coordinate value converted by the processing unit to the information processing device through the connection unit, outputting the content data from the output unit, or controlling operation based on the operation instruction.

In this way, by switching processing of the input-output device by reading a dot pattern, instead of operation of a button provided on the input-output device, there is an advantage in production that there is no need to create each button for switching processing. That is, by providing, on WEB, data that stores an operation instruction for switching processing, or delivering a manual book for easily switching processing or a paper controller, without producing and selling an input-output device with an additional button, a set of input-output device that can switch a variety of processing by itself can be realized and provided. As a specific example, it is possible that, while listening to an audio explanation using a printed medium adopted for a speaking pen (reproducing sounds by itself), such as educational materials and how-to books, an WEB icon on the paper surface of a paper controller is read to switch the operation of the input-output device, then, a dot pattern that is superimposingly printed with a URL on the surface of the printed material is read to access the corresponding WEB by transmitting a code value and/or a coordinate value that is converted from the dot code to the information processing device. It will be appreciated that an WEB icon may be provided on the printed medium surface instead of using a paper controller. Further, while reading a dot pattern from a URL on the printed medium surface, associating the converted code value and/or coordinate value with an operation instruction for switching, and switching operation of the input-output device, the converted code value and/or coordinate value may also be transmitted to the information processing device. In this way, an icon dedicated for switching is not necessarily provided. Ending of switching may be performed by switching to the speaking pen that is used alone using the icon for switching again or using an icon for ending switching, or automatically switching by reading a dot pattern adopted for the speaking pen (for reproducing sounds) on the printed medium.

Also, as the processing of the input-output device can be switched while seeing user-friendly visual information such as a picture or an icon formed on a predetermined medium surface, older and younger persons with a difficulty of conducting processing using buttons can easily perform operation.

As described above, for example, a microphone as an input unit 17 can be used to input sounds later on, it is possible to register a voice of a user or a friend thereof related to a printed material, such as a picture book, in the information input-output device, then, read the printed material with this information input-output device, whereby other persons can listen to the sound information corresponding to the content of the printed material. For example, the invention can be used as "a message device for a parent and a child," or as "a photograph that contains a voice message."

The main body processing unit 11 of the input-output device can output or execute external content data or operation instruction by connecting a communication card 16 to the connection unit 38. For example, the dot pattern input by a camera unit 599 is analyzed and a code value and/or a coordinate value converted from the dot code can be transmitted to a computer 23 such as a server through the communication card 16.

Also, it is possible that the dot code that is defined in the dot pattern input by the camera unit 599 is transmitted to the server 23 and the like through the communication card 16, the dot code is converted to a code value and/or a coordinate value, and corresponding content data and/or operation instruction is received. Then, by connecting the communication card 16, the content data and/or instruction operation can be registered in the storage unit 10.

Using the communication card 16 in this way, content data and/or operation instructions can be easily transmitted and received. For example, the input-output device can be used to answer a questionnaire by voice and this sound information can be transmitted to a computer such as a server 23. It is possible that a questionnaire or a test is answered by voice, and a pronunciation test or a correction can be performed by transmitting the sound information to the computer such as the server 23.

Further, it is possible to configure that an Web site is automatically accessed by embedding the URL information in a dot pattern portion of a printed material or other mediums, and scanning the dot pattern or a specific operation is performed after the connection.

Also, a publication that emits sounds can be made by a user himself/herself. A picture post card and a letter printed with dot patterns can be added (linked) sound information later on. For example, BGM (back ground music), SE (sound effects), and the like can be added (linked) to these printed materials later on.

By further providing a GPS 24 to this main body processing unit 11, the present position information can be easily displayed.

The input-output device having the above-described functions operates the connection recognition unit 22 by a control unit 27 equipped in the main body processing unit 11, and recognizes that the input-output device is connected wiredly or wirelessly to an information processing device through a connection unit 38 (including infrared communications, optical communications, BLUETOOTH (registered trade mark), ZigBee, and weak radio waves)

When, by the control unit 27, the connection recognition unit 22 recognizes a connection with an information processing device through the connection unit 38, the control unit 27 transmits a code value and/or a coordinate value converted by the processing unit 12 to the information processing device through the connection unit 38. When the connection recognition unit 22 does not recognize a connection between the connection unit 38 and the information processing device, content data registered in the storage unit 10 is output from the output unit 15.

When a control code for controlling an electronic device is registered in the storage unit 10 instead of content data, the control unit 27 converts a corresponding control code to one or a plurality of optical signals or wireless signals by referring to a corresponding link table, and outputs the one or plurality of optical signals or wireless signals from the output unit 15. The optical signal includes communications using an infrared method, and the wireless signal includes communications using an RF method and BLUETOOTH (registered trade mark).

In this way, the input-output device can have a function as an input-output device that can be used alone in a condition in which the information processing device is not connected, and, when connected with the information processing device, the input-output device can function as an input-output device that depends on applications of the information processing device side. The electronic device for outputting includes any home appliances such as TVs, STBs, video recording/playback devices, audio recording/playback devices, and air conditioners, mobile telephones, PDAs, PCs, game machines, and toys. It will be appreciated that these electronic devices may be used as the information processing device.

Next, examples of dot code formats, link tables, content data, operation instructions are shown in FIGS. 2A to 3E. FIGS. 2A and 2B are diagrams showing a relationship between dot codes and code values and/or coordinate values. FIGS. 3A to 3E are diagrams showing a relationship between code values and/or coordinate values and content data and/or operation instructions.

FIG. 2A shows an example of a dot pattern that has displacement of eight directions for one information dot, that is, information amount of 3 bits. FIG. 2B shows examples of a variety of dot code formats including the definitions of X and Y coordinate values. For example, C0 to C8 define an X coordinate value, C9 to C17 define a Y coordinate value, and C18 to C37 define a Z coordinate value. When a dot pattern is read, these values are automatically converted from the dot code.

Based on these formats, FIGS. 3A to 3E show link tables that associate and register code values and/or coordinate values and content data and/or operation instructions. In this example, audio data A is associated and registered with relation to an X coordinate value, a Y coordinate value, and a Z coordinate value converted by the dot code in FIG. 3A. When the dot pattern is read, audio data is started to be reproduced.

Since this format also defines a Z coordinate value, if the medium formed with dot patterns is a three-dimensional map, audio data including the altitude of the read portion can be reproduced. For example, when the mountaintop of Mount Fuji is read, audio data of "The altitude is 3,776 meters, the average temperature of a day is 15 degrees Celsius" is reproduced.

In FIG. 3B, audio data B is associated and registered with a code value, an X coordinate value, and a Y coordinate value that are converted from a dot code, and, when the dot pattern is read, audio data B is started to be reproduced. As this format does not define a Z coordinate value, this format is preferably used for defining a position of the surface of a curved surface body (e.g., a spherical object) with a certain radius.

Alternatively, a code value may be associated with an operation instruction for starting inputting sounds as shown in FIG. 3C, or variants as shown in FIGS. 3D to 3E can be considered. Also, content data includes a variety of data, and, for example, there are images, video images, sounds, and text data that correspond to visual information superimposingly printed with the read dot pattern, or the title, author, page number of the printed material printed with the dot pattern.

The operation instruction can define a variety of instructions for operating the input-output device and the information processing device, and can cause the information processing device to browse a WEB, increase or decrease an audio volume, switch to the link mode, start and end input of content data (start and end recording sounds), start a connection with the information processing device and start a shut down, and can cause to execute other operation. The operation instruction can also cause switching to a mode in which the input-output device alone outputs content data or inputs sounds and the like, and switching to a mode in which the input-output device does not output content data by itself and only transmits a code value and/or a coordinate value to the information processing device. When a dot pattern associated with such an operation instruction is read before reading another dot pattern, the control unit 27 controls whether to process a code value and/or a coordinate value that is defined in the another dot pattern by the input-output device itself or to transmit the code value and/or coordinate value to the information processing device to be processed by the information processing device according to the mode of the input-output device.

Figure 4:
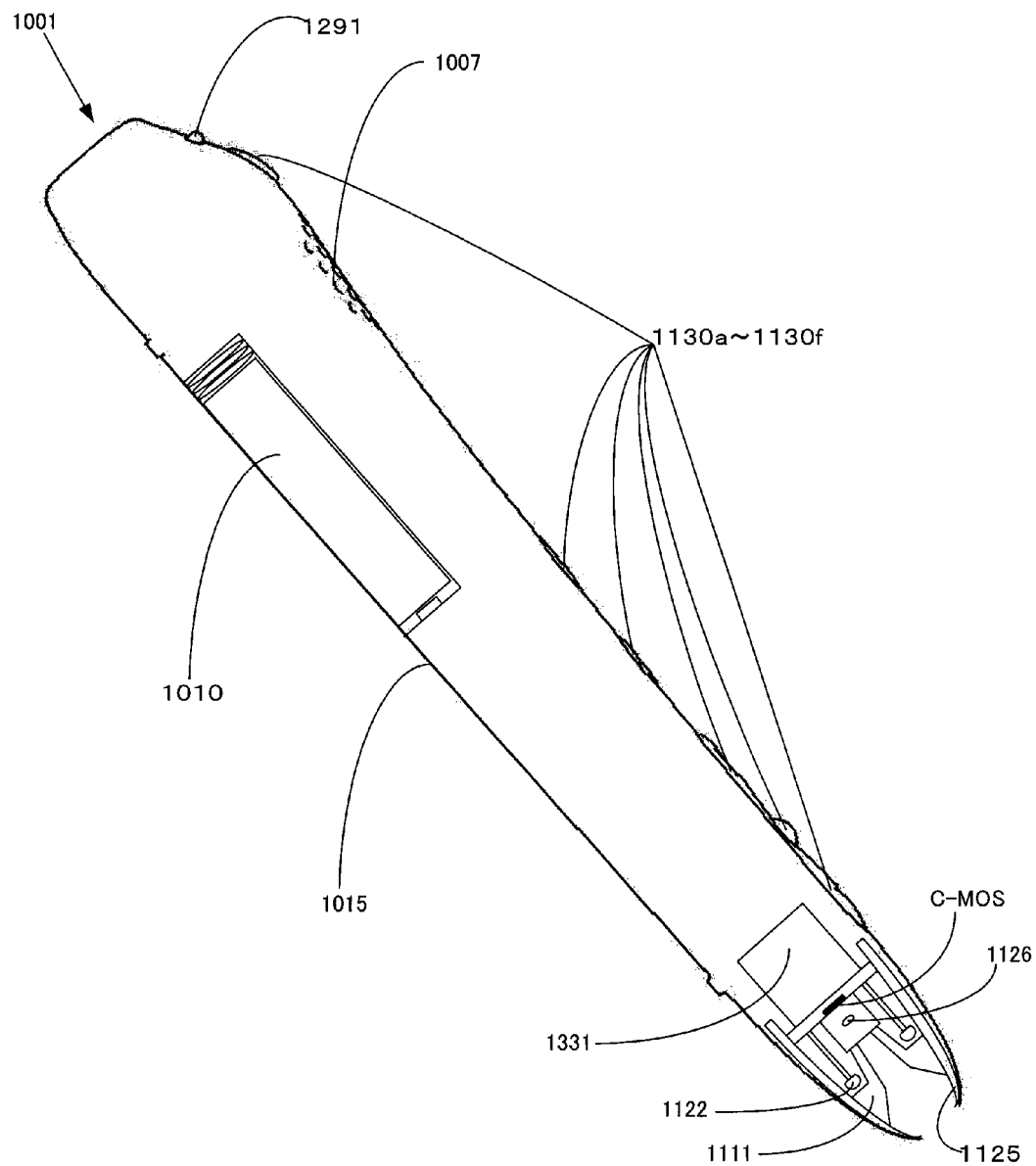
FIG. 4 is an explanatory view showing a configuration of the pen type scanner.

In FIG. 4, the input-output device is housed in a pen-shaped case 1050, as a pen type scanner 1001.

The case 1015 incorporates a battery 1010, a speaker 1007, and a PCB 1331. The central processing unit (CPU) and a memory are assembled and mounted on the PCB 1331. Also, a microphone 1291 for inputting audio data is incorporated at the rear end of the case 1015 (the upper left portion in FIG. 4). While not shown in FIG. 4, a memory cartridge may also be detachably attached. As the memory cartridge registers operation instructions, content data or the like, and is detachable, the memory cartridge can be replaced with a ROM cartridge, a micro unit cartridge and the like.

Buttons 1130a to 1130f are provided on the surface of the case 1015, and can control starting/ending reading, starting/ending recording sounds, reproducing/stopping sounds, adjusting an audio volume, dividing content data, deleting content data, switching to the link mode, and the like. It will be appreciated that, in addition to or instead of the buttons, the above-described install button and USB memory button may be provided, or the buttons 1130a to 1130f can have such functions according to predetermined operation methods (e.g., touching, sliding, long-pressing).

Sounds can be recorded by a microphone 1290 by pressing the record button among the buttons. The recorded audio data is stored in the memory cartridge. The association of the sound to the dot pattern portion is released by scanning the dot pattern portion while pressing the delete button. It should be noted that, in such a case, the audio data may be kept being stored in the memory cartridge.

In FIG. 4, a C-MOS camera unit and a tapered nose 1125 are provided at the leading end of the case 1015 (the lower right portion in FIG. 4), along the vertical axis of the medium surface when the case 1015 abuts the medium surface by inclining approximately 45 degrees. A lens 1126 of the C-MOS camera unit is attached in the inner space of the nose 1125 in a manner that the lens 1126 faces the space so that the window portion at the leading end of the nose 1125 can be imaged.

The IRLED 1122 is equipped in the inner space of the nose 1125 so that the irradiation light from IRLED 1122 enters a diffuser 1111. The diffused elements of the irradiation light (optical elements of larger degree than 45 degrees with relation to the optical axis) are emitted outside through the wall surface of the diffuser 1111. Then, the straight elements of the irradiation light (optical elements of smaller degree than 45 degrees with relation to the optical axis) are reflected off the wall surface of the diffuser 1111 and proceed inside the tube. Only the elements of the irradiation light that are generally parallel to the optical axis inside the diffuser 1111 are irradiated to the opening portion of the nose 1125 from the leading end surface.

In this way, as the irradiation light becomes converging light that is parallel to the optical axis by passing the meander-line diffuser 1111 that is made of transparent resin, an even light volume can be provided to the entire area of the opening portion of the nose 1125. In this embodiment, as there is no dark part in the surrounding portion as the one that is generated when diffused light is used, accuracy of reading the dot pattern portion can be enhanced.

FIGS. 5A to 5C illustrate a configuration in which a liquid crystal display portion 1131 and a speaker 1007 are provided in the pen type scanner 1001.

The liquid crystal display portion 1131 displays content data that is associated with a code value and/or a coordinate value converted from the read dot code and texts and figures that describe the specifics of the operation instruction. It is also possible to display time and a calendar, further, an image captured by a camera separately provided as an input unit.

By providing a display on the input-output device itself in this way, users can visually confirm which mode the input-output device is in. Also, information, such as a remaining memory level, a remaining battery level, and content data, is displayed to realize a convenient input-output device. The liquid crystal display unit 1131 is preferably set the level of the resolution, the size of the display, and the like according to the characteristics of information to be displayed.

Figure 6A:
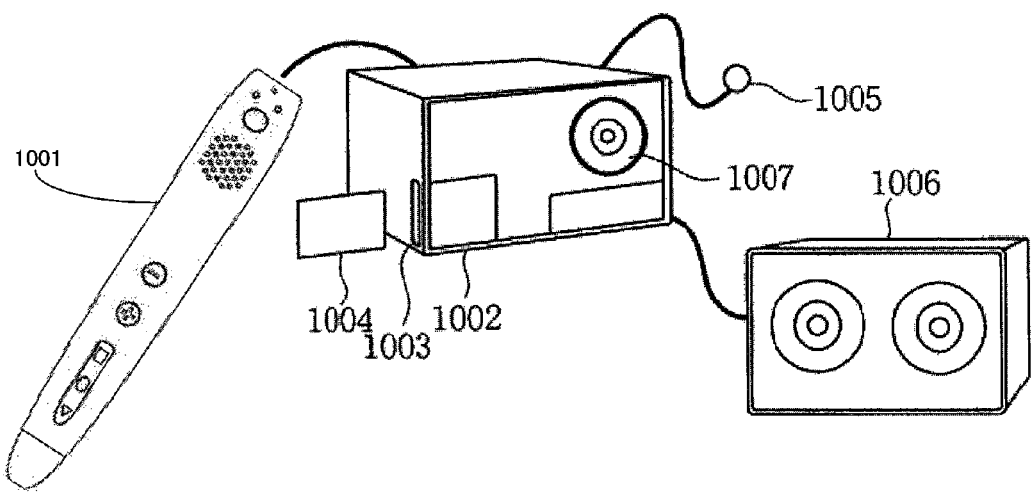
FIGS. 6A and 6B are diagrams showing a use example of the embodiment.
Figure 6B:
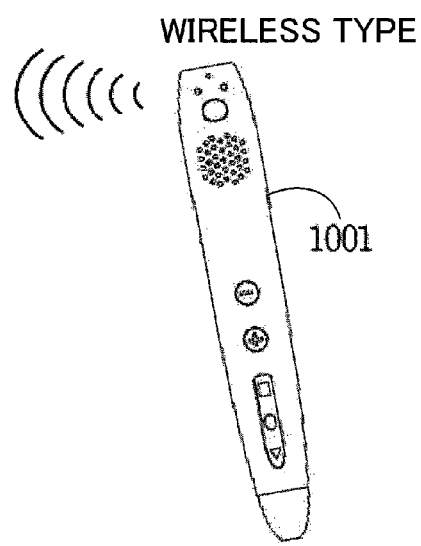

In FIGS. 6A and 6B, such a pen type scanner 1001 is connected with the information processing device 1002. In FIGS. 6A and 6B, the information processing device 1002 comprises a memory card slot 1003, allowing insertion of a memory card 1004 that registers audio data and programs. Also, the information processing device 1002 is connected with a microphone 1005 so that audio data from outside can be registered in the memory of the information processing device. The audio data can be output through the speaker 1007 of the information processing device 1002 or the sound generation device 1006 connected with the information processing device 1002.

It should be noted that, while the pen type scanner 1001 and the information processing device main body are connected with a cable in FIG. 6A, a wireless interface may be incorporated in the scanner to wirelessly communicate with the information processing device 1002 as shown in FIG. 6B.

Figure 7:
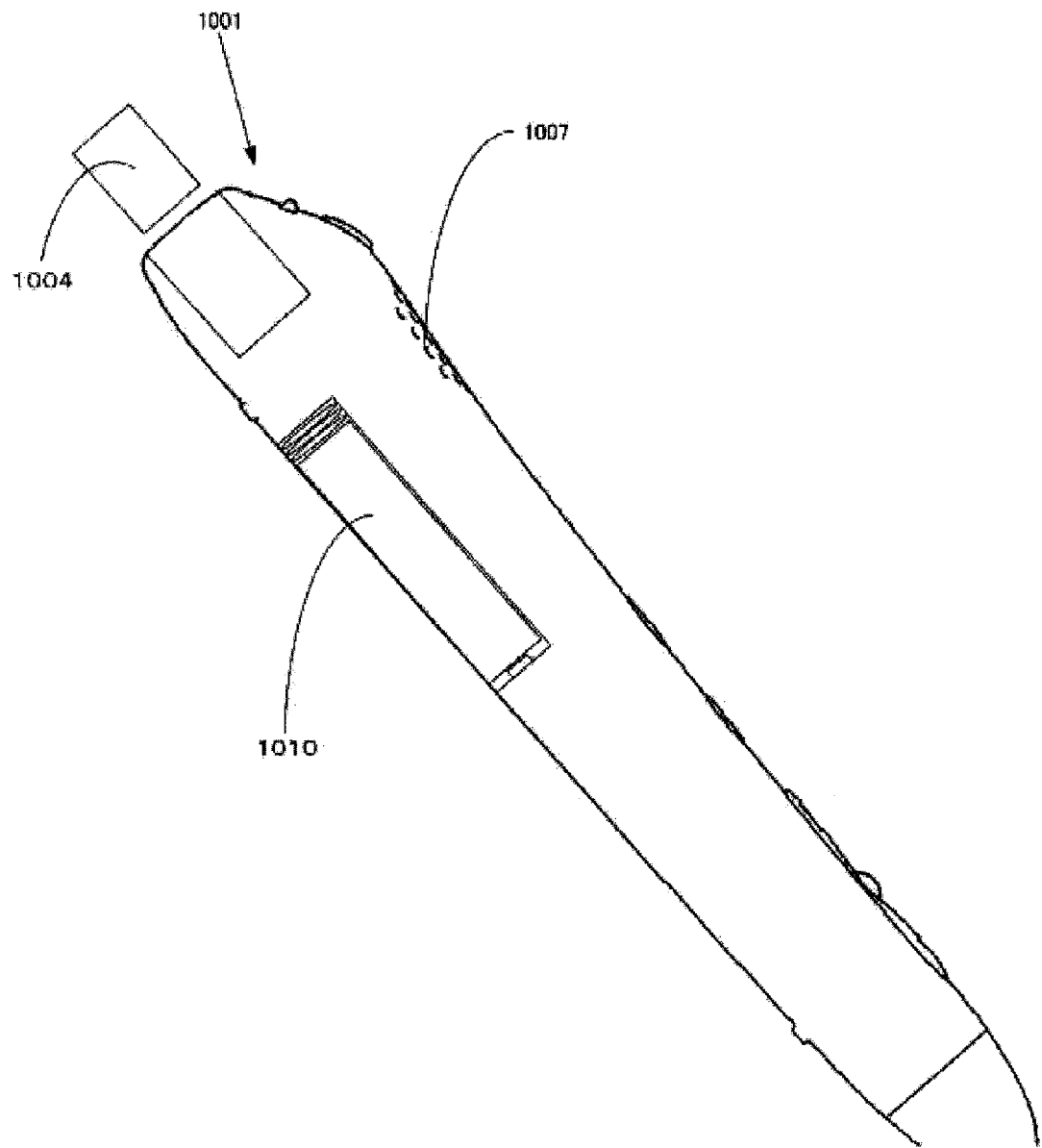
FIG. 7 is a diagram showing a variant of the pen type scanner.

FIG. 7 shows a variant of the pen type scanner. As shown in FIG. 7, the pen type scanner 1001 comprises a detachable battery 1010 and a speaker 1007, and is configured to load an SD card, a memory stick, or a memory card 1004 such as Smart Media.

It should be noted that the battery can be charged by wirelessly or wiredly connecting with the information processing device.

Figure 8A:
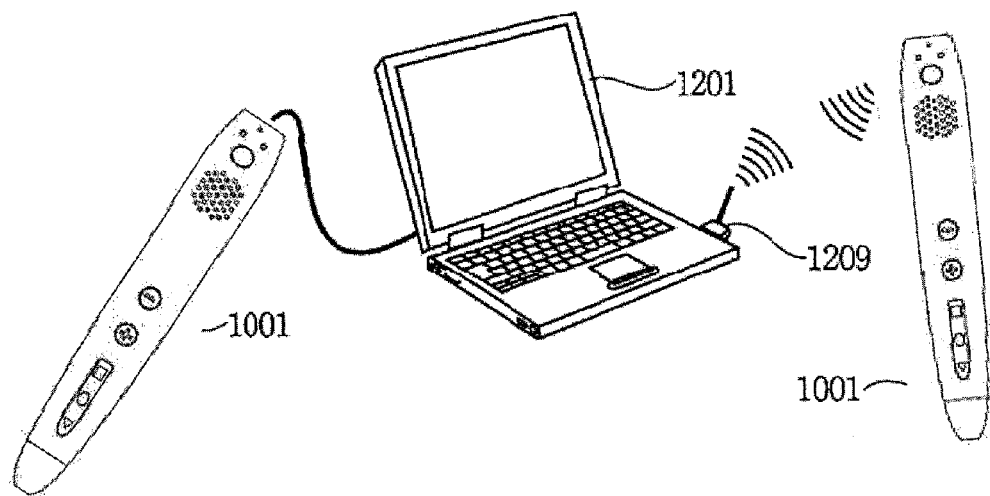
FIGS. 8A and 8B are diagrams showing use examples of the embodiment.

In FIG. 8A, the pen type scanner 1001 is connected with a personal computer 1201 through a USB cable. For the connection between the pen type scanner 1001 and the personal computer 1201, in addition to using a USB interface, a serial interface of RS-232C, LAN interface, IEEE 1394 interface and the like may also be used.

In addition, the personal computer can be wirelessly connected with the pen type scanner 1001 by attaching a wireless interface card 1209 to the personal computer. BLUETOOTH (registered trademark), wireless LAN and the like may be used for the wireless communication. Also, the pen type scanner 1001 and the personal computer 1201 may also be connected using an optical interface, such as an infrared communication, in addition to the wireless interface.

Figure 8B:
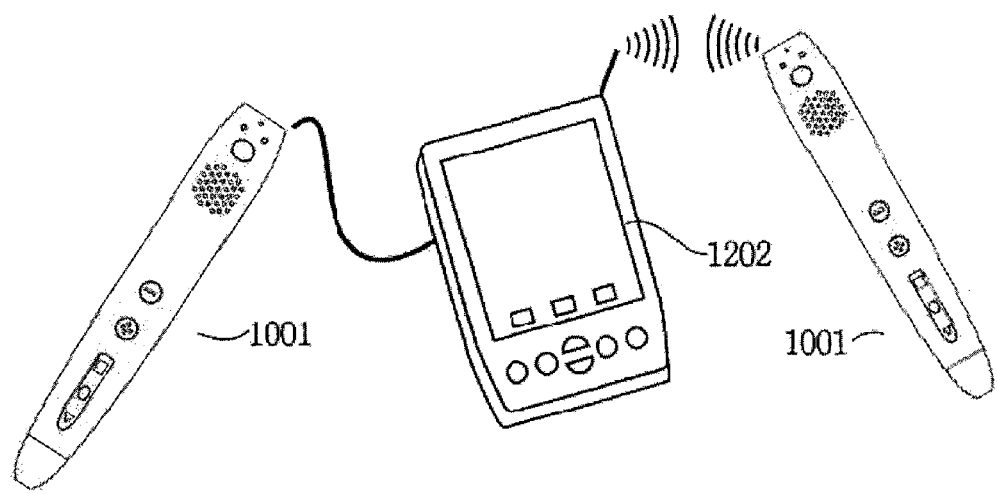

FIG. 8B is a diagram in which a pen type scanner 1001 is connected with a PDA 1202 with a cable. The connection between the PDA 1202 and the pen type scanner 1001 may also be realized by a wireless connection and an optical communication connection as well as a wired connection.

Figure 9A:
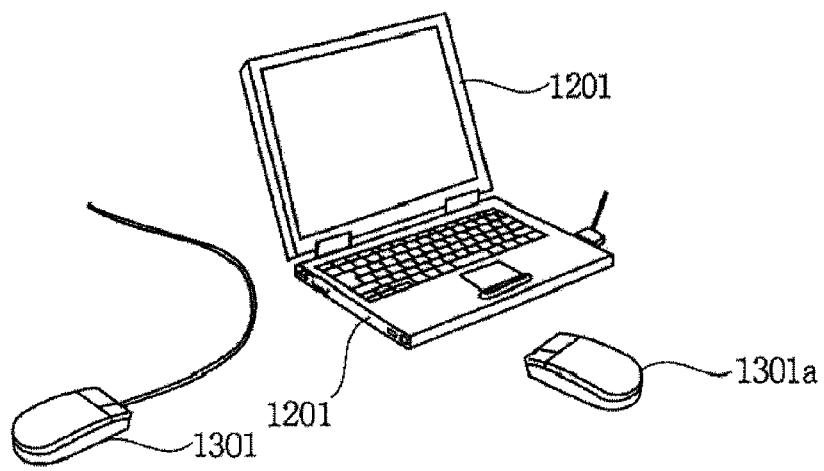
FIGS. 9A to 9C are diagrams showing use examples of the embodiment.

FIG. 9A shows a connection with a personal computer 1201 when the input-output device has a function as a mouse. As shown in the example, while the mouse type scanner 1301 is generally connected with a personal computer 1201 with a cable through a USB interface, a wireless connection may also be used.

When connected with the personal computer 1201, the mouse type scanner 1301 can also function as a mouse of the personal computer. That is, the functions are performed by providing a switch that can switch: a normal mode in which a code value and/or a coordinate value of a dot pattern upon reading the dot pattern is transmitted to the personal computer 1201, and the information processing device executes output of corresponding content data or operation instruction; and a mouse mode in which the mouse type scanner functions as a mouse by converting a code value and/or a coordinate value of a dot pattern upon reading the dot pattern, coordinate values from the start point to the end point of dot patterns upon reading by skidding on the dot patterns, or the increased amount calculated based on the coordinate information of the plurality of skidded and read points into a mouse operation code corresponding to the code values and/or coordinate values and transmitting the mouse operation code.

When the input-output device functions as a mouse in a normal mode, the input-output device transmits the code value and/or coordinate value that is defined in the dot pattern to the information processing device, and the information processing device converts the transmitted code value and/or coordinate value into a mouse operation code by referring to the link table. To recognize the movement of the mouse, coordinate values of a plurality of points or code values and coordinate values are continuously transmitted.

When in the mouse mode, the input-output device converts a code value and/or a coordinate value into a corresponding mouse operation code that is registered in the link table of the storage unit, and transmits the converted mouse operation code to the information processing device. It should be noted that, while the mouse type scanner 1301 preferably has a mouse button, a dot pattern formed on a medium as a mouse button may also be used. It will be appreciated that operation of the mouse button is converted to a mouse operation code and transmitted to the information processing device.

The mouse operation code is a code standard that defines, in advance, mouse operation, keyboard operation, and tablet operation for controlling the information processing device, and can cater to a variety of standards, such as an ASCII code and HID code for an input device.

The normal mode and the mouse mode can be switched based on an operation instruction associated and registered with a code value and/or a coordinate value. Similarly, switching can also be performed by operation of a mouse mode switch start/end button. The click operation when functioning in the mouse mode, may be assigned to any one of the buttons separately provided on the mouse type scanner 1301 or performed using a dot pattern formed on a medium. Also, the input-output device can be charged by connecting with a personal computer 1201.

The normal mode is a mode in which a code value and/or a coordinate value converted by the processing unit is transmitted without being converted to other codes, and processing corresponding to the code value and/or coordinate value is performed by an application of the information processing device side. It should be noted that the code value and/or coordinate value are often encrypted and transmitted. Also, a variety of additional information such as a rotation angle of a dot pattern upon reading of the dot pattern by the optical reading unit (axial rotation of the optical reading unit), brightness (inclination angle of the optical reading unit with relation to the medium), and a state code including error information, may also be transmitted.

It will be appreciated that, while the input-output device is configured as a mouse type scanner 1301 of a general mouse shape in FIG. 9A, the input-output device may take the above-described pen shape or other shapes.

Figure 9B:
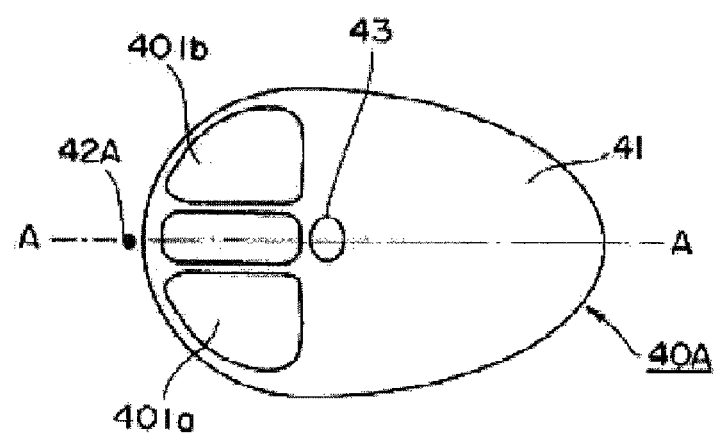
Figure 9C:
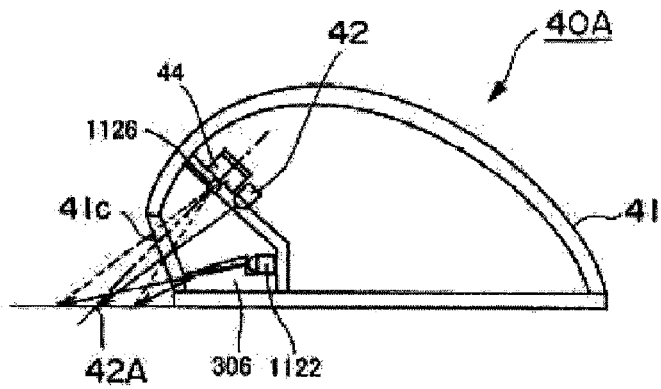

Next, other examples of the mouse type scanner are shown with reference to FIGS. 9B and 9C.

The mouse 40A shown in FIGS. 9B and 9C comprises: an IRLED 1122 as an irradiation optical source that irradiates light to a medium surface on which dot patterns are formed; a lens 1126 for causing the light reflected off the dot pattern to enter, a mouse body 41 on which is formed an opening portion 41c as a mouth of irradiation light from the IRLED 1122 and reflection light from the medium surface X; a pointer light source 42 that irradiates a reading point 42A on the medium surface on which dot patterns are formed through the opening 41c; a light guide 306 that is disposed forward of the irradiation direction of the IRLED 1122 and which internal side functions as a light path; and a CCD camera 44 (or a C-MOS camera). The mouse 40A irradiates the irradiation light of the IRLED 1122 to the dot pattern, while irradiating pointer light from the pointer light source 42, and reads the dot pattern using the reflection light of the irradiation light. It should be noted that the opening portion 41c may be attached with a cap component made of glass plate or transparent plastic plate to prevent dusts from coming inside the mouse.

As the reading point 42A on the medium surface is irradiated by the pointer light source 42, the position of a readable dot pattern can be correctly recognized and the mouse 40A can be appropriately operated for the dot pattern to be read. It should be noted that the mouse 40A comprises a switch 43 for activating a reading function, on the outer periphery of the mouse body 41, so that the reading function can be activated only when needed. Here, the general mouse function can be stopped by operation of the switch 43, and any one of left and right mouse buttons 401a, 401b may operate the reading function.

Also, without providing the switch 43 that activates the reading function, the reading function may be activated, for example, when simultaneously pressing both the left and right mouse buttons (401a, 401b).

Figure 10:
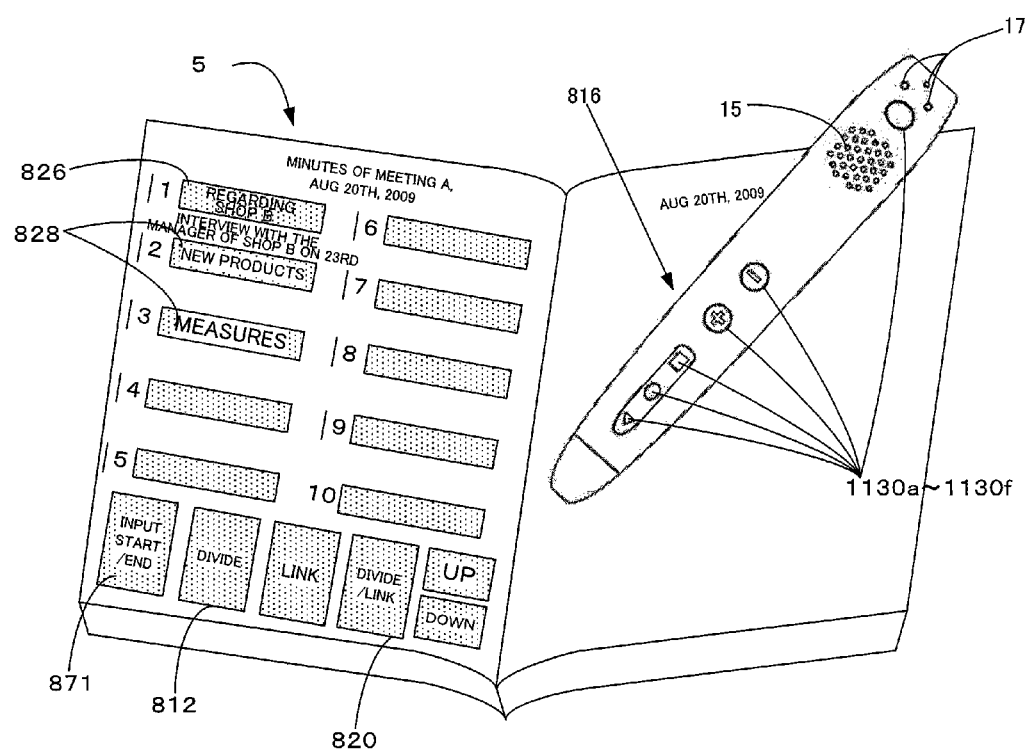
FIG. 10 is a diagram showing a relationship between the printed material and the input-output device.

Next, the following describes the case in which the input content data is divided and registered, and the case in which the divided and registered content data is linked to a plurality of dot patterns with reference to FIG. 10.

FIG. 10 is a diagram showing a relationship between a printed material 5 on which dot patterns are formed by printing and the input-output device 816 in a case in which content data is multi-linked.

As a procedure for dividing and registering content data, a user, first, starts inputting the content data by operation of an input start/end button or by reading a dot pattern for starting/ending input 871. That is, the content data is started being input by the input unit by operation of the input start/end button and/or by reading the dot pattern for starting/ending input 871 formed in a predetermined area on the medium surface using the optical reading unit. Any one of the buttons 1130a to 1130f provided on the input-output device 816 is used as the input start/end button, or, if a dot pattern is used for input, the dot pattern for starting/ending input 871 formed on the medium surface is read by the optical reading unit equipped on the input-output device 816, a code value and/or a coordinate value is converted into by the processing unit, and an input is started based on the operation instruction that is associated and registered with the code value and/or coordinate value. The inputting content data will be sequentially registered to the storage unit of the input-output device 816.

Next, while inputting content data, any one of the buttons 1130a to 1130f provided on the input-output device 816 is operated or a dot pattern for dividing 812 that is formed in a predetermined area on the medium surface is read by the optical reading unit according to the number of times of divisions desired by the user.

For example, if the divide button is operated twice (N times) while inputting content data, the control unit partitions content data that is input from starting the input until the first operation of the divide button as the first content data and registers in the storage unit. Then, the control unit partitions content data that is input from the first operation of the divide button until the second operation of the divide button as the second content data (the ith content data) and registers in the storage unit. Then, finally, the control unit partitions content data from the second operation of the divide button until operation of the button for starting/ending input or reading of the dot pattern for starting/ending input 871, in other words, until the end of the input of the content data, as the third content data (the N+1th content data) and registers in the storage unit.

That is, when operation of the divide button further provided on the input-output device 816 or reading of the dot pattern for dividing 812 formed in a predetermined area on the medium surface by the optical reading unit is performed for N times (N is a natural number), while inputting the content data, the control unit of the input-output device 816 partitions content data from starting input until when the operation of the divide button or reading of the dot pattern for dividing 812 formed in the predetermined area on the medium surface by the optical reading unit is performed as the first content data and registers in the storage unit. Then, when the divide button is operated or the dot pattern for dividing 812 formed in the predetermined area on the medium surface is read by the optical reading unit at least once while inputting the content data, content data from operation of the i−1th division until operation of the ith division is partitioned and registered in the storage unit as the ith content data. Finally, the input of the content data by the input unit ends by operation of the input start/end button or by reading the dot pattern for starting/ending input 871 formed in the predetermined area on the medium surface by the optical reading unit, and content data from operation of the Nth division until the end of the input of the content data is partitioned and registered as the N+1th content data.

It should be noted that, when dividing and registering content data, the control unit preferably registers the second file name that indicates content data that is subsequently divided and registered to the storage unit, in addition to the first file name that indicates the first to Nth respective content data.

For example, while, generally, the content data is registered in a content file with the first file name that indicates the content data itself, for the above-described first to third divided and registered content data, the second file name that indicates content data that is subsequently divided and registered is registered in the storage unit in addition to the first file name that indicates the unique content data.

That is, the content file of the first content data registers 'the first content data,' 'the first file name' that indicates the first content data, as well as 'the second content file name' that indicates the second content data that is subsequently divided and registered. The content file of the second content data registers 'the second content data,' 'the first file name' that indicates the second content data, and 'the second file name' that indicates the third content data. The content file of the third content data registers 'the third content data' and 'the first file name' that indicates the third content data.

In this way, an advantage is provided that even in recording videos and recording sounds of long hours, the content can be arbitrary divided and registered in terms of the themes, time, a variety of targets without interruption of recording, and, further, cueing and continuous output can be easily performed upon playback.

Further, according to the above configuration, upon the continuous output of the content data, without associating a code value and/or a coordinate value with the divided and input content data and registering to the link table, the read content file name stored in the content file can be instruction information that indicates whereabouts of the content data that is output after outputting desired content data. In this way, when continuously outputting content data in the above-described configuration, the link table registered in the storage unit may associate and register at least one set of a code value and/or a coordinate value and content data. It should be noted that, in addition to the first file name that indicates content data, the second file name that indicates content data to be subsequently registered can be arbitrary associated, regardless of the division and registration. Further, in addition to the first file name that indicates content data and the second file name that indicates content data that is subsequently registered, a third file name that indicates content data that is previously registered can be registered, and the content data can be reproduced in a reverse order.

Next, the following describes a procedure in a case in which divided and registered content data is multi-linked to predetermined dot patterns.

In such a case, similarly to the above-described procedure of dividing and registering content data, the user, first, starts inputting content data by operation of the button for starting/ending input or by reading the dot pattern for starting/ending input 871.

Next, during inputting the content data, the first predetermined dot pattern 826 is read by operation of a divide/link button further provided on the input-output device or by reading a dot pattern for dividing/linking 820 formed in a predetermined area on the medium surface by the optical reading unit.

Here, "the first predetermined dot pattern" refers to a dot pattern that is read first when linking a plurality pieces of divided and registered content data to a plurality of dot patterns. In this example, while the dot pattern formed in field 1 is defined as the first dot pattern 826, as the user links related content data to a flexible position, the first dot pattern is determined by operation of the user regardless of the formed position on the medium surface.

Similarly to the input start/end button, any one of the buttons 1130$a$ to 1130$f$ is used as a divide/link button. If the input start/end button and the divide/link button are desired to be functioned with one button, different button operations (long-pressing or pressing twice) may be performed for each desired function and processing. Also, an audio volume UP/DOWN button and a dot pattern for audio volume UP/DOWN that adjust the audio volume when inputting content data can also be provided.

If the first predetermined dot pattern 826 is read without performing the above-described operation for switching to the link mode, a normal operation is operated, that is, a link table that registers a code value and/or a coordinate value defined by the first dot pattern 826 is referred to, and whether or not content data and/or an operation instruction is associated and registered is confirmed. If the content data and/or operation instruction is registered, corresponding content data is output or operation based on the operation instruction is controlled, and, if not registered, processing for connecting with the information processing device starts.

When the first predetermined dot pattern 826 is read, the control unit of the input-output device 816 partitions content data that is input from starting the input until operation of the divide/link button or reading of the dot pattern for dividing/linking 820 that is formed in a predetermined area on the medium surface by the optical reading unit as the first content data and registers in the storage unit, associates a code value and/or a coordinate value that is defined by the first predetermined dot pattern 826 that is converted by the processing unit with the first content data, and registers the association between the code value and/or coordinate value and the first content data to the link table of the storage unit.

Next, the predetermined ith dot pattern 828 is read using the optical reading unit by operating the divide/link button or reading the dot pattern for dividing/linking 820 that is formed in the predetermined area on the medium surface by the optical reading unit while inputting content data.

By inputting content data using the input unit continuously after reading the predetermined first dot pattern 826, once the input starts, only by operating the divide/link button or reading the dot pattern for dividing/linking 820, and reading the ith predetermined dot pattern 828 one after another, the ith predetermined dot pattern 828 and the ith content data that is input after reading the first predetermined dot pattern 826 can be linked.

This "the ith predetermined dot pattern" is a concept corresponding to the first predetermined dot pattern 826, and is a dot pattern that is read to link content data after the predetermined first dot pattern 826. This ith predetermined dot pattern 828 and the first predetermined dot pattern 826 are together referred to as the above-described "predetermined dot pattern." The ith predetermined dot pattern 828 is arbitrary determined by the user in the same way as the first predetermined dot pattern 826, and the value of i increases according to the number of times of dividing/linking operation, such as, the second predetermined dot pattern is read after the first predetermined dot pattern 826, and the third predetermined dot pattern is read after the second predetermined dot pattern. Depending on the order of reading by the user, for example, the dot pattern on the field 1 of a printed material 5 becomes the predetermined first dot pattern 826 or the ith dot pattern 828.

When the ith predetermined dot pattern 828 is read, if the number of times of operation of the divide/link button is defined as N times (N is a natural number) including the time for reading the first predetermined dot pattern 826, the control unit of the input-output device 816 partitions content data from operation of the i−1th division until operation of the ith division as the ith content data and registers in the storage unit, associates the ith code value and/or coordinate value that is converted from the ith predetermined dot pattern 828 by the processing unit with the registered ith content data, and registers the association between the ith code value and/or coordinate value and the ith content data to the link table of the storage unit.

Then, finally, when the input of the content data by the input unit ends by operation of the input start/end button or by reading the dot pattern for starting/ending input 871 formed in the predetermined area on the medium surface by the optical reading unit, and the ith dot pattern 828 is read again by the optical reading unit, the link table is referred to and the corresponding ith content data is retrieved from the storage unit and output through the output unit. It should be noted that, to link a content from the last division/linking until the end of the input to the predetermined N+1th dot pattern, the divide/link button may be operated or the dot pattern for dividing/linking 820 formed in a predetermined area on the medium surface may be read by the optical reading unit, and, then, the predetermined N+1th dot pattern may be read. In this way, when the predetermined N+1th dot pattern 828 is read again by the optical reading unit, the link table is referred to and the corresponding N+1th content data is retrieved from the storage unit and output through the output unit.

That is, if operation of the divide/link button and reading of a predetermined dot pattern are respectively performed twice during inputting the content data, the control unit of the input-output device partitions content data from starting input until the initial operation of the divide/link button as the first content data and registers in the storage unit, associates a code value and/or a coordinate value that is defined in the first dot pattern 826 that is converted by the processing unit with the registered first content data, and registers the association between the code value and/or coordinate value and the first content data to the link table of the storage unit.

Subsequently, content data from the initial operation of the divide/link button until the second (Nth) operation of the divide/link button is partitioned as the second (ith) content data and registered in the storage unit, the second code value and/or coordinate value that is converted from the second (ith) predetermined dot pattern 828 by the processing unit and the registered second content data are associated, and the association between the second code value and/or coordinate value and the second content data is registered to the link table of the storage unit.

Then, finally, inputting of the content data by the input unit ends by operation of the input start/end button or by reading the dot pattern for starting/ending input 871 that is formed in a predetermined area on the medium surface by the optical reading unit. If the first to second dot patterns are read again by the optical reading unit, the link table is referred to, and the corresponding first to second content data is retrieved from the storage unit and output through the output unit. It should be noted that to associate the third content data that is input from the second operation of the divide/link button until the end of the input with the third (N+1th) predetermined dot pattern, the third (N+1th) predetermined dot pattern 828 may be read immediately after ending the input by operation of the divide/link button or by reading the dot pattern for dividing/linking 820 formed in the predetermined area on the medium surface by the optical reading unit. When the third dot pattern is read again by the optical reading unit later on, the link table is referred to, and the corresponding third content data is retrieved from the storage unit and output through the output unit.

In this way, it is possible that, in a meeting, for example, while using the input-output device as a voice recorder, a dot pattern is touched a plurality of times at arbitrary timing to associate and register the input motion picture/image data and audio data with the touched dot pattern to the link table, and, when the dot pattern is read again, the motion picture/image data and audio data that are associated and registered are output from the output unit. As the points or notes can be directly written in the medium printed with dot patterns with a writing material, the input-output device can have a useful inputting and outputting function, such as inputting and outputting motion pictures/images and sounds while retaining convenience as a paper medium when compared with conventional video cameras, digital cameras, mobile telephones, audio recording devices and the like.

In such a case, when associating and registering the ith predetermined dot pattern 828 and the ith content data to the link table, it is preferable to register a code value and/or a coordinate value that is defined in the ith predetermined dot pattern 828 in the link table in which a code value and/or a coordinate value that is defined in the first predetermined dot pattern 826 and the first content data are associated and registered. That is, it is preferable that the control unit associates code values and/or coordinate values that are defined in N+1 predetermined dot patterns and converted by the processing unit with the divided first to N+1th content data by a predetermined method, registers association between the code value and/or coordinate value and the divided content data to the link table of the storage unit, and, if the ith dot pattern 828 is read by the optical reading unit, refers to the link table, reads corresponding ith to N+1th content data from the storage unit with a predetermined method, and continuously outputs through the output unit.

In this way, continuous output of related content data becomes possible in such a way that, if the first predetermined dot pattern 826 is read, the first content data is output through the output unit, then, the ith content data is continuously output.

Also, according to the above configuration, as two or more pieces of content data are associated with one code value and/or coordinate value and registered in the link table, it is possible to continuously output content data that is associated and registered with the code value and/or coordinate value only by reading and analyzing one dot pattern and converting from the dot code.

Similarly, when the second predetermined dot pattern is read, the link table can be configured so as to continuously output the second content data, the third content data, and the fourth content data. It will be appreciated that the link table may be created so as to continuously output the content data in the order of reading, or the link table may be created so as to output content data in a way corresponding to the texts, figures, and the like that are visually formed on the medium surface regardless of the reading order.

As described above, it is possible to continuously output content data by, in addition to registering association between a code value and/or a coordinate value that is defined by a dot pattern and content data, registering addresses that connect content data one another in the content data, or defining a code value and/or a coordinate value for outputting the linked content data as well as a code value and/or a coordinate value for outputting content data that is linked to other dot pattern after the linking in the dot code. That is, two code values and/or coordinate values are converted from this dot code.

Next, the following describes an example of a method of forming a dot pattern that is used in the present invention with reference to FIGS. 11A to 13.

FIGS. 11A to 12B show an example of processes for forming a stream dot pattern in order.

Unlike conventional dot patterns, as step 1, the dot pattern of the invention disposes a plurality of reference dots 4 continuously in a line at a position where information is desired to be input and output according to visual information on the medium surface.

Figure 11A:
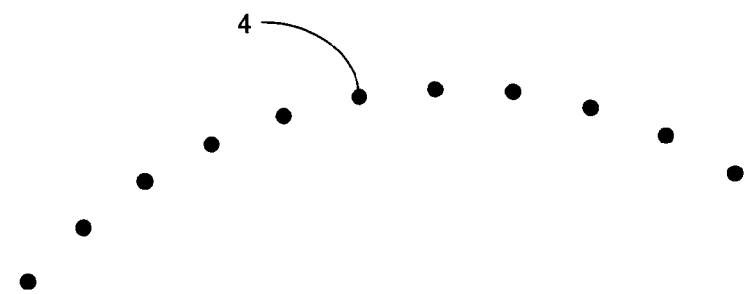
FIGS. 11A to 11C are diagrams illustrating a method of forming a stream dot pattern.
Figure 11B:
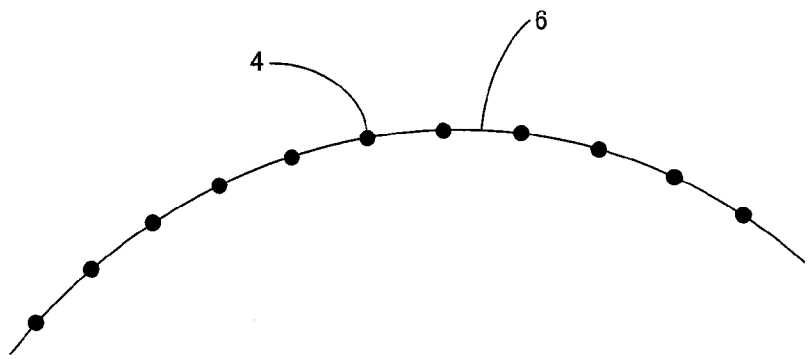

While reference dots 4 are disposed in a curved line in FIG. 11A, the arrangement of reference dots 4 is not limited to this, and can vary in many ways to form a dot pattern tailored to an area for inputting and outputting information, such as, combination of straight lines and curved lines and polygonal lines comprising a plurality of line segments.

Also, reference dots 4 may be arranged on actual lines visibly formed on the medium surface, or reference dots 4 may be arranged according to a predetermined rule along actual lines. The actual line, here, is a concept contrary to a virtual line, and includes all lines that actually exist. For example, there may be solid lines, dashed lines, dotted lines, straight lines, and curved lines regardless of, in this invention, medium on which the lines are formed (e.g., a display of a video image display device) and material forming the lines (e.g., ink). It should be noted that the dot pattern may be printed or displayed on a display, or unevenness on metal or plastic such as holes, grooves and the like.

It should be noted that, while reference dots are preferably arranged with even intervals from a perspective of enhancing accuracy of reading, the arrangement is not limited to this, and a set of dot pattern of certain information may be defined by combining a plurality of intervals, or both a set of dot pattern of certain information and the direction of the dot pattern may be defined using three different arrangement intervals of reference dots within the set of certain information.

Next, as step 2, a first virtual reference line 6 that connects reference dots 4 that are arranged in a line is provided. While the first virtual reference line 6 is provided as a curved line in FIG. 11B, the first virtual reference line 6 is not limited to this, and the first virtual reference line 6 of a straight line may be provided for reference dots 4 arranged in a curved line, or the first virtual reference line 6 of a curved line may be provided for reference dots 4 arranged in a straight line. That is, depending on where to arrange the second virtual reference line 7, virtual reference point 74, and information dot 72 in the following steps 3 to 5, the first virtual reference line 6 constituted by a straight line, a polygonal line, and/or a curved line that connects the reference dots can be flexibly defined.

Figure 13:
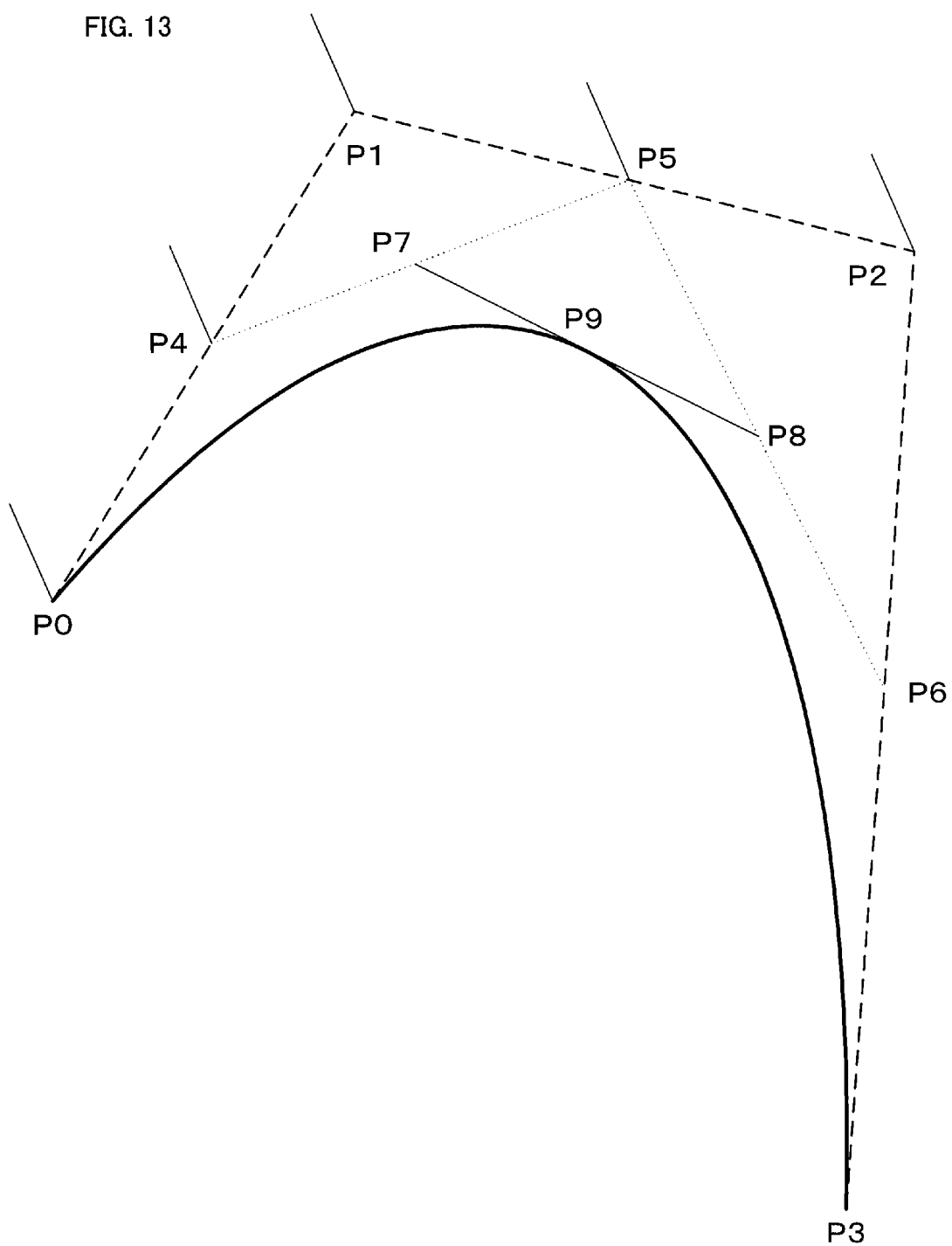
FIG. 13 is a diagram showing an example of providing the first virtual reference line as a Bezier curve.

It should be noted that, as shown in an example of FIG. 13, if the first virtual reference line 6 is a curved line, the curved line is preferably a Bezier curve.

That is, first, reference dots on the first virtual reference line are defined as P0 and P3, and P1 and P2 are defined as given control points. Next, points, P4, P5, and P6, that divide three line segments obtained by sequentially connecting the control points, P0-P1, P1-P2, and P2-P3, in a ratio of 1 to 1 are calculated. Then, points P7 and P8 that divide two line segments obtained by sequentially connecting above points, P4-P5 and P5-P6, in a ratio of 1 to 1 are calculated.

Finally, a point P9 that further divides a line segment P7-P8 that connects the points P7 and P8 in a ratio of 1 to 1 is calculated, and this point becomes a point on a Bezier curve.

By repeatedly performing this step, a Bezier curve with control points P0, P1, P2, and P3 can be obtained.

It should be noted that, without limiting to a Bezier curve, the first virtual reference line 6 may be provided using a variety of algorithms such as a spline curve obtained by utilizing a spline function, an nth-order polynomial, an elliptic arc and the like.

Also, for the second virtual reference line, a curved line can be defined using the same method as the first virtual reference line.

Figure 11C:
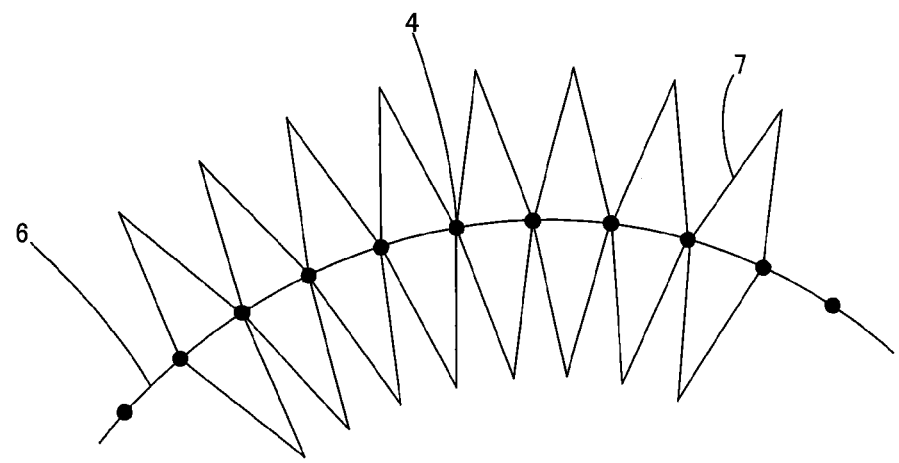

Next, as step 3, a second virtual reference line 7 that is defined at a predetermined position from the reference dots 4 arranged in a line and/or the first virtual reference line 6 is provided. In FIG. 11C, the second virtual reference line 7 is provided with arbitrary angle from neighboring reference dots 4 toward a predetermined point on a vertical line to a tangent line of the first virtual reference line 6 at a middle point between the neighboring reference dots 4. However, the second virtual reference line 7 is not limited to this and may be defined by a variety of ways to provide virtual reference points tailored to an area where information is desirably input and output by the dot pattern as described later.

Also, the second virtual reference line 7 may be provided only on one side of the first virtual reference line 6 to define the direction of the dot pattern, or the second virtual reference lines 7 may be provided on both sides thereof to increase the information amount.

Figure 12A:
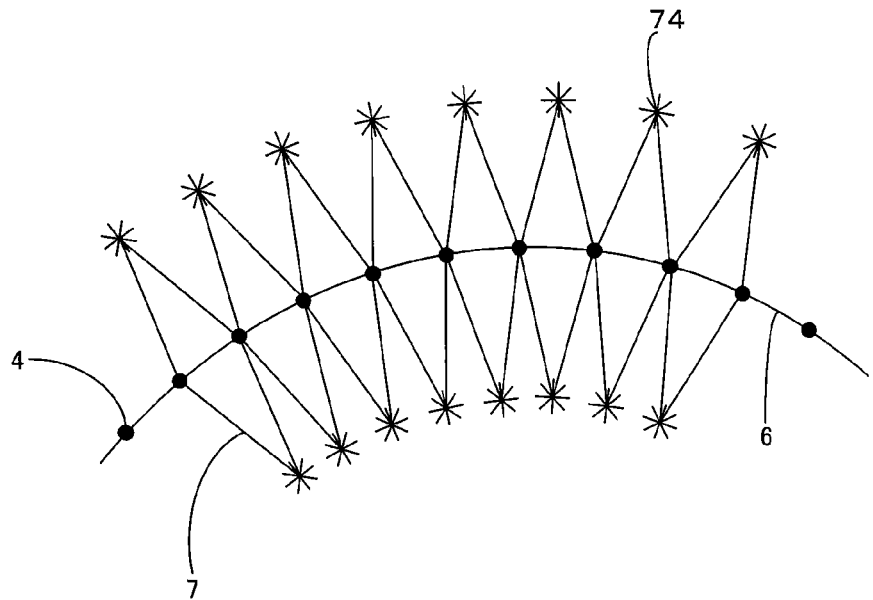
FIGS. 12A and 12B are diagrams illustrating a method of forming a stream dot pattern.

Next, as step 4, a plurality of virtual reference points 74 are provided at predetermined positions on the second virtual reference line 7. In FIG. 12A, a virtual reference point 74 is provided at an intersection of the second virtual reference lines 7, that is, at a vertex of an isosceles triangle with a straight line that connects neighboring reference dots 4 as a base and the second virtual reference lines 7 as opposing sides. However, the position of the virtual reference point 74 is not limited to this, and may vary in many ways such as providing at a midpoint of the second virtual reference line 7 or on a reference dot 4 instead of on the second virtual reference line 7.

Figure 12B:
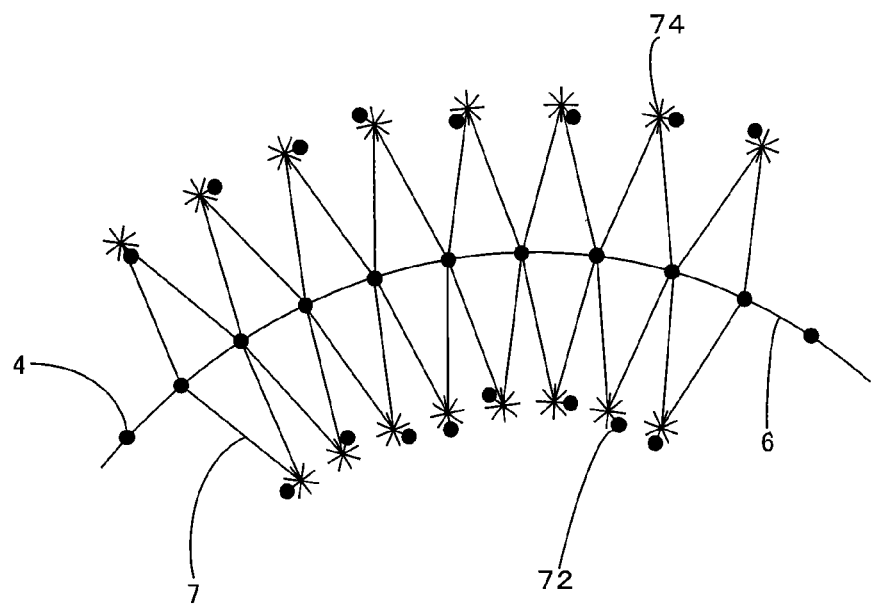

Then, as step 5, an information dot 72 is arranged at the end point of a vector expressed with a virtual reference point 74 as the start point. In FIG. 12B, vector directions from a virtual reference point 74 are eight directions and an information dot 72 is arranged for one virtual reference point 74 to make a distance from the virtual reference point 74 an equal distance. However, arrangement of the information dot 72 is not limited to this, and a plurality of information dots 72 can be arranged in arbitrary direction and arbitrary length, such as arranging an information dot 72 on a virtual reference point 74, arranging with 16 vector directions, or, arranging two information dots 72 for one virtual reference point 74.

In this way, the stream dot pattern of the invention is formed on the basis of reference dots that are continuously arranged in a line including a curved line, instead of reference dots that are formed two-dimensionally in a grid in the conventional dot patterns proposed by the inventor.

In this way, without limiting to the shape of a rectangular area when forming a dot pattern as a two-dimensional code, the dot pattern can be formed by repeating a set of certain information in a flexible shape tailored to an information area visibly formed on a medium surface.

It should be noted that the virtual reference lines and virtual reference points of the invention are not actually formed by printing on a medium surface, and are only virtually set when arranging a dot pattern on the image memory of a computer or when reading a dot pattern.

Using this stream dot pattern, dot patterns can be formed on curved surface elements such as globes, or three-dimensional objects such as human phantoms and three-dimensional maps. Thus, the input-output device of the invention can be utilized without limiting to planar maps, picture books, and the like.

Figure 14A:
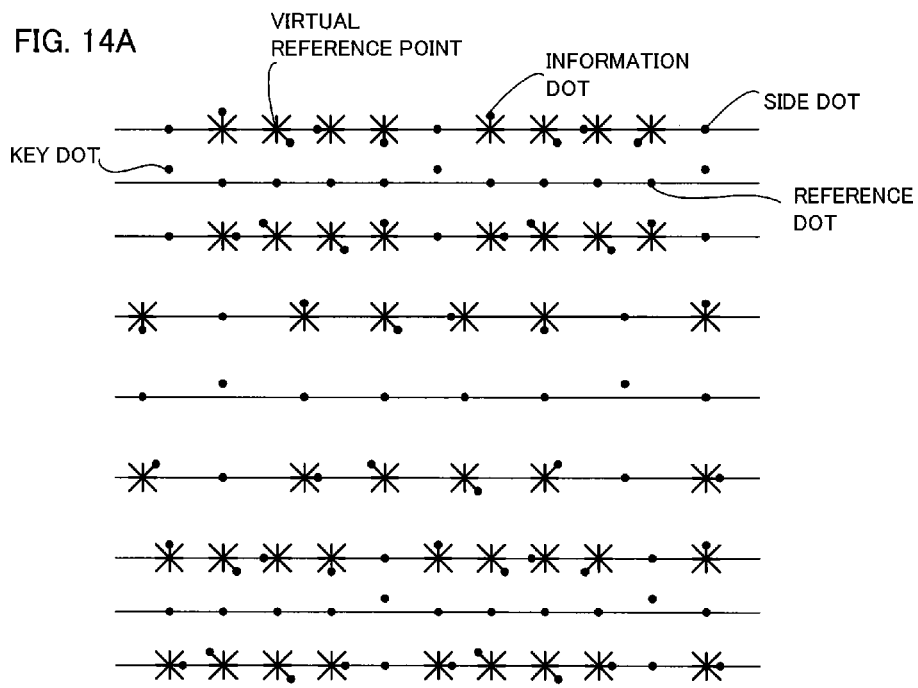
FIGS. 14A and 14B are diagrams showing an example of a state in which the stream dot patterns are arranged in a vertical direction.
Figure 14B:
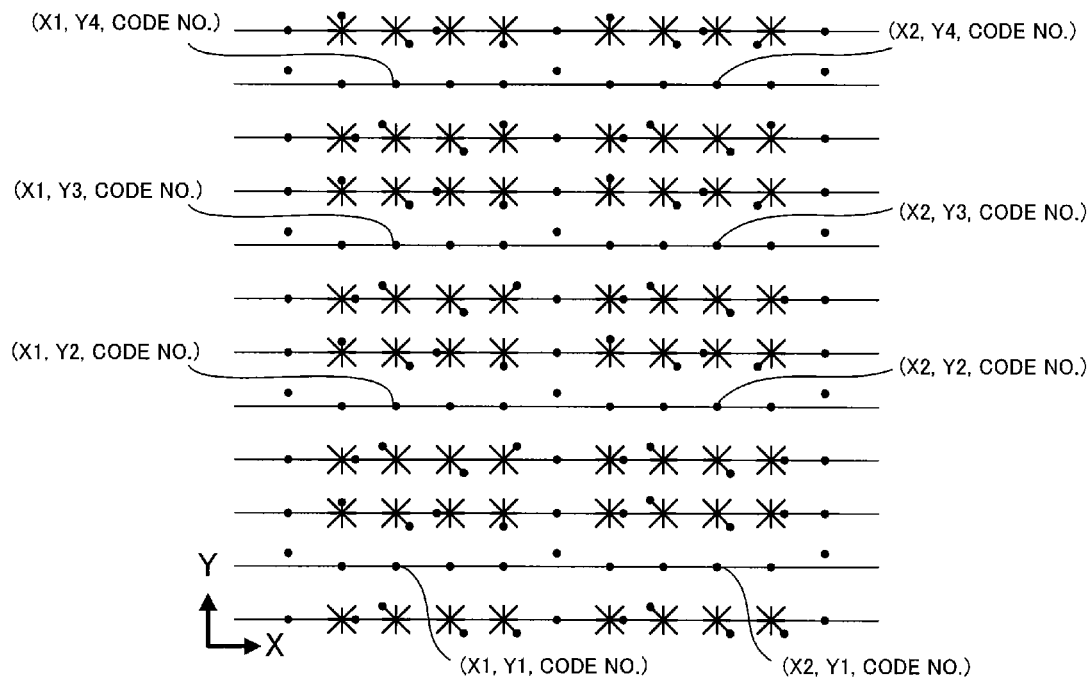

FIGS. 14A and 14B are diagrams showing an example of a state in which stream dot patterns are arranged in an up-to-down direction.

In FIGS. 14A and 14B, key dots and side dots are arranged in addition to the reference dots and information dots. The key dot is a dot arranged at both ends of a set of certain information. This key dot is a representative point of one area of a dot pattern 1 that represents a set of information dots. The side dot is a dot arranged on a positive and negative extension line extending from displacement of the key dot 2.

In FIG. 14B, reference dots and stream dot patterns are arranged with even intervals. In this way, as X and Y coordinate values are tightly arranged and defined in the writing area by forming a plurality of stream dot patterns in which intervals of reference points are constant, trajectory information can be generated, thereby allowing handwriting input. However, the stream dot pattern of the invention is not limited to this, and, as shown in FIG. 14A, the interval of the dot patterns may be arbitrary set. Also, the interval of the reference dots can be arbitrary set.

In this way, without limiting to the shape of a rectangular area when forming a dot pattern that defines X and Y coordinates as a two-dimensional code (using as an index), the dot pattern can be formed by repeating a set of certain information in a flexible shape tailored to an information area visibly formed on a medium surface.

Next, the following describes a method for continuously outputting content data that is associated with a code value and a coordinate value that is defined by a dot pattern and registered in the link table.

First, the first method is described with reference to FIGS. 15A to 15C.

Figures 15, 15A, 15B:
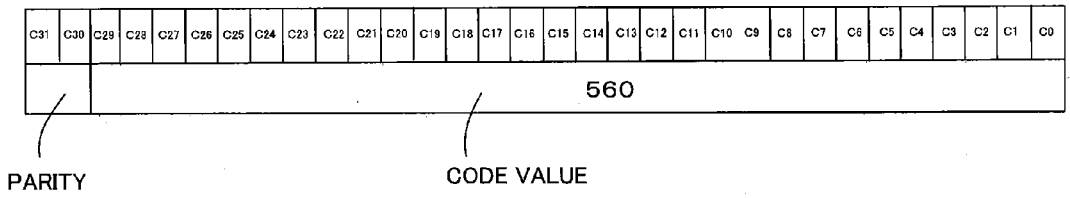

FIGS. 15A to 15C show: a dot code that is obtained by analyzing and converting a dot pattern (15A); a link table in which a code value converted from the dot code and content data to be output are associated (15B); and a content file that stores the content data (15C).

First, when the processing unit analyzes a dot pattern, the dot pattern is digitized and converted to a dot code as shown in FIG. 15A. FIG. 15A shows a dot code format of which converted dot code defines a code value (560) and parity check. It should be noted that information defined by the dot code is not limited to the code value and can define a coordinate value. The code value (560) is the value of an area that defines a code value that is obtained by subtracting the value of an area used for parity check from the converted dot code (1000110000) and converting into a decimal number. It will be appreciated that the link table may be configured with binary numbers without converting to decimal numbers.

Then, the control unit refers to the link table using the code value (560), then, instructs the output unit to output content data that is associated with the code value in the link table.

When outputting content data, the control unit confirms the file name and the address of the content file that is associated and registered with the code value in the link table, retrieves from the storage unit, then, outputs from the output unit.

The content data is stored in a content file with the file name, and the content file is registered in the storage unit.

Also, as shown in FIG. 15B, one code value can be associated with the file names and addresses of a plurality of content files and registered in the link table.

In such a case, among the plurality of content data associated with one code value, the one in the highest order is output from the output unit. Then, among the plurality of content data associated with the one code value, the one in the subsequent high order is continuously output. When all content data that is associated with the one code value is completed being output by repeating this step, the continuous output of the content data ends.

It should be noted that the arrangement of content data that is registered in the link table may be, for example, if the content data is a sound, arranged in the order of date and time when the sound is recorded or the order of the file names. Also, the arrangement can be changed even after being registered in the link table by a method that is described later.

Next, the following describes the second method for continuously outputting content data with reference to FIGS. 16A to 16F.

Figure 16A:
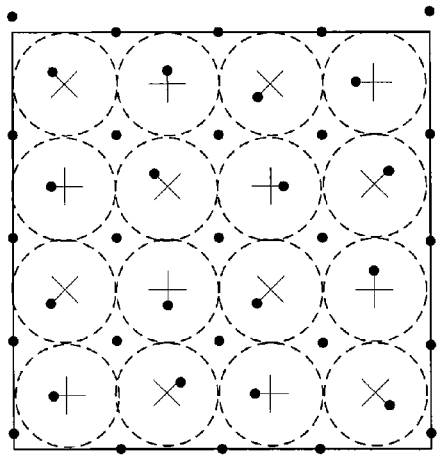
FIGS. 16A to 16F are explanatory views showing examples of dot patterns and dot code formats.
Figure 16B:
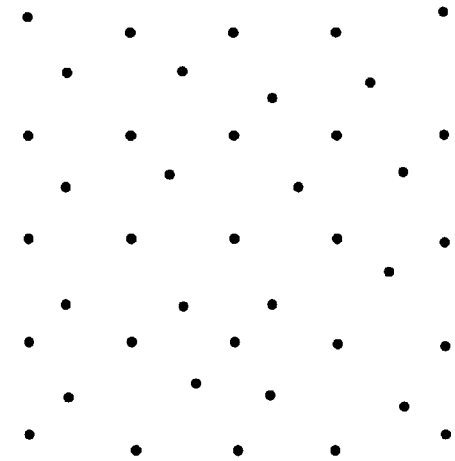

FIG. 16A is an enlarged view showing a dot pattern formed in the printed area.

It should be noted that, while the dot pattern of FIG. 16A shows grid lines that connect reference dots 4 as solid lines, these lines are expressed for convenience. In the actual dot pattern, such lines do not exist as shown in the dot pattern of FIG. 16B.

Here, an information dot of the dot pattern 1 can be disposed in four directions, and the area of a dotted circle that includes one information dot has information amount of 2 bits.

When this dot pattern 1 is read by the scanner, the dot pattern is analyzed by the processing unit, and converted into a dot code of $C0$ to $C31$.

FIGS. 16C, 16D, 16E, 16F show dot code formats of one block of a dot pattern 1 that configures a set of these information dots.

Figure 16C:
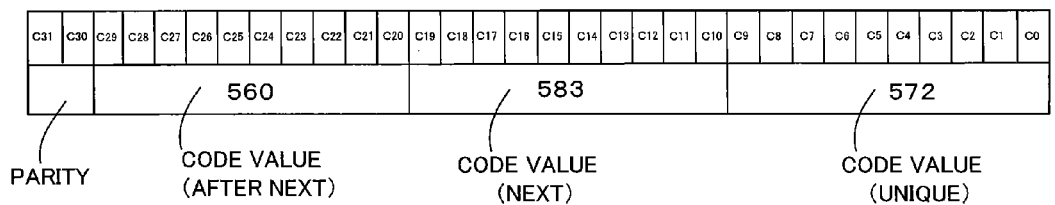

The dot code shown in FIG. 16C defines parity check and a code value. It will be appreciated that the dot code may define X and Y coordinate values instead of the code value, or the dot code may define X and Y coordinate values in addition to the code value.

The dot code in FIG. 16C defines a code value (572) that is associated with content data that is output first, after reading the printed area on which dot patterns are formed by the scanner, as well as code values (583, 560) that are associated with other content data.

That is, the dot pattern 1 defines, in addition to the first code value and/or coordinate value that is associated with content data, the second to Nth code values and/or coordinate values that are associated with at least one other content data. This value N increases and decreases according to the number of content data that is defined in one dot pattern.

The control unit refers to the link table based on the code values analyzed by the processing unit, and, first, instructs to output content data that is associated with the code value 572.

Then, next, the control unit instructs to continuously output content data that is associated with another code value 583 that is defined in the same dot code.

Further, as another code value 583 still remains in the same dot code, the control unit instructs to continuously output content data that is associated with the code value 583.

That is, when the optical reading unit (a scanner) reads the dot pattern, the control unit refers to the link table, retrieves content data corresponding to the first code value and/or coordinate value from the storage unit and outputs through the output unit. Subsequently, the control unit refers to the link table, retrieves content data corresponding to at least one of the second to Nth code values and/or coordinate values from the storage unit in a predetermined order, and continuously outputs from the output unit.

It should be noted that, while the associated content data is output in the order of the code values 572, 583, 560 as one example, the associated content data may be output in the order of the code values 560, 572, 583. Also, the number of code values that is defined by one dot code may be defined as two or four or more, increasing or decreasing the number of content data to be continuously output as necessary.

Also, in the link table, a plurality of content data may be associated with one code value. In such a case, control will be performed so as to, after outputting all content data that is associated with one code value, output content data that is associated with the next code value.

It should be noted that output modes may switch whether continuously outputting content data or outputting only content data that is associated with a predetermined code value. This mode switching may be performed by buttons provided on the input-output device and a paper controller.

Also, for example, in a printed medium on which several photographs that are superimposingly printed with dot patterns are separately printed, dot patterns having different unique values may be formed for respective photographs. In a printed medium on the entire surface of which dot patterns are superimposingly printed, a range is partitioned for each predetermined area and a dot pattern having a different unique code value may be formed for each range.

Figure 16D:
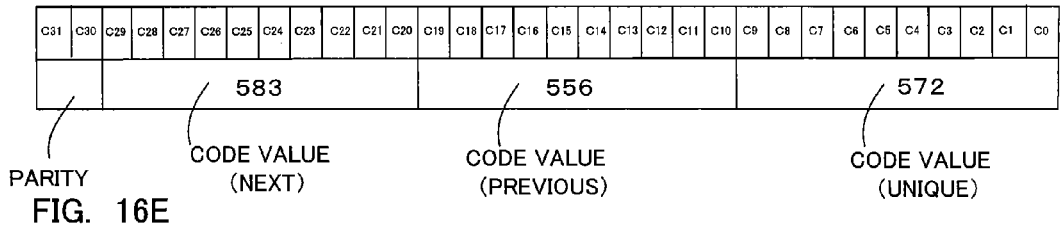

The dot code in FIG. 16D defines a code value (572) for indicating association with predetermined content data, as well as, code values (556, 583) for indicating association with other content data.

These three kinds of code values are respectively a code value (572) that is associated with content data being currently output, a code value (583) that is associated with content data to be output next, and a code value (556) that is associated with content data that has been output before the currently outputting content data.

When the dot pattern is imaged by the scanner, the control unit analyzes the dot pattern by the processing unit, converts the dot code into code values, then, refers to the link table, retrieves content data associated with the code value (572) that is unique to the dot code from the storage unit such as a hard disc, and outputs from the output unit.

Also, the central processing unit refers to the dot code format in addition to the instruction for outputting the content data, confirms the code value (583) associated with the content data to be output next, then, after outputting the currently outputting content data, instructs to output content data associated with the next code value (583).

Also, in FIG. 16D, the previous code value is defined in the dot code, in addition to the unique code value and the next code value, whereby content data can be reproduced easily in a reverse order by switching the playback mode.

To reproduce content data in the reverse order in such a reverse playback mode, as in the normal method for continuously outputting content data as described above, the previous code value is confirmed in addition to the instruction for outputting content data that is associated with the unique code, then, content data that is associated with the previous code may be output.

Figure 16E:
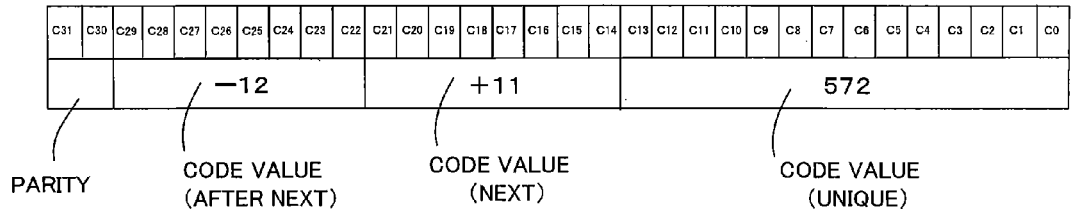
Figure 16F:
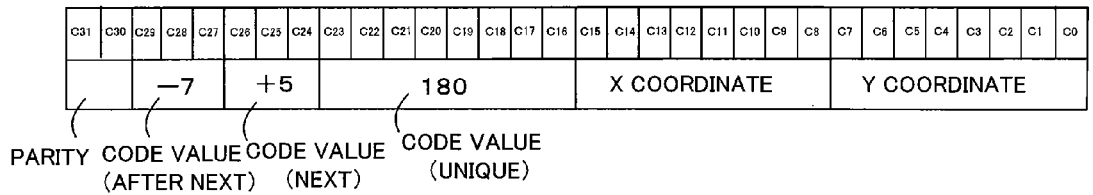

As shown in FIG. 16E, the code value associated with content data to be output after the initially output content data can be expressed by a difference value from a code value that is associated with the initially output content data in the dot code format.

That is, as shown in FIG. 16C, when a code value that is associated with content data to be initially output is 572 and the next code value is 583, the next code value 583 can be expressed by adding 11 to the code value that is associated with content data to be initially output 572. Similarly, the code value after the next 560 can be expressed by subtracting four therefrom. By defining a code value that is continuously output using a difference, the range of code values can be increased and a large number of content data can be handled. Moreover, coordinates etc. can be simultaneously defined and handled in the increased area.

As described above, the dot pattern (the dot code itself) has a function as instruction information for indicating other content data to be output after outputting desired content data. For a user to start outputting continuous content data, the user may operate reading of only one dot pattern that is associated with the continuous content data without a need to read different dot patterns one after another. That is, a plurality of code values can be converted from a dot code of a position.

Also, a dot code has not only a code value and/or a coordinate value that is associated with content data to be output by reading a dot pattern formed on each printed area, but also a code value and/or a coordinate value that indicates other content data (for example, content data that is supposed to be output after currently outputting content data, or content data that has been previously output) in the link table, which is treated as instruction information that indicates a code value of other content data to be output after outputting desired content data. In this way, as the instruction information simply designates only a code value and/or a coordinate value that is associated and registered with content data to be continuously output next, an advantage is provided that the order of content data to be continuously output can be flexibly changed only by changing association between the code and the content data in the link table.

Also, as the dot pattern defines a code value and/or a coordinate value of content data before or after the outputting content data, if a user does not want to start outputting content data from the first (for example, contents until Chapter 3 of a novel has been listened and a content that is desired to be listened next is a content from Chapter 4), even when the content data is started outputting from the middle, the content data can be continuously output from the content of the Chapter 4 by reading a dot pattern formed and defined in the beginning of the Chapter 4. Further, by changing the playback mode of the content data, the content data can also be reproduced easily in a reverse order.

Content data to be output secondly or thereafter is preferably associated with a code value and/or a coordinate value that is indicated by a difference value from a code value and/or a coordinate value for indicating association with content data that is initially output. That is, by analyzing the dot pattern that defines content data that is initially output, a code value and/or a coordinate value for indicating association with at least one other content data is expressed by a difference value in addition to a code value and/or a coordinate value for indicating association with the predetermined content data that is initially output.

As described above, when one dot code defines: a code value and a coordinate value for indicating association with content data that is initially output; and a code value and a coordinate value for indicating association with content data to be output secondly or thereafter, by expressing the code value and coordinate value for indicating association with other content data using a difference value from the code value and coordinate value for indicating association with the predetermined content data that is initially output, the difference value can be treated as instruction information that indicates the code value of other content data to be output after outputting desired content data, while saving information amount that one dot code retains.

As the difference value can be instruction information that indicates a code value of other content data to be output after outputting desired content data while saving information amount, for example, the available range of the code value can be expanded, and advanced security, X and Y coordinate values, and the like can be defined in the dot code.

It should be noted that there may be a plurality of second code values and/or coordinate values.

Next, the following describes the third method for continuously outputting content data.

FIGS. 17A and 17B are explanatory views that indicate examples of dot code formats and a dot code linking table.

Even if one dot code has only one code value for indicating association with the content file as the dot codes illustrated in FIG. 17A, content data can be continuously output by providing a dot code linking table as shown in FIG. 17B.

That is, after analyzing a dot pattern and converting the dot pattern into a dot code by the processing unit, and converting the dot code into a code value, the control unit, first, refers to the link table, and instructs to read and output the content data associated with the code value from the storage unit.

Next, by referring to the dot code linking table, a code value that is associated and registered with the above code value in the dot code linking table is confirmed, content data that is associated with the code value is instructed to be continuously output.

Also, when the ith dot pattern is read by the optical reading unit, the control unit refers to a dot code linking table that associates and registers the first to Nth code values and/or coordinate values that are defined by a plurality of dot patterns in a predetermined order, refers to the dot code linking table using the ith code value and/or coordinate value that is converted from the processing unit, searches the first to Nth code values and/or coordinate values, then, refers to the link table in the order from the ith to Nth code values and/or coordinate values, retrieves at least two pieces of corresponding content data from the storage unit, and continuously outputs from the output unit.

As described above, when content data is continuously output based on the links of code values, by changing association between a code value and X and Y coordinate values that are defined by a dot code and content data in a link table and the dot code linking table, the order of continuously outputting content data can be easily changed.

As in the above configuration, if a dot code linking table is registered in the storage unit, and code values that are defined by dot codes are associated and registered therein, the control unit can refer to a dot code linking table and a link table, and continuously output content data after outputting desired content data. Also, as the links of the code values can be confirmed by referring to the dot code linking table, without limiting to the information amount that one dot code retains, content data can be continuously retrieved and output.

It should be noted that, when content data is continuously output in the above configuration, code values and two or more pieces of content data do not necessarily be associated and registered in the link table that is registered in the storage unit. It should be noted that, in this invention, using a dot code linking table that registers code values that are respectively associated with content data with a predetermined method according to the order of continuous output, the content data may be continuously output at least once in the descending order or ascending order of the registered order from the storage unit. Also, a repeat function may also be added in which, after outputting content data that is associated with a dot code that is defined first or last in the ascending or descending order, content data is continuously output again from the content data that is associated with the dot code that is defined last or first therein.

Next, the following describes the fourth method for continuously outputting content data.

FIG. 18A is a diagram showing an example of a link table that associates and registers code values and the file names of content files and content files that store the file names and content data. The content data is stored in the content file, and, in the link table, association between the code value and the content file name clearly shows whereabouts of the content data to be output.

In FIG. 18A, each content file also stores the content file name that is previously output and the content file name that is output next.

That is, the content file registers, in addition to the first file name that indicates one content data, the second file name that indicates different content data. In this way, linked file names are registered so as to link a second file name that indicates further different content data in a chain by defining the second file name that indicates the different content data as a first file name.

In this way, by linking files as instruction information for indicating content data to be output after the currently outputting content data, next content data can be continuously output after outputting the content data.

That is, when the dot pattern is read by the optical reading unit, the control unit reads content data that is indicated by file names registered in a chain from the storage unit one after another and continuously outputs through the output unit.

Also, the content file can also store a content file name that stores content data that is output before the currently outputting content data. In this way, the content data can be easily continuously output in a reverse playback mode.

Also, as illustrated in FIG. 18B, by providing a number (an index) to each content file in the index table, the number can be used to register the file name of the above-described other content information.

According to the above configuration, when continuously outputting content data, without associating and registering the code value and/or coordinate value and content data to a link table, a content file name that is stored in the content file can be read as instruction information that indicates whereabouts of content data that is desired to be output after outputting desired content data. In this way, when continuously outputting content data in the above configuration, the link table registered in the storage unit may have at least one set of associated and registered content data and a code value and/or a coordinate value. Further, in addition to the first file name that indicates content data and the second file name that indicates content data that is registered next, the third file name that indicates content data that is registered before can also be registered, and the content data can be continuously reproduced in the reverse order.

Next, the following describes the fifth method for continuously outputting content data.

In FIG. 19, code values are arranged in an ascending order and the file names of content files are associated therewith and registered in the link table. Also, the range of continuously outputting content data (continuous output range) is determined in advance and registered. It, should be noted that, in FIG. 19, the continuous output range is defined as code values 200 to 203.

In such a case, content data can be continuously output according to the ascending order of the code values by outputting the content data associated therewith.

Content data that is associated with code values within the continuous output range may be continuously output in the ascending or descending order of the code values according to a predetermined instruction, starting from content data that is associated with a code value of a dot code that is read first within the continuous output range.

Also, when dot codes are arranged in the ascending order as in this example, content data may be reproduced in a reverse order by outputting in the descending order of the dot codes. It should be noted that, when code values are arranged in the descending order according to a predetermined instruction, the content data may be normally reproduced, or content data may be reproduced in a reverse order when the code values are arranged in the ascending order.

Continuous output of the content data ends when content data within a predetermined continuous output range is completed to be output. It will be appreciated that, depending on the mode of the input-output device, the content data of this range may be repeatedly output.

Also, when a plurality of file names are associated and registered with one code value, content data that is associated with the next code value may be output after outputting all content data that is associated with the one code value.

FIG. 20 shows a diagram in which code values arranged in an ascending order are associated with a variety of content data including audio contents, URLs, and motion picture contents.

In such a case, if content data is continuously output according to the ascending order of the code values, various kinds of content data is continuously output, such as, displaying a URL of a WEB site after outputting an audio content, then increasing an audio volume. Thus, only the same kind of contents (e.g., only audio contents, only motion picture contents) may be extracted and continuously output according to a predetermined instruction.

Next, the following describes linking between content data and code values.

FIGS. 21A and 21B show content files that stores content data and the file names and a link table that associates and registers code values that are defined by dot codes and the content file names.

In the link table of FIG. 21A, the space for registering a content file name or an address is defined as a registering space.

Content data and a code value can be linked by registering the file name or the address of the content file that stores the content data registered in the storage unit in the registering space.

Also, as shown in FIG. 21B, even if code values and the file names or addresses of content files have already been associated and registered, the file names or addresses of a plurality of content files may be associated and registered with the one code value. For example, as shown in FIG. 21B, a code value (572) that is associated with a content file name A-3 may be further associated with A-4.

Figure 22:
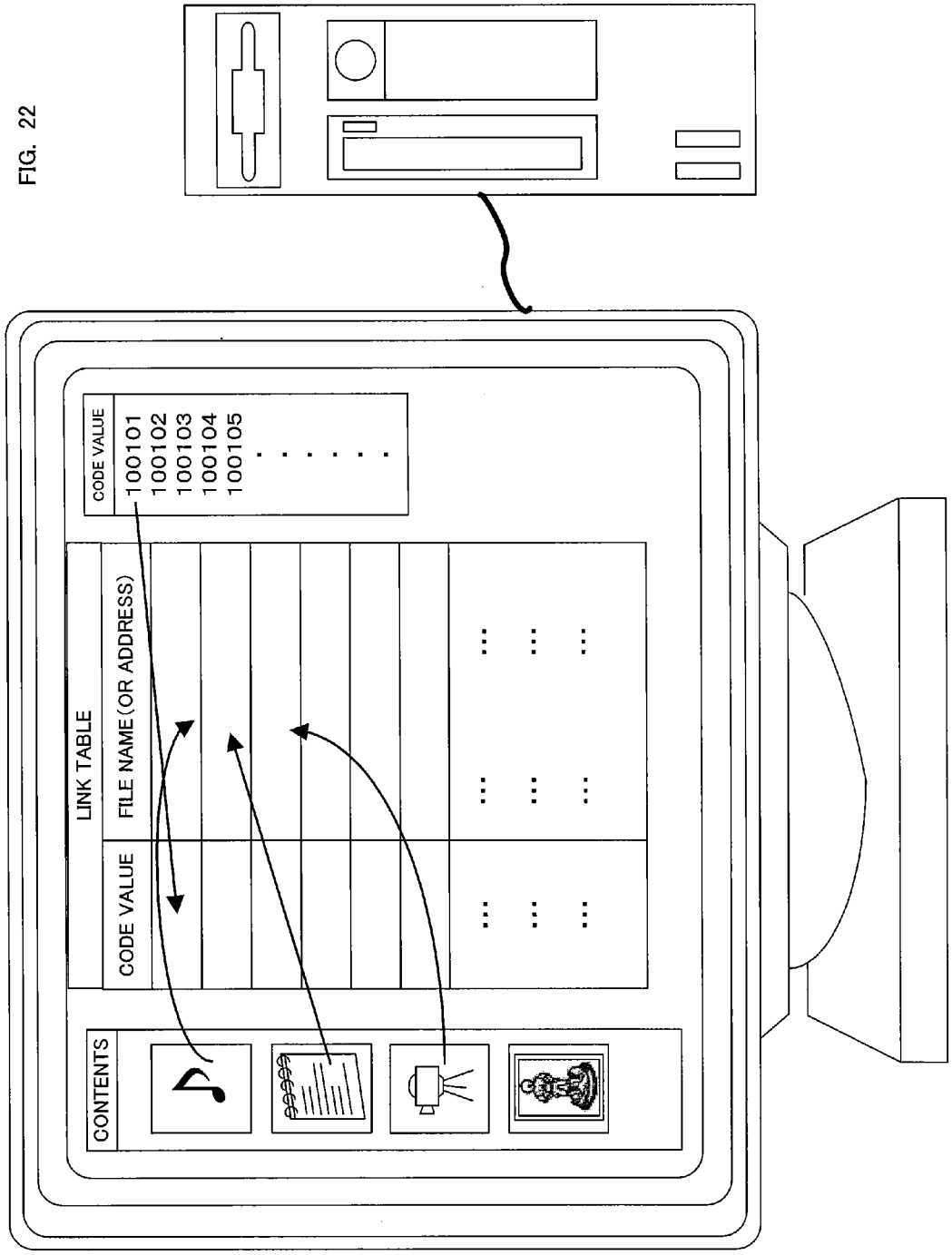
FIG. 22 is a diagram illustrating an example of the application that runs on a personal computer.
Figure 23:
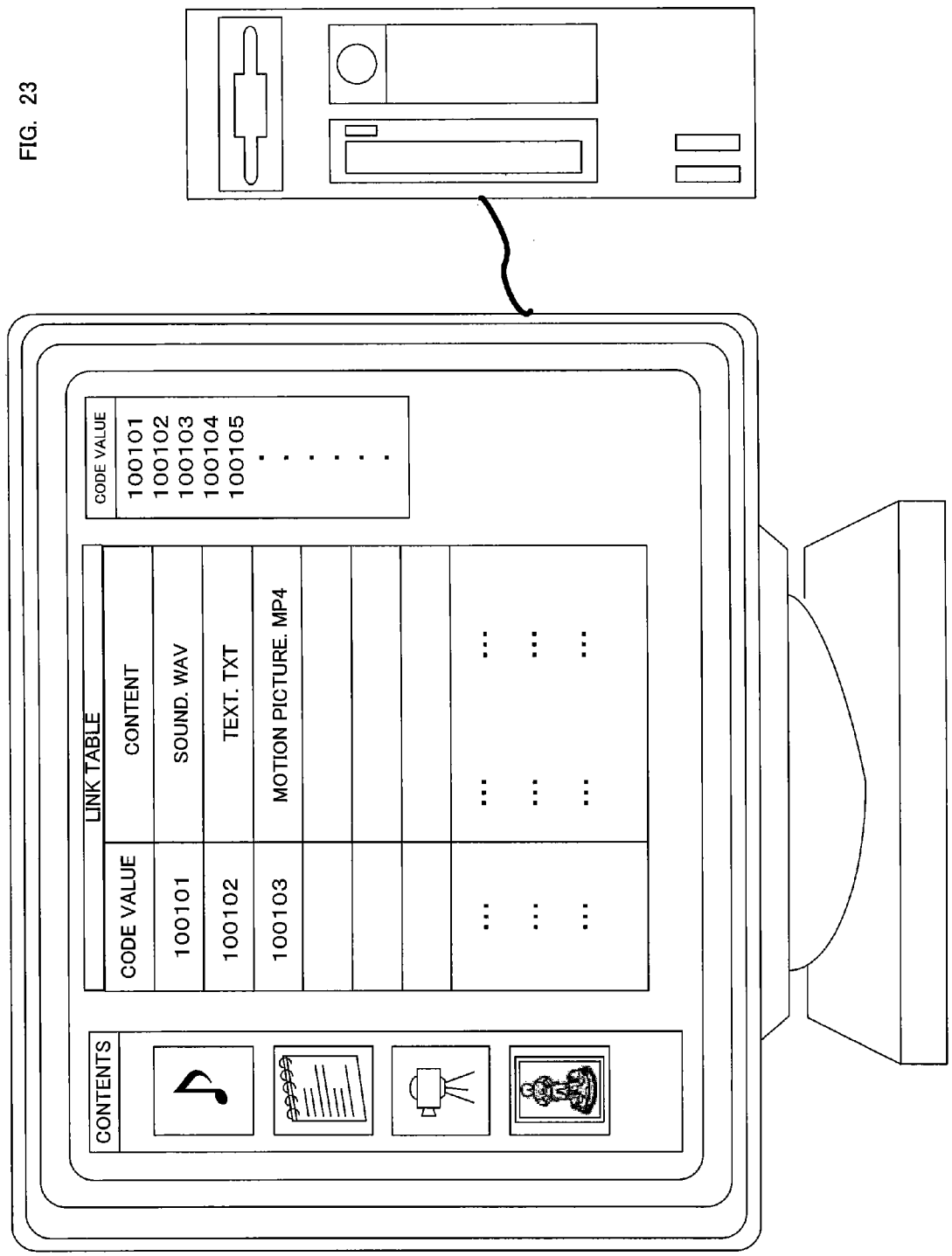
FIG. 23 is a diagram showing an example of a link table that is created by executing the application.

FIGS. 22 and 23 illustrate an application that runs on a personal computer for creating the above-described link table. FIG. 22 is a diagram showing how to execute the application, and FIG. 23 is a diagram showing a link table created by executing the application.

As shown in FIG. 22, when the application for creating a link table is executed, icons for expressing each content data that is registered in the computer in advance are displayed at the left side of the screen on the display device, code values are displayed at the right side of the screen, and a link table is displayed in the middle of the screen. Operating the pointing device, a user drags and drops the displayed content data or code value to a link table in the middle of the screen to insert therein.

It should be noted that, when inserting a code value to the code value field, if a smallest code value is inserted to the top thereof, other code values may also be automatically inserted in the ascending order from the code value. It will be appreciated that the code value can be converted to a decimal value and displayed.

As the result, as shown in FIG. 23, a new association of a content and a code value is registered in the link table in the middle of the screen, the inserted numerical information is displayed in the code value field, and the file name of the content is displayed in the content field.

In this way, the link table can be created on a personal computer using the dedicated application.

The multi-linking and continuous output of the content data can be combined and used. The following describes an example of an embodiment with reference to FIG. 10.

As a procedure for using by combining multi-linking and continuous output of the content data, a user, first, starts inputting content data by operation of an input start/end button or reading a dot pattern for starting/ending input 871.

Next, during input of the content data, a first predetermined dot pattern 826 is read by operation of a divide/link button further provided on the input-output device or by reading a dot pattern for dividing/linking 820 formed in a predetermined area on the medium surface by the optical reading unit.

Here, "the first predetermined dot pattern" is a dot pattern that is initially read when linking a plurality pieces of content data that are to be divided and registered to a plurality of dot patterns. While, in this example, a dot pattern formed in a field 1 is defined as the first dot pattern 826, as a user links related content data to a flexible position, the first dot pattern is determined by operation of the user regardless of the position formed on the medium surface.

Similarly to the input start/end button, any one of buttons 1130a to 1130f is used for the divide/link button. To have both functions of the input start/end button and the divide/link button with one button, different button operations (long-pressing, pressing twice) may be performed for desired functions and processing. Also, it is possible to provide an audio volume UP/DOWN button or a dot pattern for UP/DOWN audio volume for adjusting an audio volume when inputting or reproducing content data.

If the above operation for switching to the link mode is not performed and the first predetermined dot pattern 826 is read out, a normal operation is performed, that is, a link table that registers a code value and/or a coordinate value that is defined by the first dot pattern 826 is referred to and whether content data and/or an operation instruction is associated and registered therein is confirmed. If registered, corresponding content data is output or an operation based on the operation instruction is controlled. If not registered, processing for connecting with an information processing device is started.

When the first predetermined dot pattern 826 is read out, the control unit of the input-output device 816 partitions, as the first content data, content data from starting input until operation of the divide/link button or reading of the dot pattern for dividing/linking 820 that is formed in a predetermined area on the medium surface by the optical reading unit and registers in the storage unit. Then, the control unit associates a code value and/or a coordinate value that is defined by the first predetermined dot pattern 826 that is converted by the processing unit with the first content data, and registers the association between the code value and/or coordinate value and the first content data to the link table of the storage unit.

Next, a predetermined ith dot pattern 828 is read by the optical reading unit by operation of the divide/link button or reading a dot pattern for dividing/linking 820 that is formed in a predetermined area on the medium surface by the optical reading unit during inputting content data.

By inputting content data by the input unit continuously after reading a predetermined first dot pattern 826, once the inputting starts, only by operation of the divide/link button or reading the dot pattern for dividing/linking 820 and reading of the ith predetermined dot pattern 828 one after another, the ith predetermined dot pattern 828 and the ith content data that is input after reading the first predetermined dot pattern 826 can be linked.

This "ith predetermined dot pattern" is a concept contrary to the first predetermined dot pattern 826, and is a dot pattern that is read to link content data after linking the first predetermined dot pattern 826. This ith predetermined dot pattern 828 and the first predetermined dot pattern 826 are together referred to as the above-described "predetermined dot pattern." The ith predetermined dot pattern 828 is arbitrary determined by a user in the same way as the first predetermined dot pattern 826, and the value of i increases according to the number of times of dividing/linking operations, such as, the second predetermined dot pattern is read after the first predetermined dot pattern 826, and the third predetermined dot pattern is read after the second predetermined dot pattern. Depending on the order of reading by a user, for example, a dot pattern in the field 1 of the printed material 5 becomes the first predetermined dot pattern 826 or the ith predetermined dot pattern 828.

When the ith predetermined dot pattern 828 is read, if the number of operations of the divide/link button is defined as N times including the time for reading the first predetermined dot pattern 826 (N is a natural number), the control unit of the input-output device 816 partitions content data from operation of i–1th division until operation of ith division as the ith content data and registers in the storage unit. Then, the control unit associates the ith code value and/or coordinate value that is converted from the ith predetermined dot pattern 828 by the processing unit with the registered ith content data, and registers the association between the ith code value and/or coordinate value and the ith content data to the link table of the storage unit.

Then, upon linking the first predetermined dot pattern and the ith predetermined dot pattern, the control unit performs operation for continuously outputting the first content data and the ith content data in the above-described method.

The first method may be that the link table that registers a code value and/or a coordinate value that is defined by a dot pattern (the first predetermined dot pattern and the ith predetermined dot pattern) associated with the input content data additionally registers a code value and/or a coordinate value that is defined by other dot pattern. For example, to continuously output the second content data after outputting the first content data, the link table, in which a code value and/or a coordinate value that is defined by the first predetermined dot pattern and the first content data are associated, registers a code value and/or a coordinate value that is defined by the first predetermined dot pattern.

Then, when the first predetermined dot pattern is read again, the link table that associates the code value and/or coordinate value converted by the processing unit with the first content data is referred to, the first content data directly associated therewith is, first, output, then, based on the code value and/or coordinate value that is defined in the second predetermined dot pattern that is additionally registered in the link table, other link table that associates and registers a code value and/or a coordinate value corresponding to the second predetermined dot pattern and the second content data is referred to, whereby the second content data is output.

The second method may be that a dot code that defines a code value and/or a coordinate value also defines other code values and/or coordinate values. While one code value and/or coordinate value and parity check are generally registered for one dot code, two or more code values and/or coordinate values are preferably defined for one dot code to continuously output content data.

For example, to continuously output the sixth content data after outputting the third content data, a predetermined range of a dot code that is obtained by analyzing the third predetermined dot pattern by a processing unit is used as a range for defining a code value and/or a coordinate value that is defined by the sixth predetermined dot pattern.

Then, when the third predetermined dot pattern is read again, processing based on the dot code converted by the processing unit is performed. That is, in this embodiment, as a portion where a dot code is defined by the third predetermined dot pattern defines a code value and/or a coordinate value of the third predetermined dot pattern, and other portion defines a code value and/or a coordinate value of the sixth predetermined dot pattern, the link table is, first, referred to based on the code value and/or coordinate value corresponding to the third predetermined dot pattern to output the third content data, and, then, the link table is referred to based on the code value and/or coordinate value corresponding to the sixth predetermined dot pattern thereafter to output the sixth content data.

It should be noted that, to expand the range of available code values and/or coordinate values, or to save information amount so as to define advanced security or X and Y coordinate values, it is preferable to express the code value and/or coordinate value defined by the sixth predetermined dot pattern by a difference value from the above-described code value and/or coordinate value defined by the third predetermined dot pattern. That is, the content data that is secondly output or thereafter, is associated with a code value and/or a coordinate value indicated by a difference value from a code value and/or a coordinate value for indicating association with the content data that is output first. Thus, if a dot pattern that defines the content data that is output first is analyzed, a code value and/or a coordinate value for indicating association with at least one other content data is expressed by a difference value in addition to the code value and/or coordinate value for indicating association with the predetermined content data that is output first.

As described above, when the code value and coordinate value for indicating association with content data that is output first and the code value and coordinate value for indicating association with content data that is output secondly or thereafter are defined by one dot code, by expressing the code value and coordinate value for indicating association with the other content data using a difference value from the code value and coordinate value for indicating association with predetermined content data that is output first, information amount that one dot code retains is saved and the difference value can be instruction information for indicating the code value of other content data to be output after outputting desired content data.

The third method may be using a dot code linking table for associating and registering at least one of the code values that are defined by the first predetermined dot pattern and/or ith predetermined dot pattern. That is, the storage unit further registers a dot code linking table that associates and registers at least one of the code values that are defined by the first predetermined dot pattern and/or ith predetermined dot pattern.

Then, when those dot patterns are read again, the control unit refers to the link table in which a code value converted by the processing unit is associated, and outputs the registered first content data or ith content data from the output unit, as well as, refers to the dot code linking table, and continuously outputs the first content data or ith content data that is associated and registered, in the link table, with other code value that is further associated with the code value and registered in the dot code linking table.

In this way, if the dot code linking table is registered in the storage unit and code values are associated and registered therein, the control unit can refer to the dot code linking table and the link table to continuously output the next content data after outputting desired content data. Moreover, as the links of code values may be confirmed by referring to the dot code linking table, content data to be continuously output can be read and output without being restricted to the information amount that one dot code retains.

It should be noted that, to continuously output content data in the above configuration, a code value and two or more pieces of content data are not necessarily associated and registered in the link table that is registered in the storage unit. It should also be noted that, in this invention, using the dot code linking table that registers code values that are respectively associated with the content data with a predetermined method in accordance with the order of continuous output in the storage unit, the content data may be continuously output at least once in the ascending or descending order of the order.

The fourth method may be that a content file that comprises content data and the file name of the content stores a file name that indicates other content data in addition to the unique file name of the content file. That is, a content file, that comprises the first content data or the ith content data and the file name, stores the file name unique to the content file as well as a file name indicating at least one other content file. When the dot pattern is read again, the control unit refers to the link table that is associated with the code value converted by the processing unit and outputs the registered first content data or ith content data from the output unit, as well as, refers to the file name that is stored in the content file and indicates the other content file, and continuously outputs the first content data or ith content data that is stored in the other content file from the output unit.

According to the above configuration, for continuously outputting content data, regardless of the code value or X and Y coordinate values defined by a dot code, the content file name stored in the content file is read, and that can be the instruction information that indicates whereabouts of content data to be output after outputting the desired content data. Thus, even when continuously outputting content data according to the above configuration, only one content data may be associated and registered with a code value in the link table registered in the storage unit.

Inputting of content data ends after completing such a processing for continuously outputting the content data. In such a case, the inputting ends by the operation instruction that is associated and registered with the code value and/or coordinate value defined by the dot pattern for starting/ending input, or operation of any one of the buttons provided on the input-output device. That is, the input of the content data by the input unit ends by operation of the input start/end button and/or reading the dot pattern for starting/ending input formed in a predetermined area on the medium surface by the optical reading unit.

It should be noted that, to link the content from the last division/linking until the end of input with an N+1th predetermined dot pattern, the N+1th predetermined dot pattern may be read by operation of the divide/link button or reading the dot pattern for dividing/linking 820 formed in a predetermined area on the medium surface by the optical reading unit. In this way, when the N+1th dot pattern 828 is read again by the optical reading unit, by referring to the link table, the corresponding N+1th content data is retrieved from the storage unit and output from the output unit.

After completing such an input of content data and linking to the dot patterns, these dot patterns are read by the optical reading unit. When the first predetermined dot pattern is read, the first content data is output from the output unit, and, then, at least one of the ith content data that is associated therewith by the above-described method is continuously output. If the fifth predetermined dot pattern is read, the fifth content data is output from the output unit, and, subsequently, for example, the sixth and seventh content data are continuously output.

FIGS. 24A to 24C show an example of other dot pattern (GRID5). FIG. 24A shows reference point dots 73a to 73e, virtual reference points 74a to 74d, and an information dot 72 in a dot pattern.

The dot pattern defines the direction thereof by the shape of a block. In GRID5, reference point dots 73a to 73e are first disposed. The shape indicating the orientation of the block (in this example, a pentagon oriented upward) is defined by the line connecting the reference point dots 73a to 73e. Next, based on the positions of the reference point dots 73a to 73e, virtual reference points 74a to 74d are defined. Next, a vector having a direction and length with each of the virtual reference points 74a to 74d as a start point is defined. Lastly, an information dot 72 is disposed at the end point of the vector.

In this way, in GRID5, the orientation of the block can be defined depending on how to arrange the reference point dots 73a to 73e. Then, when the orientation of the block is defined, the size of the whole block is also defined.

FIG. 24B shows an example of defining information based on whether or not an information dot 72 exists on the virtual reference points 74a to 74d in the block.

FIG. 24C shows an example in which two blocks of GRID5 are connected respectively in vertical and horizontal directions. However, the direction in which blocks are connected and arranged is not limited to the horizontal and vertical directions and the blocks may be arranged and connected in any direction.

It should be noted that, in FIGS. 24A to 24C, all of the reference point dots 73a to 73e and an information dot 72 are shown as the same shapes. The reference point dots 73a to 73e and the information dot 72 may be different shapes, and, for example, the reference point dots 73a to 73e may be larger than the information dot 72. Also, the reference point dots 73a to 73e and information dot 72 may be any shape as long as they are identifiable, including a possibility of a circle, a triangle, a rectangle, or a polygon of more angles.

Next, with reference to FIGS. 25 to 39, the following describes an input-output device comprising a handwriting input function of the invention.

Figure 25:
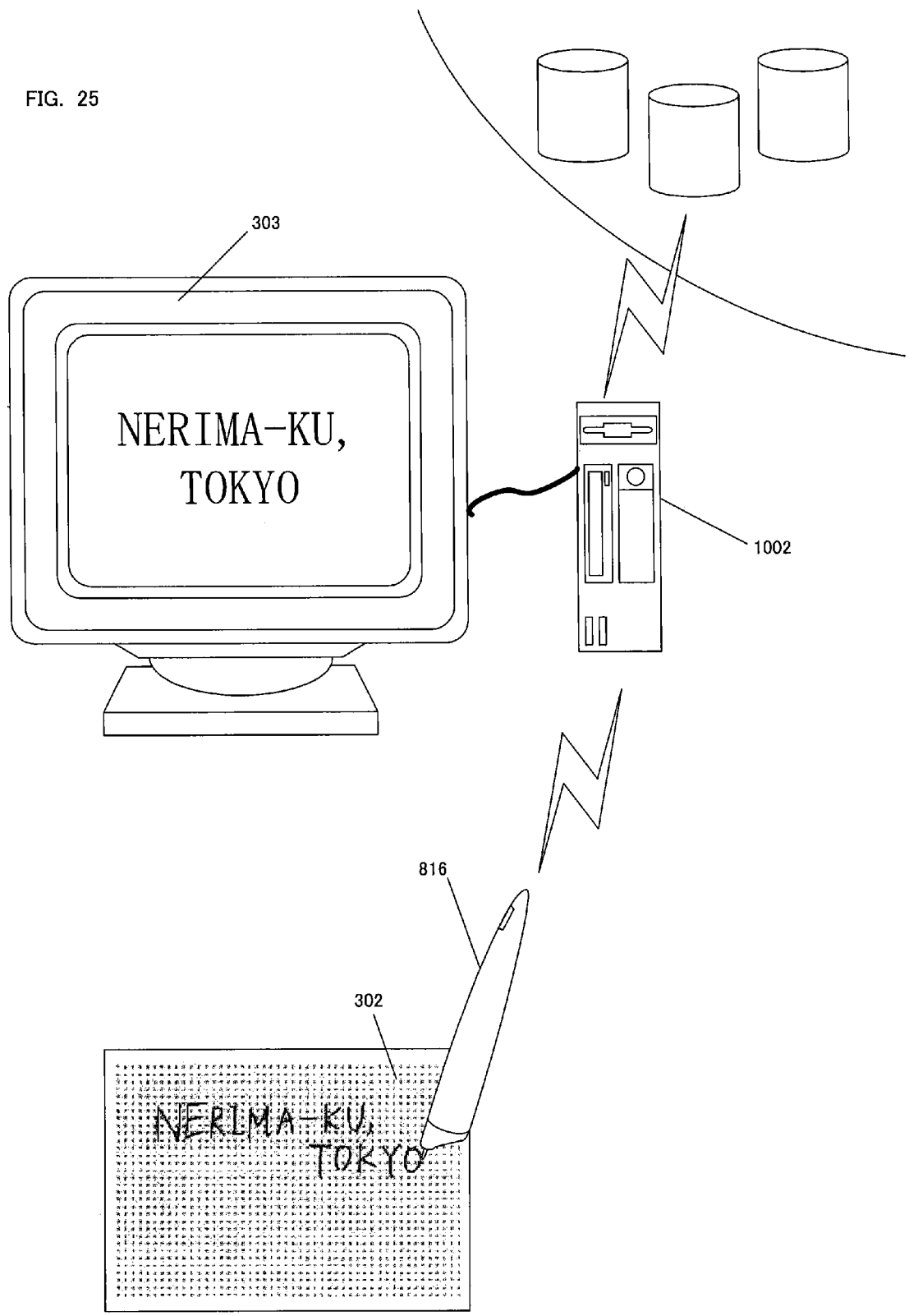
FIG. 25 is a conceptual view showing handwriting input operation.

FIG. 25 is a conceptual view showing handwriting input operation among use examples of the invention.

According to FIG. 25, if a handwriting input sheet as a printed medium 302 is written in using the input-output device 816, a text just as written is displayed on the display 303. This is realized by imaging dot patterns on the trajectory by a C-MOS camera embedded in the input-output device 816, analyzing numerical information (a dot code) defined by the dot pattern by the processing unit, and outputting a text as information corresponding to the numerical information.

In the invention, as embodiments of the input-output device 816 as for the method of outputting a text and a text string and content data corresponding to the text and text string, there can be considered: the first embodiment of transmitting a code value and/or a coordinate value that is written (read) by the input-output device 816 to an information processing device 1002; the second embodiment of recognizing a trajectory from the code values and/or coordinate values written by the input-output device 816 and transmitting the trajectory to the information processing device 1002; the third embodiment of recognizing a trajectory from the code values and/or coordinate values written by the input-output device 816, recognizing a text or a text string that corresponds to the trajectory, and outputting content data corresponding to the text or text string from the output unit, or controlling operation based on the operation instruction; and the fourth embodiment of recognizing a trajectory from the code values and/or coordinate values written by the input-output device 816, recognizing a text or a text string that corresponds to the trajectory, converting the text or text string to a text code or a text string code, and transmitting the text code or text string code to the information processing device 1002.

That is, in the first embodiment, the input-output device 816 is connected wirelessly or wiredly with the information processing device 1002, the input-output device 816 receives handwriting input operation by a user, and transmits the code values and/or coordinate values that are defined by dot patterns that are continuously read by the optical reading unit to the information processing device 1002 one after another.

The information processing device 1002 comprises a determination unit for determining handwriting input operation, a text recognition unit for recognizing a text or a text string including a plurality of character classes, such as hiragana, katakana, kanji, alphameric characters, symbols and the like, as a recognition result of receiving the handwriting input operation, a storage unit for registering a link table that associates and registers the text or text string with content data and/or an operation instruction, an output unit for outputting the content data, and a control unit for controlling operation of the determination unit, the text recognition unit, the storage unit, and the output unit, and/or operation based on the operation instruction.

Then, the information processing device 1002 determines reception of handwriting input by a user by the determination unit based on the operation determination code that is defined at least part of the code values transmitted one after another from the input-output device 816, recognizes a trajectory of the optical reading unit of the input-output device by changes in the coordinate values, recognizes a text and a text string corresponding to the trajectory by the text recognition unit, refers to the link table, and outputs content data corresponding to the text or text string that is recognized by the text recognition unit from the output unit, or controls operation based on the operation instruction.

It should be noted that, while the operation determination code is preferably used to determine whether or not handwriting input is received, if dot patterns are continuously read within predetermined coordinate values, reception of handwriting input may be started by determining that the handwriting input operation is being performed.

In this way, it is possible to realize both functions of not only outputting information corresponding to a dot pattern printed at the touched position by touching a desired position on the medium surface with a pen type scanner by a user (referred to as "touch input operation" in this invention), but also recognizing a trajectory by reading the dot patterns on the traced trajectory by tracing with the pen type scanner as if writing on the medium surface with a pen by handwriting (referred to as "handwriting input operation" in this invention) and outputting information corresponding to the trajectory. That is, without performing special operation before starting, the handwriting input operation is recognized as being started and the processing is executed by touching and tracing the writing area with the pen type scanner.

In the second embodiment, the input-output device 816 is connected wiredly or wirelessly with the information processing device 1002, the input-output device 816 receives handwriting input operation by a user, recognizes a trajectory from changes in coordinate values defined by the dot patterns that are continuously read by the optical reading unit, and transmits the trajectory to the information processing device 1002.

The information processing device 1002 comprises a text recognition unit that recognizes a text or a text string including a plurality of character classes, such as hiragana, katakana, kanji, alphameric characters, symbols and the like, as a recognition result of receiving the handwriting input operation, a storage unit that registers a link table that associates and registers the text or text string and content data and/or operation instruction, output unit that outputs a text code or a text string code converted from the text or text string and/or the content data, and a control unit that controls operation of the text recognition unit, the storage unit, the output unit and/or operation based on the operation instruction.

Then, the information processing device 1002 recognizes, by the text recognition unit, a text or a text string corresponding to the trajectory transmitted by the input-output device 816, converts into a text code or a text string code, and outputs the text code or text string code through the output unit and/or refers to the link table and outputs content data corresponding to the text or text string through the output unit of the information processing device, or controls operation based on the operation instruction.

In this way, the text recognition unit of the information processing device side that can accurately and fast perform enormous processing than the text recognition unit of the input-output device can be used. Text recognition requires a variety of dictionaries for recognizing texts, and the input-output device does not have enough memory and processing speed therefor. It will be appreciated that the Internet connected with the information processing device can also be utilized to recognize texts.

In the third embodiment, the input-output device 816 further comprises a text recognition unit that receives handwriting input operation by a user and recognizes a text or a text string including a plurality of character classes, such as hiragana, katakana, kanji, alphameric characters, symbols and the like, as a recognition result of receiving the handwriting input operation. The input-output device 816 further registers, by the storage unit, a link table that associates and registers a text or a text string recognized by the text recognition unit and content data and/or an operation instruction, recognizes, by the optical reading unit, a trajectory by changes in coordinate values defined by the dot patterns continuously read by the optical reading unit, recognizes, by the text recognition unit, a text or a text string corresponding to the trajectory, refers to the link table, outputs content data corresponding to the text or text string recognized by the text recognition unit through the output unit or controls operation based on the operation instruction.

In the fourth embodiment, the input-output device 816 is wiredly or wirelessly connected with the information processing device 1002. The input-output device 816 further comprises a text recognition unit that receives handwriting input operation by a user and recognizes a text or a text string including a plurality of character classes, such as hiragana, katakana, kanji, alphameric characters, symbols and the like, as a recognition result of receiving the handwriting input operation. The input-output device 816 recognizes a trajectory by changes in coordinate values defined by the dot patterns continuously read by the optical reading unit, recognizes a text or a text string corresponding to the trajectory by the text recognition unit, converts the recognized text or text string into a text code or a text string code, and transmits the text code or text string code to the information processing device 1002.

The information processing device 1002 outputs the text code or text string code transmitted from the input-output device 816 through the output unit, and/or refers to a link table of the information processing device, and outputs content data corresponding to the text code or text string code through the output unit of the information processing device, or controls operation based on the operation instruction.

In this way, not only using the content that is in a form adapted for the output unit of the input-output device or registered in the storage unit, but also using a variety types of output units that are incorporated in or connected with the information processing device and utilizing the Internet and the like, a lot of fascinating contents can be output.

It should be noted that, while a display 303 is preferably used to output a text, a text string, and content data corresponding to the text or text string, the invention is not limited to the above-described embodiments and can vary in many ways within a range described in the appended claims. That is, embodiments that can be obtained by combining technical means that are changed as necessary within the range described in the claims are also included in the technical scope of the invention.

Figure 26:
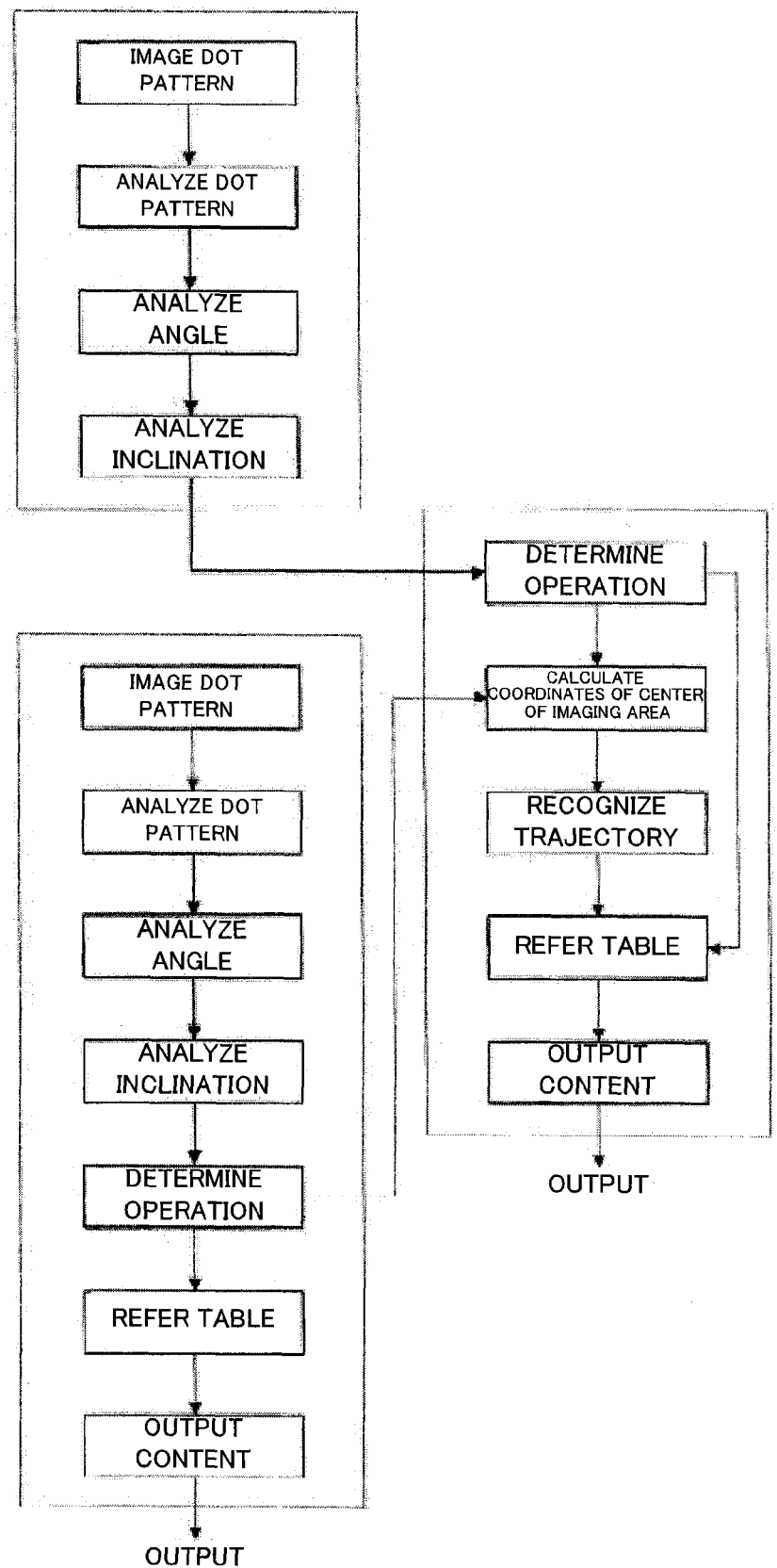
FIG. 26 is a block view showing an example of a variety of processing in the invention.

FIG. 26 is a block diagram showing an example of a variety of processing of the invention, that is, processing performed in the above-described input-output device or information processing device.

In the invention, the optical reading unit reads a dot pattern printed on the medium surface, the processing unit analyzes digitized information from the dot pattern, and the control unit determines operation performed by a user based on the digitized information, as well as outputs information corresponding to the digitized information (including centralized processing for an external information processing device) by referring to a table.

If the determined operation is touch input operation, a sound corresponding to the digitized information is output through the output unit, or a code value and/or a coordinate value is transmitted to the information processing device.

If the determined operation is handwriting input operation, the trajectory is recognized from the coordinate information of the digitized information, and information corresponding to the trajectory is output (or the trajectory itself is signalized and output to the information processing device, and information corresponding to the trajectory is output from the information output device).

Next, the following describes an example of a method of determining the above-described handwriting input operation.

FIG. 27 is a diagram illustrating a format, among the dot pattern formats, using at least part of the code value as an operation determination code.

The operation determination code is a code for a determination unit to automatically determine whether operation performed by a user is touch input operation or handwriting input operation. While not shown in the drawings, if the operation determination code converted from the dot code is "0," the determination unit determines the operation as touch input operation, and if the determination code is "1," the determination unit determines the operation as handwriting input operation.

However, more numbers of operation may be automatically determined by defining the operation determination code using 2 bits or more.

In such a case, the input-output device further comprises a determination unit that determines reception of the handwriting input operation by a user, and, based on such a operation determination code, the control unit determines reception of the handwriting input operation using the determination unit for each time the optical reading unit reads a dot pattern.

In this way, by performing reception of handwriting input operation using the operation determination code, the operation determination code can be read only by touching without tracing by a scanner pen, thereby starting receiving handwriting input operation more accurately and fast. Also, the input-output device can be clearly differentiated from a medium that uses code values and/or coordinate values by associating with content data and/or operation instructions.

That is, even if tracing operation is performed using the pen on the medium, the handwriting input operation is not immediately accepted due to the operation determination code. Generally, a high-speed CPU is required to increase the reaction speed as calculation time is required for searching if the read code value and/or coordinate value is registered in the link table and for receiving a handwriting input only when traced with the pen when the code value and/or coordinate value is not registered.

Figure 28B:
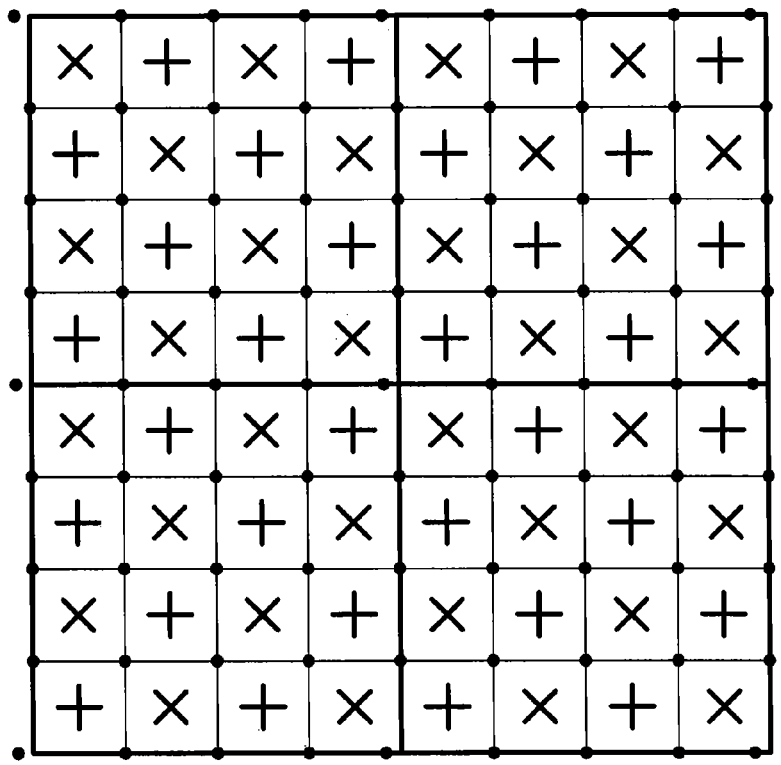
FIGS. 28A and 28B are diagrams illustrating a dot pattern that defines information using the second digitized information.
Figure 28A:
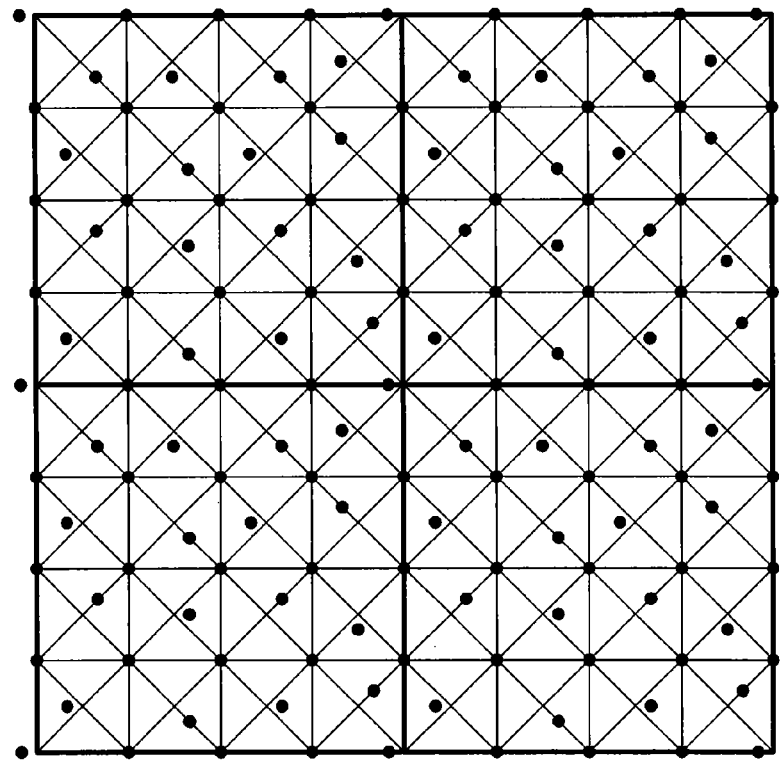
Figure 29B:
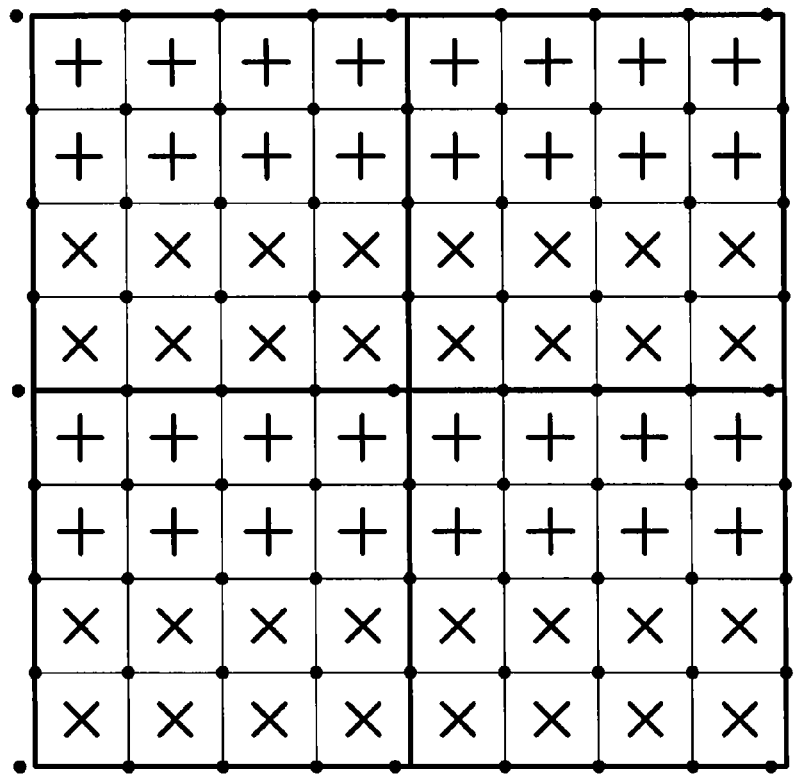
FIGS. 29A and 29B are diagrams illustrating a dot pattern that defines information using the second digitized information.
Figure 29A:
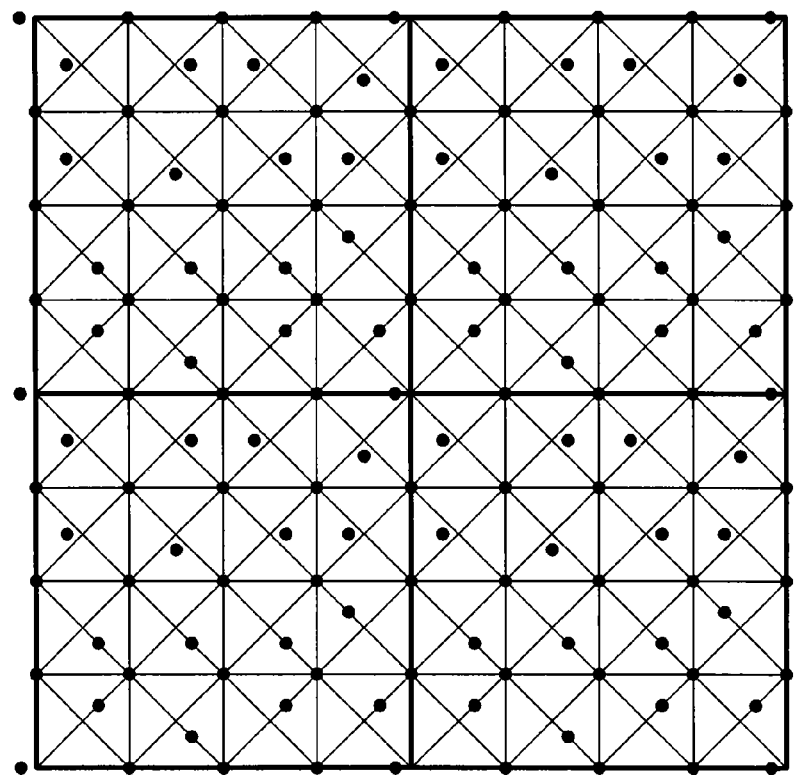

When using a dot pattern for defining information by arranging an information dot with a distance and a direction from a reference position (first digitized information), the information can be defined in the arrangement direction criteria itself, such as, arranging an information dot on a line in a + direction (lines in up-down and left-right directions) or on a line in a x direction (lines in diagonal directions) (second digitized information). If a case in which an information dot is arranged on a x direction line is defined as "0," and a case in which an information dot is arranged on a + direction line is defined as "1," the second digitized information in the dot pattern of FIG. 28B is "1010010110100101," and the second digitized information in the dot pattern of FIG. 29B is "0000000011111111."

It is also possible to automatically determine operation performed by a user by referring to a table in which the second digitized information and touch input operation or handwriting input operation are associated.

It should be noted that, while the input-output device may be provided with a handwriting input start/end button or the like and operation may be switched by operation of the button, automatic determination of operation using a dot pattern format is most appropriate in terms of production costs, eliminating a need to change molds no matter what kind of functions the input-output device may have.

When using a handwriting input start/end button, an already existing button may be switched to a handwriting input start/end button according to an operation embodiment, or may have a function as a handwriting input start/end button depending on the operation method. The handwriting input operation and touch input operation may be switched by reading a dot pattern for starting/ending handwriting input formed in an area other than the writing area and according to the operation instruction defined in the dot pattern.

Using a handwriting input start/end button, the same area that is used for associating a code value and/or a coordinate value with content data and/or an operation instruction can be used as a writing area. In the writing area, as coordinate values are required for drawing trajectories and the coordinate values require many different dot codes, in order to effectively utilize the limited dot codes, the same dot codes are used for coordinates in different writing areas and the writing areas can be identified by each dot pattern for starting/ending handwriting input.

FIG. 30 is a format in which 2 bits are used for a writing area identification code among code values that are converted from a dot code defined by a dot pattern.

The writing area identification code is a code for the control unit to identify an area to which writing is being performed when a user performs handwriting input operation.

While the dot patterns are required to at least define coordinate information to realize handwriting input operation, as, with only the coordination information, where the optical reading unit read is required to be searched from the whole coordinate system, the processing in the control unit takes time.

Also, to identify the writing area using only the coordinate information, coordinates for indicating a boundary of the writing area should be defined using a table or a function, and the input coordinate values should be consecutively determined whether the input coordinate value is within the scope of the table or the function, which complicates analysis. For this reason, to identify the writing area only with coordinate information, the writing area is required to be a general rectangle for maintaining analysis efficiency.

Thus, processing efficiency in the processing and control units can be increased by partitioning dot patterns on the medium surface using writing area identification codes, and hierarchically identifying coordinate information of the optical reading unit.

Figure 31:
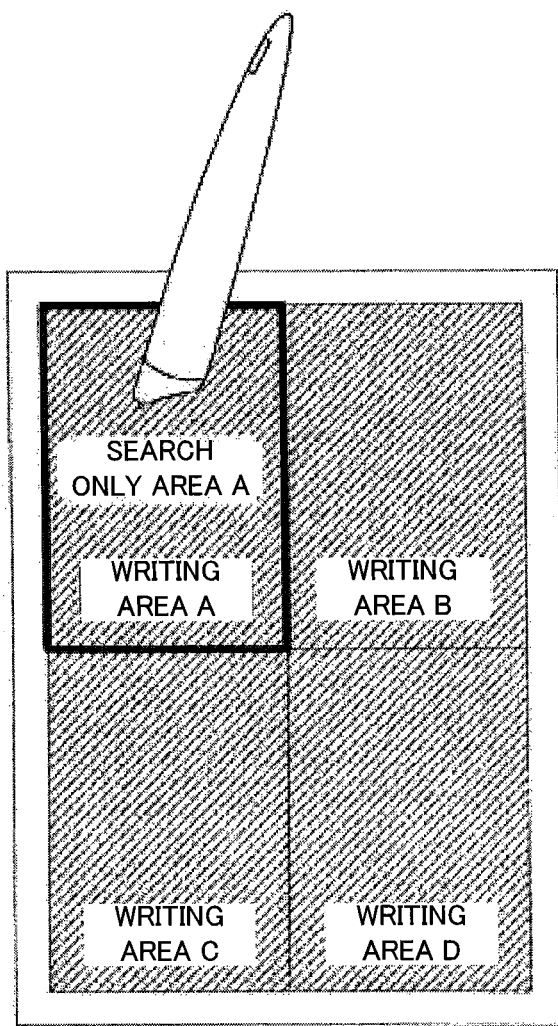
FIG. 31 is a diagram illustrating an example of using a dot pattern that includes a writing area identification code.
Figure 32:
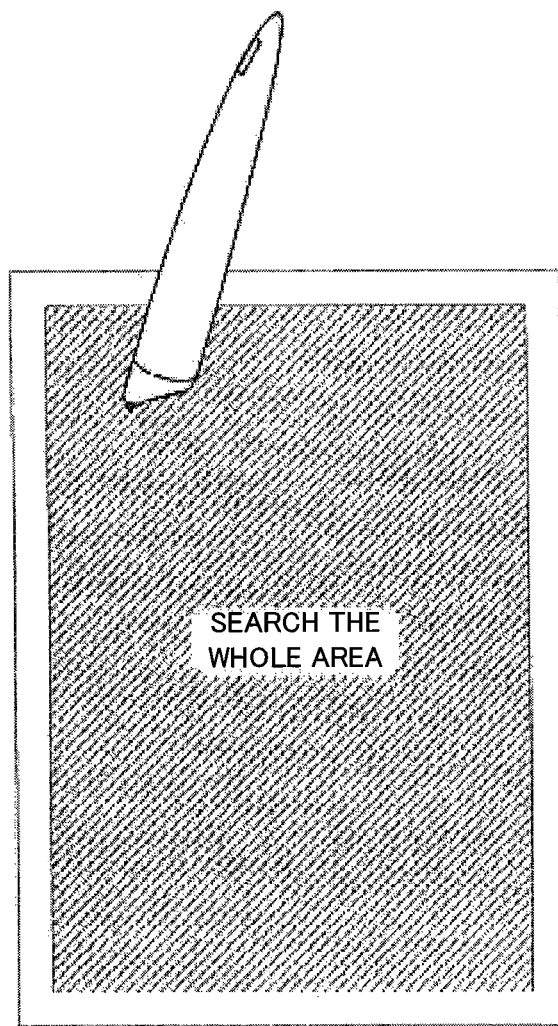
FIG. 32 is a diagram illustrating an example of not using a dot pattern that includes a writing area identification code.

With reference to FIGS. 31 and 32, the case of using the writing area identification code and the case of not using the code are explained by comparing them.

FIG. 31 is a conceptual view showing a case in which the writing area identification code is used. FIG. 32 is a conceptual view showing a case in which the writing area identification code is not used.

As shown in FIG. 31, using the writing area identification codes, the coordinates of the optical reading unit can be identified by searching only within the identified writing area. However, if the writing area identification codes are not used as in FIG. 31, the coordinates of the optical reading unit should be identified from the whole coordinates.

In FIG. 31, as the search scope is one fourth of the one in FIG. 32, the search speed of coordinates can take four times as much.

While not shown in the drawings, if the writing area identification codes are used, whatever the shape of the writing area may be (for example, a circle, an elliptic arc, or, if an illustration is superimposingly printed, a shape along the actual line that forms the illustration), the same analysis efficiency can be realized.

As described above, using the writing area identification codes, the writing area identification codes are read only by touching without tracing with the scanner pen, reception of the handwriting input operation can be started accurately and fast, and, further, which area is written can be identified. For example, if the writing area is an address field, the written trajectory is searched in the address database (a dictionary) and a text or a text string can be easily recognized. That is, by identifying the writing area, the dictionary specific to the written text or text string is identified, and the text recognition rates can be increased to a large extent. It will be appreciated that, as the writing area identification code can be read by touching, using a high-speed CPU, text recognition can be performed in real time while tracing with the pen.

In addition, using the writing area identification codes that increase analysis efficiency, for example, when handwriting input operation is performed in different writing areas A and B formed on the medium surface and text recognition is performed, if writing to A starts at first, then, writing to B starts in the middle, and then, the rest is written to A, and writing to B is performed again, the writing order can be stored and connected, and writing recognition and text recognition of the writing areas A or B can be accurately performed.

It should be noted that, to perform text recognition using the writing area identification codes, the written texts can be sequentially recognized in real time. It will be appreciated that writing may be completed before performing text recognition of those trajectory.

Figure 33:
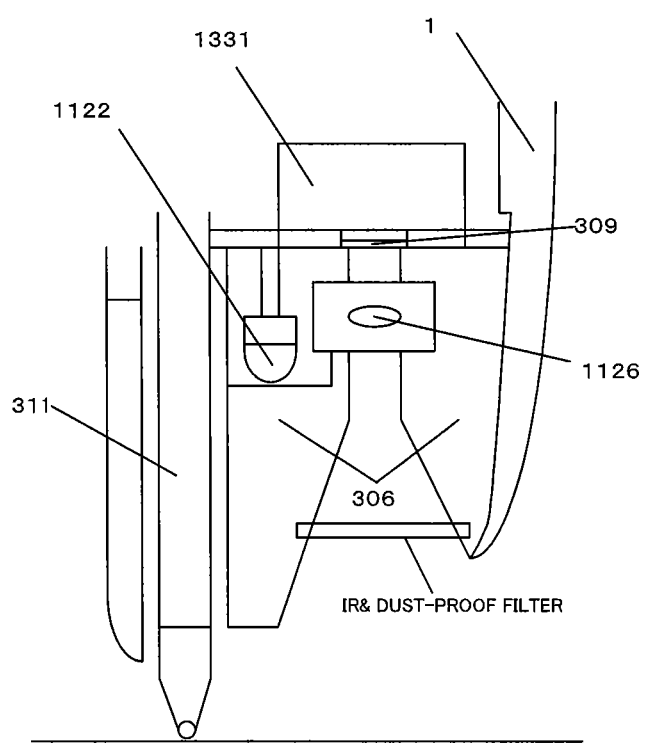
FIG. 33 is a section view showing a configuration of the leading end of the input-output device.

FIG. 33 is a section view showing the leading end of the input-output device used in handwriting input. Such an input-output device has a hollow portion formed thereinside, and comprises a light guide 306 that has an opening at the leading end thereof, a lens 1126 disposed at a position facing the opening of this light guide 306, an IRLED 1122 arranged on the same surface as this lens 1126 as a light source for irradiating light of a predetermined wavelength to the medium surface on which a dot pattern is formed, a C-MOS sensor 309 disposed at a position receding from the lens 1126, a PCB 1331 at a further receded position, and a CPU which is not drawn and disposed on the PCB 1331. The hollow portion of the light guide 306 is formed in a tapered shape with a larger diameter toward the opening of the lens 1126.

Also, the input-output device is attached with a pen 311 as a writing material. Generally, when printing using a writing material such as a pen, as the writing material is used by being inclined, the external periphery of the input-output device is formed to be able to incline until 45 degrees. In such a case, by imaging the medium surface near the leading end of the pen 311, brushstrokes of the pen 311 that position apart from the center of the imaging area upon printing and moved distance thereof and the like can be accurately analyzed.

The pen 311 as a writing material can be stored in a variety of ways so as not to leave brushstrokes on the medium surface. For the storing method, a technique used for pens such as general ball-point pens can be utilized as is. For example, a storing method by knocking or rotating may be employed or a cap may cover the pen.

Also, the pen can be switched as in general three-color ball point pens. In such a case, not only switching the pens with different colors, an eraser or correction liquid may also be used instead of the pen.

Further, a projection for instruction (a stylus pen) may be provided instead of the pen 311 and the vicinity of the brushstroke of the projection for instruction may be imaged. The projection for instruction may be used by providing a storing space thereinside to store the pen 311. The storing space may be provided in the input-output device main unit.

As shown in FIG. 33, in the input-output device, X and Y coordinate values that are defined by dot patterns imaged by the imaging unit and X and Y coordinate values that are defined by dot patterns on a trajectory that is actually written with the pen 311 are different. Further, X and Y coordinate values defined by dot patterns on the trajectory should be converted to x and y coordinate values in the writing area on the medium surface to perform writing input or operation instructions.

The following describes a method for calibrating X and Y coordinate values of dot patterns imaged by the input-output device of the invention to dot patterns on a trajectory that is actually written by the pen 311, and a method for converting X and Y coordinate values in the dot pattern coordinate system to x and y coordinate values in the writing area coordinate system.

The relationship between the writing area coordinate system and the dot pattern coordinate system will be described with reference to FIG. 34.

In the writing area coordinate system, the lower left corner is defined as (0, 0). x and y coordinate values in the writing area are expressed in millimeter. For example, a coordinate position of (16, 40) indicates a position moved from the lower left corner of the writing area by 16 mm rightward and 40 mm upward.

Blocks of dot patterns, each of which defines one set of X and Y coordinate values in the dot pattern coordinate system, are continuously formed in the writing area. The X and Y coordinate values indicate the position of the central point of the block. The coordinate values in the dot pattern coordinate system are expressed as [X, Y] to distinguish from the coordinate values in the writing area coordinate system.

Figure 35:
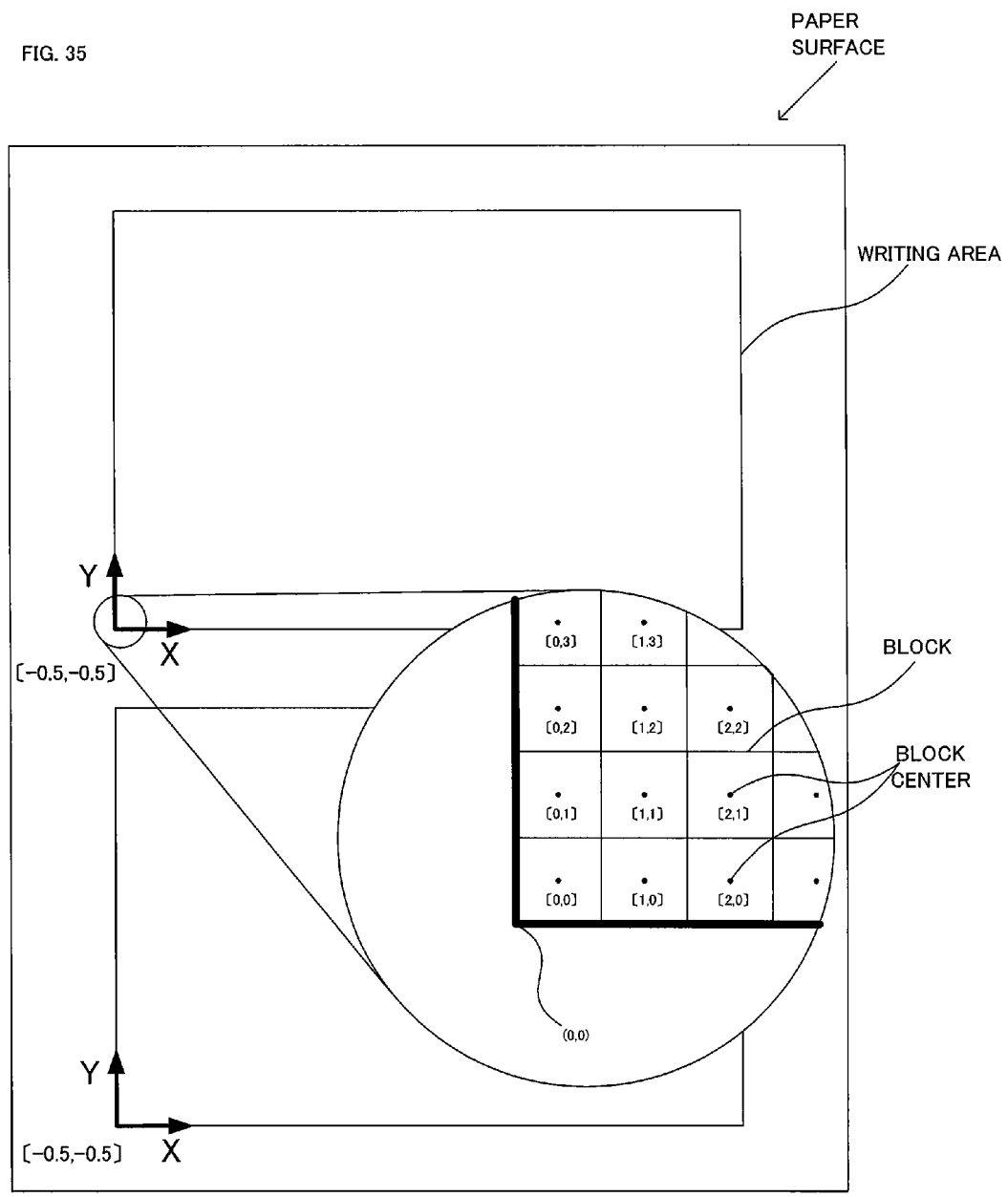
FIG. 35 is a diagram illustrating a relationship between the coordinate system of a writing area and the coordinate system of a dot pattern.

If the lower left corner of the writing area is defined as the origin (0, 0) in the coordinate system, and the lower left corner of the block of the dot pattern where [0, 0] are defined is adjusted to the origin (0, 0), the dot patterns are formed such that X and Y coordinate values at the lower left corner in the dot pattern coordinate system become [−0.5, −0.5] in any writing area as shown in FIG. 35. In such a case, a unique code value is defined in the dot pattern formed on each writing area to identify each writing area. The same code values may be used if there is no need to identify the writing areas from one another.

Figure 37:
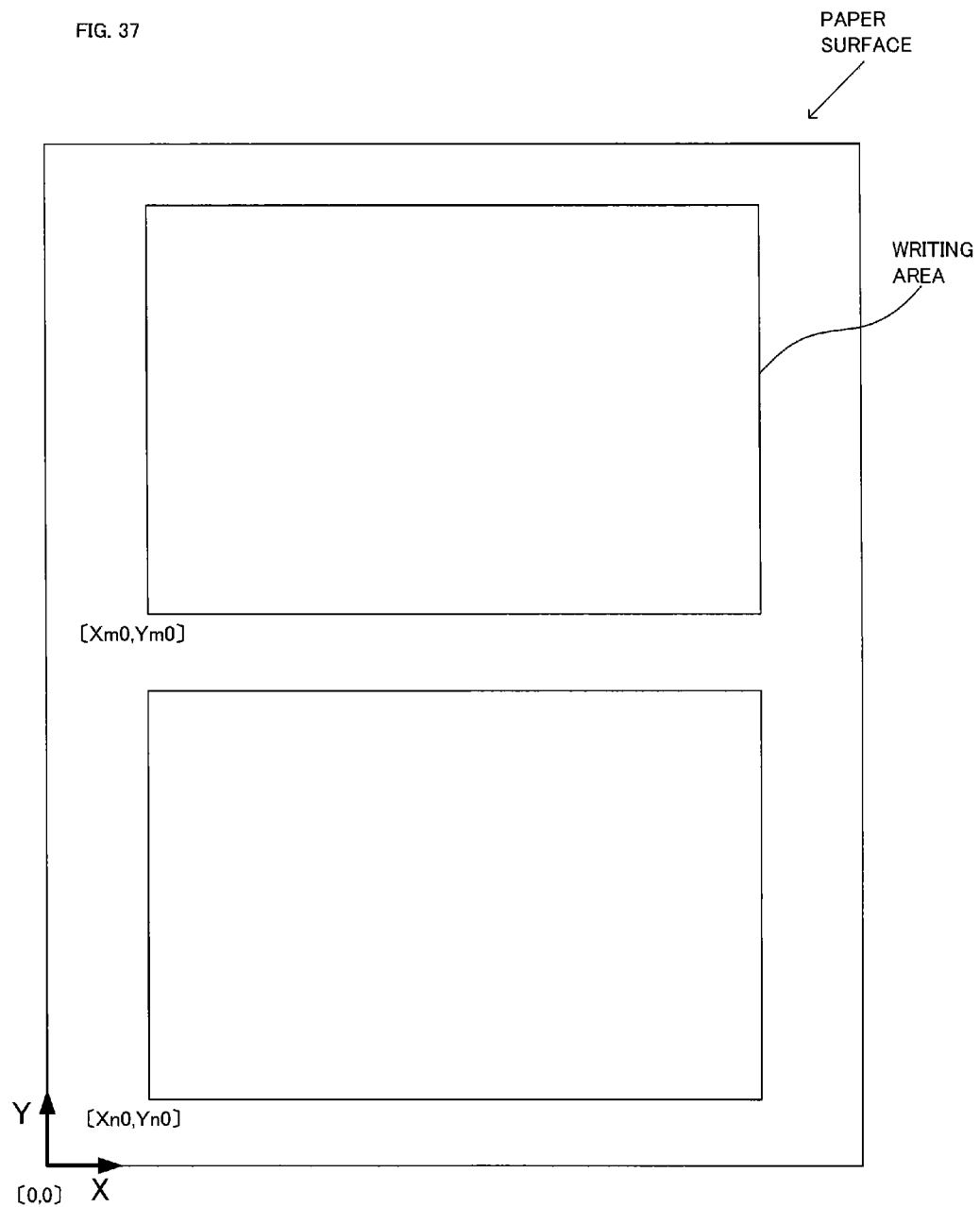
FIG. 37 is a diagram illustrating a relationship between the coordinate system of a writing area and the coordinate system of a dot pattern.

Also, as shown in FIG. 37, dot patterns defining X and Y coordinate values are formed over the entire paper surface, and unique code values are defined in the writing area in addition to the X and Y coordinate values. Here, the X and Y coordinate values of the lower left corner of the writing area becomes [Xn0, Yn0] (n is a number for identifying the writing area).

Next, if one side of each block is L mm, X and Y coordinate values are converted to those in the writing area coordinate system as described below.

As shown in FIG. 35, if a dot pattern is formed by defining the X and Y coordinate values of the origin (0, 0) as [−0.5, −0.5], the coordinates [X, Y] in the dot pattern coordinate system become (X×L+L/2, Y×L+L/2) in the writing area coordinate system.

Figure 36:
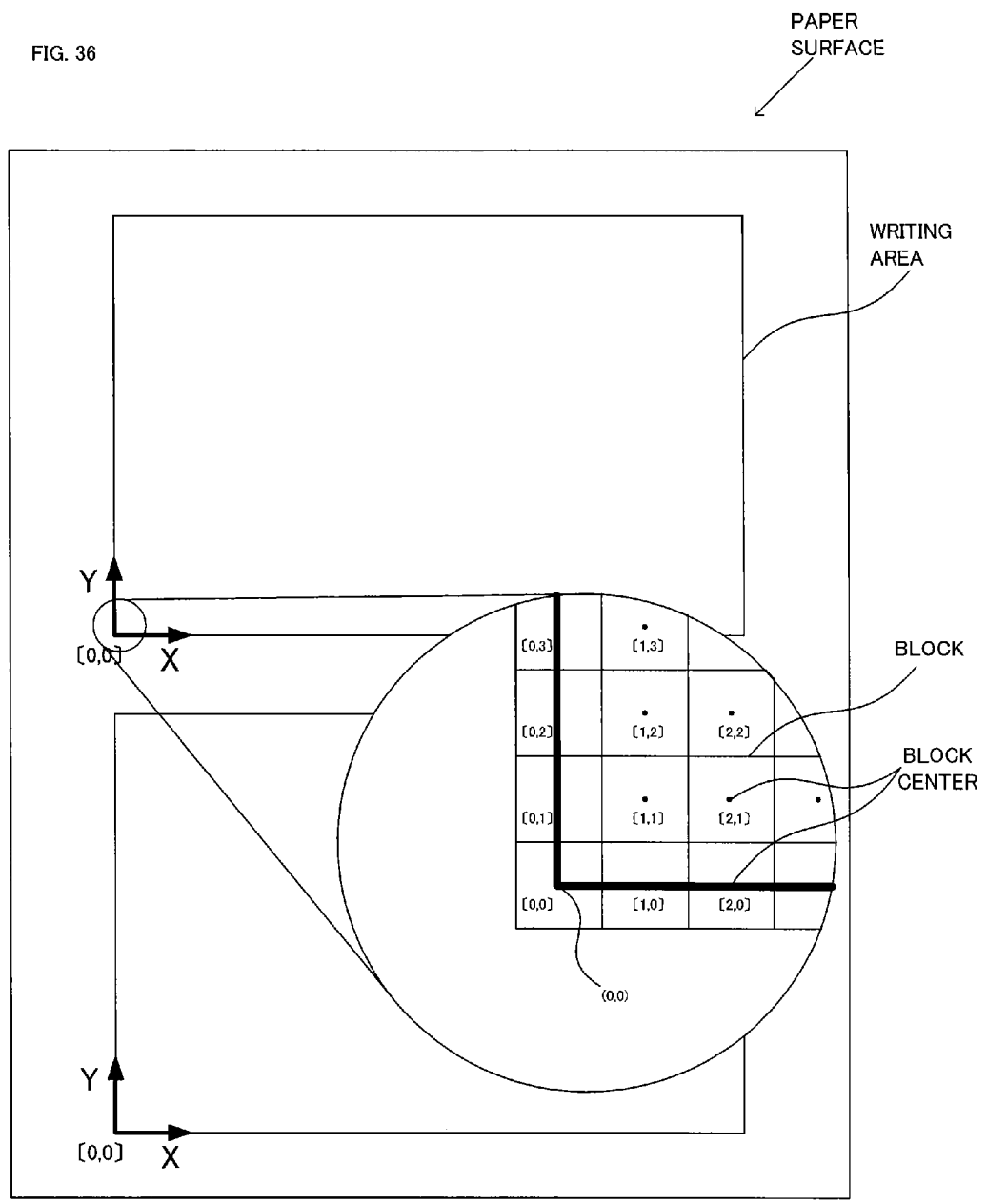

It should be noted that, as shown in FIG. 36, if the lower left corner of the writing area is defined as the origin (0, 0) in the coordinate system, and the center point of the block of the dot pattern where [0, 0] is defined is adjusted to the origin, the coordinates become [X×L, Y×L].

Figure 34:
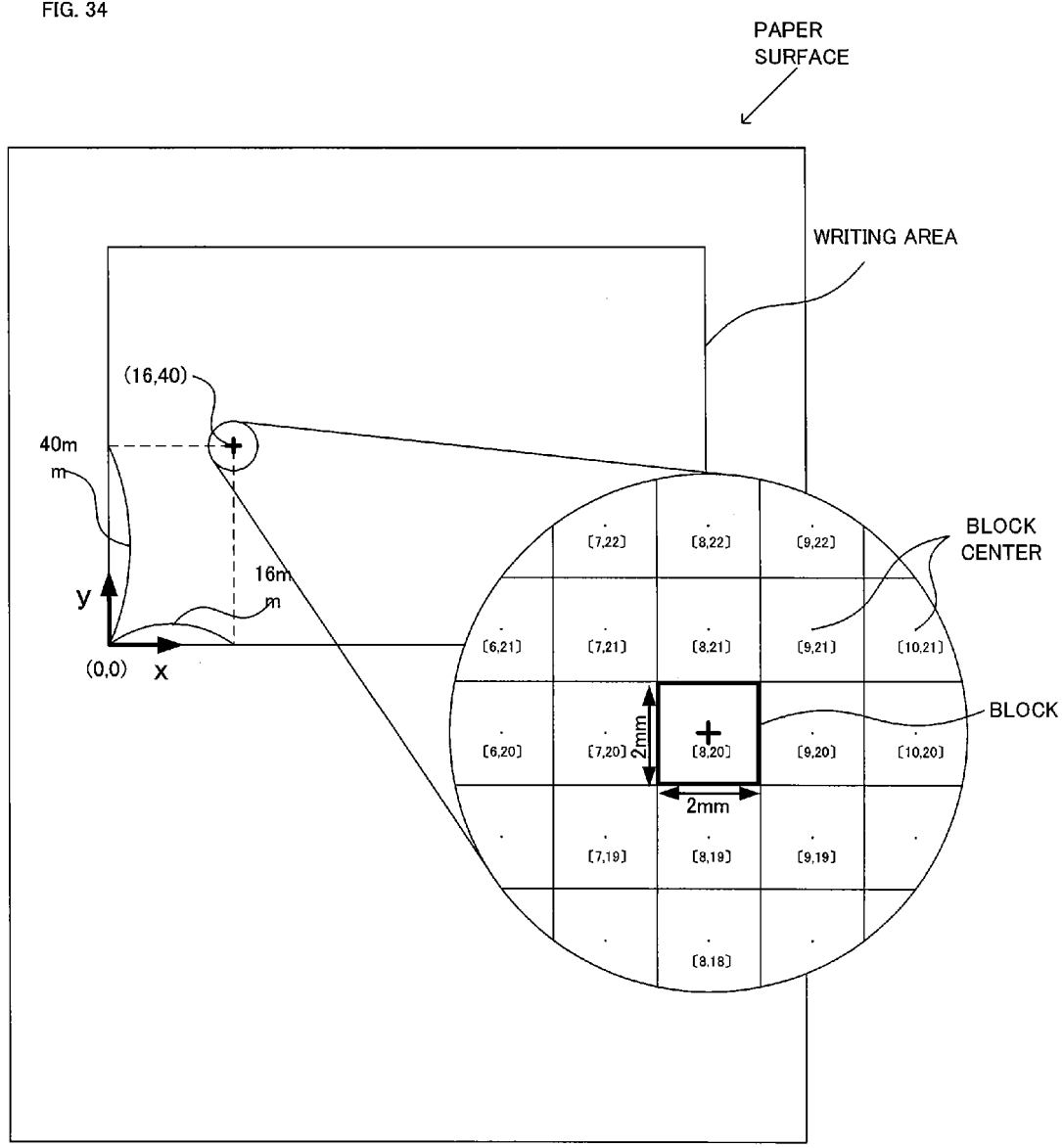
FIG. 34 is a diagram illustrating a relationship between the coordinate system of a writing area and the coordinate system of a dot pattern.

It should be noted that the relationship between the writing area coordinate system and the dot pattern coordinate system in the example of FIG. 36 is the same as the example of the enlarged part of FIG. 34.

If X and Y coordinate values at the lower left corner of the writing area become [Xn0, Yn0] as shown in FIG. 37, the coordinates [X, Y] in the dot pattern coordinate system become ((X−Xn0)×L, (Y−Yn0)×L) in the writing area n coordinate system.

Figure 38:
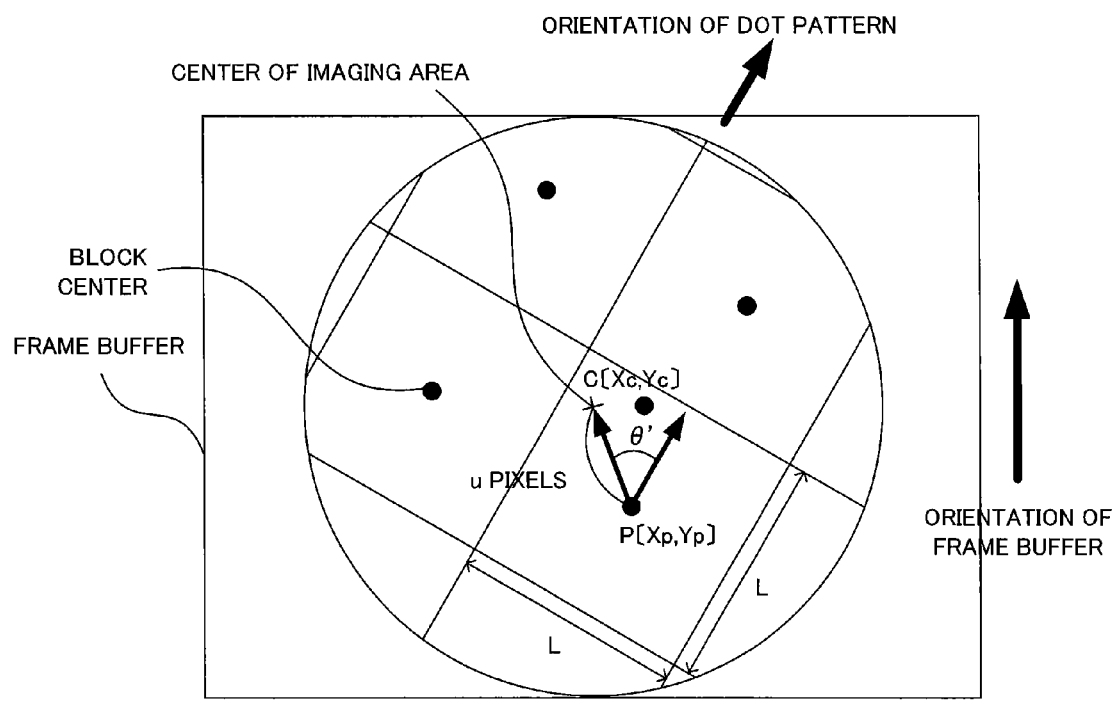
FIG. 38 is a diagram illustrating a calculation method of X and Y coordinate values at the center of the imaging area.

The following describes a method for calculating X and Y coordinate values [Xc, Yc] of the center of the imaging area C with reference to FIG. 38.

The number of pixels M constituting the interval between the centers of adjacent blocks is obtained by temporarily storing the captured image in a frame buffer of a predetermined resolution and analyzing the image. As the interval between the centers of the blocks is equal to length L of one side of the block, if the size of the captured image per one pixel with reference to L is a value k in a dot pattern coordinate system, we have k=L/M.

Similarly, by analyzing the image, the number of pixels u constituting the interval between the center of the block P [Xp, Yp] closest to the center of the imaging area C and the center of the imaging area C is obtained. The distance CP from the center of the imaging area C to the center of the block P closest to the center of the imaging area becomes CP=k×u.

Next, if a dot pattern is formed on the paper surface so that the orientation of the dot pattern (the orientation of the writing area) becomes upward of the writing area, and the angle between the orientation of the dot pattern and PC vector is defined as θ' (anticlockwise rotation is defined as the positive direction), [Xc, Yc]=[Xp−Cp×sin θ', Yp+Cp×cos θ'] is calculated.

Figure 39:
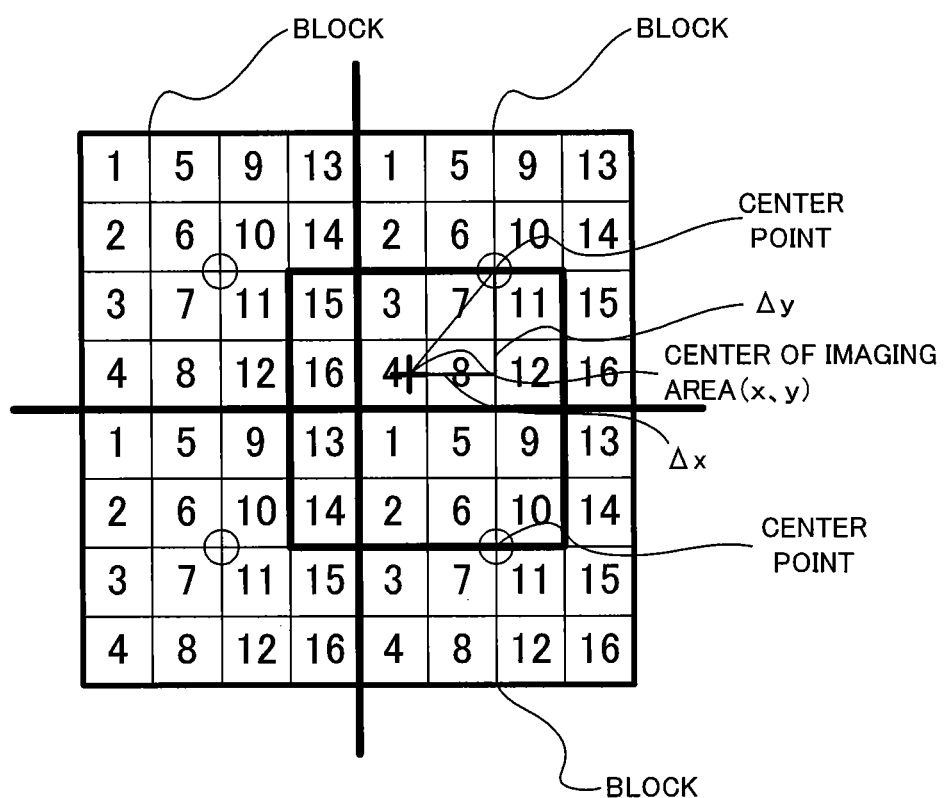
FIG. 39 is a diagram illustrating a calculation method of X and Y coordinate values at the center of the imaging area.

FIG. 39 is a diagram illustrating a method for calculating the center of the imaging area when the dot patterns are captured by a camera.

When the dot pattern is retrieved as image data by a camera, after calculating X and Y coordinate values at the center position of the block, x, y coordinate values of the center of the imaging area is calculated by interpolating coordinate values using distances Δx, Δy from the center position where the X and Y coordinate values are calculated to the center position of the imaging area, based on the orientation of the dot pattern obtained from the key dot and increased values of the X and Y coordinate values between the central positions of the adjacent blocks.

Next, the following describes an example of the information processing system that comprises the input-output device and an information processing device that operates by connecting with the input-output device.

The configuration of the input-output device of this embodiment comprises: a storage unit that registers a link table that associates and registers a code value and/or a coordinate value and content data and/or an operation instruction and the content data and/or operation instruction; an optical reading unit that reads a dot pattern formed on the medium surface; a processing unit that analyzes a dot pattern from image information of the dot pattern read by the optical reading unit and converts into a code value and/or a coordinate value; a connection unit that connects wiredly or wirelessly with the information processing device; a connection recognition unit that recognizes whether there is a connection with the information processing device; an output unit that outputs by retrieving the content data that is associated with the code value and/or coordinate value converted by the processing unit from the storage unit, after reading the dot pattern by the optical reading unit; and a control unit that controls operation of the optical reading unit, the processing unit, the connection unit, the connection recognition unit, and the output unit, and/or operation based on the operation instruction. The configuration of the information processing device comprises: the storage unit that registers a link table that associates and registers the code value and/or coordinate value transmitted through the connection unit from the input-output device and content data and/or an operation instruction and the content data and/or operation instruction; a connection unit that connects wiredly or wirelessly with the input-output device; and a control unit that controls operation of the connection unit and/or operation based on the operation instruction.

To output by retrieving the content data associated with the code value and/or coordinate value transmitted from the input-output device from the storage unit, the information processing device may comprise an output unit, or the information processing device may be connected with a separate output device and the output device may output the content data.

It will be appreciated that the input-output device may output corresponding content data.

In the information input-output system that includes such input-output device and information processing device, the control unit of the input-output device switches operation based on whether or not a connection between the connection unit and the information processing device is recognized by the connection recognition unit; if the connection recognition unit recognizes a connection between the connection unit and the information processing device, the control unit transmits a code value and/or a coordinate value converted by the processing unit or the operation instruction that is associated and registered with the code value and/or coordinate value through the connection unit to the information processing device, and the information processing device performs operation based on the code value and/or coordinate value or the operation instruction associated and registered with the code value and/or coordinate value; and, if the connection recognition unit does not recognize a connection between the connection unit and the information processing device, the control unit outputs the content data from the output unit, or controls operation based on the operation instruction.

In this way, it is possible to realize an information processing system using a highly useful input-output device that can perform a function as an input device that depends on software of an information processing device in a state in which the input-output device is connected with the information processing device (including a personal computer, the same applies hereafter) while enabling independently inputting and outputting information when used alone.

Figure 40A:
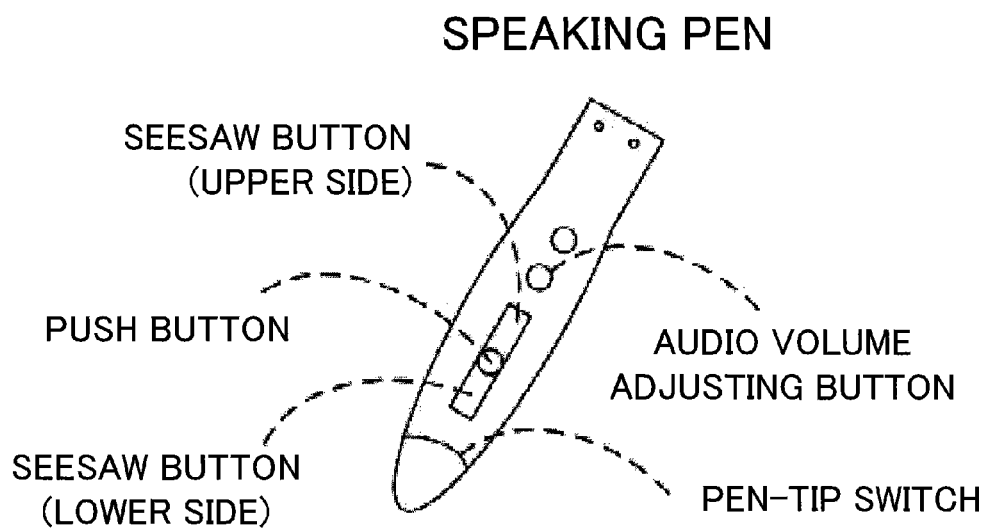
FIGS. 40A and 40B are diagrams illustrating another embodiment of the input-output device of the invention.
Figure 40B:
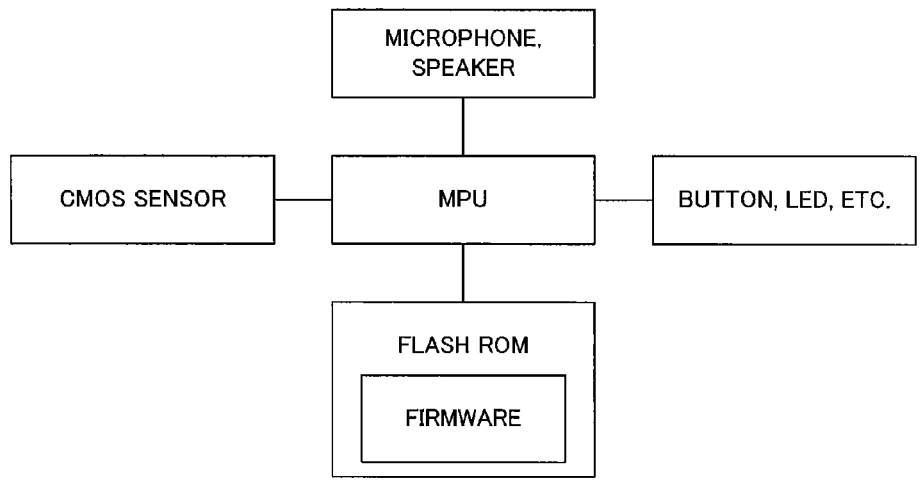

Next, the following describes another embodiment of the input-output device of the invention with reference to FIGS. 40A and 40B.

FIGS. 40A and 40B are diagrams illustrating another embodiment of the input-output device of the invention. FIG. 40A shows a schematic view of a case in which the input-output device is a speaking pen, and FIG. 40B expresses a block diagram of the configuration of the speaking pen.

As shown in FIGS. 40A and 40B, the speaking pen comprises: an audio volume adjusting button, a seesaw button (upper side), a seesaw button (lower side), a push button, a pen-tip switch, a microphone, a speaker, an LED, a C-MOS sensor, a Flash ROM, a firmware, and an MPU.

The input-output device of this embodiment is the speaking pen that can reproduce and record sounds and play other functions, the primary functions of which are reproducing and recording sounds and linking. As the reproducing function, when the speaking pen reads a dot pattern, the sound associated (linked) by the above-described method is reproduced by the embedded speaker. As the sound recording function, the embedded microphone stores the recorded sound and links to a code value that is defined by a dot pattern. The user can reproduce sounds that are recorded by the reproducing function by reading the linked dot pattern.

Also, a pen-tip switch is equipped at the pen tip, which analyzes dot patterns only when reading a printed material or the like, thereby saving energy consumption.

Next, the following describes a main functional specification of the speaking pen.

When reproducing sounds using dot patterns, the speaking pen, after reading the dot pattern, reproduces sounds associated with a code value and/or a coordinate value that is defined by the dot pattern. If no sound is linked in the link table, nothing happens.

When a push button equipped on the speaking pen is used to reproduce sounds, the speaking pen reproduces the currently selected sound (an active file) when the push button is pressed. An audio file of index number 1 is selected as an active file upon powering up. It should be noted that it is preferable to set that the active file does not change no matter how many times the push button may be pressed.

Here, the active file refers to a file that has played last, or as described later herein, the first file that is cued immediately after long-pressing the seesaw button, or a file immediately after recording sounds.

When a dot pattern is read during reproducing music, reproducing of the music stops and the corresponding audio file is reproduced. If there is no corresponding audio file when the dot pattern is completed to be read, or analysis thereof is failed, reproducing of the music does not stop.

The reproducing sound stops by pressing the push button.

The push button is used to record sounds, and the speaking pen starts recording sounds by specific operation of the push button (long-pressing for two seconds or more).

When the push button is pressed during recording sounds, the speaking pen stops recording the sounds. The recorded audio file is stored at the last number of the index. It should be noted that, as described above, this file becomes the active file.

When a different audio file is desired to be reproduced, the seesaw button equipped on the speaking pen is used. When the seesaw button (lower side) is pressed, an audio file which index number is next to the one of the active file is reproduced. It should be noted that the active file is changed to the following file. It should be noted that if the seesaw button (lower side) is pressed when the last audio file (which index number is the last) is the active file, the active file returns to the first audio file (which index number is 1).

When the seesaw button (upper side) is pressed, an audio file which index number is before the one of the active file is reproduced. The active file is changed to the previous file. Similarly, if the seesaw button (upper side) is pressed when the first audio file (which index number is 1) is the active file, the active file returns to the last audio file (which index number is the last).

If specific operation (e.g., long pressing for two seconds or more) is performed to the seesaw button (upper side), the active file returns to the one of the index file number 1, and the corresponding audio file is reproduced.

In order to link using the speaking pen, the speaking pen is turned to a link wait state by performing specific operation (e.g., long pressing for two seconds or more) to the seesaw button (lower side) when any one of the following conditions is met: (i) during reproducing a sound, (ii) within two seconds after reproducing a sound, (iii) during recording a sound, and (iv) within two seconds after recording a sound.

Setting such conditions can prevent users (mainly children) from mistakenly establishing a link without intention.

It should be noted that when specific operation is performed to the seesaw button (lower side) (i) during reproducing a sound or (iii) during recording a sound, the reproducing or recording the sound ends and the speaking pen becomes a link wait state.

Then, in the link wait state, if a dot pattern is read while performing specific operation (e.g., long pressing for two seconds or more) to the seesaw button (lower side), the active file and a code value and/or a coordinate value that is defined in the dot pattern are linked. It should be noted that if a dot pattern that has been already used for another link is selected, a predetermined warning sound (a beep sound) is reproduced. That is, a plurality of audio files cannot link to one dot pattern excluding the case that is described later.

Figure 41:
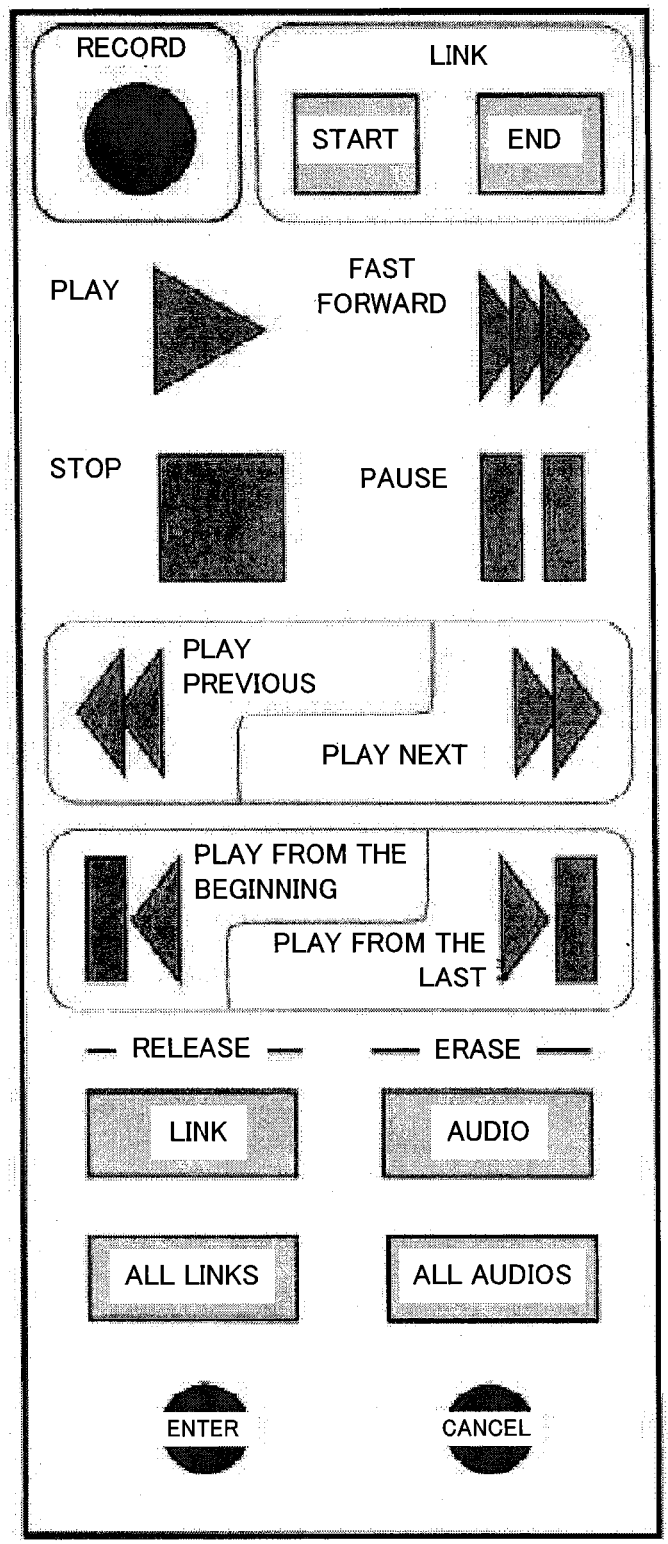
FIG. 41 is a diagram showing an example of a paper controller.

Next, the following describes details of the functions of the speaking pen using a paper controller with reference to FIG. 41.

FIG. 41 is a diagram illustrating an overview of a paper controller. The paper controller is printed with dot patterns used for realizing functions including the above-described recording sounds, reproducing sounds, stop, link start/end, play previous file, play next file, play from the start, play from the last, as well as dot patterns used for realizing other functions, that is, fast forward, pause, release link, delete audio file, and, in addition, printed with visual information corresponding to those dot patterns.

When these dot patterns are read, operation corresponding to the read dot patterns is performed based on the operation instruction associated with the code values and/or coordinate values that are defined in the dot patterns.

When an icon provided near the position printed as "FAST FORWARD" is read, a dot pattern superimposingly printed on the icon is read by the speaking pen, and the playback speed of the reproducing sound is doubled. If the icon is read once again, the sound returns to the former speed.

When an icon provided near the position printed as "PAUSE" is read, the currently reproducing sound pauses, and, when the icon is touched again, the pause is released and the sound is started to be played.

When an icon printed as "LINK" near the position printed as "RELEASE" is read, the speaking pen attempts to release one of the plurality of code values and/or coordinate values that are linked to the active file. On this occasion, the speaking pen announces "The link will be released. Please touch the ENTER button to admit," then, if an icon printed as "ENTER" is touched, the release is performed. If an icon printed as "CANCEL" is touched, the release is cancelled.

Similarly, when an icon printed as "ALL LINKS" near the position printed as "RELEASE" is touched, the speaking pen attempts to release all of the plurality of code values and/or coordinate values that are linked to the active file. On this occasion, the speaking pen announces, "All links will be released. Please touch the ENTER button to admit," then, if an icon printed as "ENTER" is touched, the release is performed. If an icon printed as "CANCEL" is touched, the release is cancelled.

When an icon printed as "AUDIO" near the position printed as "ERASE" is touched, the speaking pen attempts to delete the active audio file. On this occasion, the speaking pen announces, "The audio file will be deleted. Please touch the ENTER button to admit," then, if an icon printed as "ENTER" is touched, the deletion is performed. If an icon printed as "CANCEL" is touched, the deletion is cancelled.

Similarly, when an icon printed as "ALL AUDIOS" is touched, the speaking pen attempts to delete all audio files registered therein, and performs the operation according to operation of "ENTER," or "CANCEL."

Next, the following describes extended specifications of the speaking pen. The extended specifications can be executed by reading specific dot patterns. That is, a paper controller for extended functions is separately prepared and the modes of the following functions can be changed using the controller.

In an angle reading mode, a plurality of audio files can be linked to the read one dot pattern. That is, a different audio file can be linked and reproduced for each code value converted from a dot code that is defined by a dot pattern and each reading angle.

For example, if the scopes of reading angles are defined as (i) two kinds '271 degrees to 90 degrees, 91 degrees to 270 degrees,' (ii) four kinds '316 degrees to 45 degrees, 46 degrees to 135 degrees, 136 degrees to 225 degrees, 226 degrees to 315 degrees,' or (iii) eight kinds '33 degrees to 22 degrees, 23 degrees to 67 degrees, 68 degrees to 112 degrees, 113 degrees to 157 degrees, 158 degrees to 202 degrees, 203 degrees to 247 degrees, 248 degrees to 292 degrees, 293 degrees to 337 degrees,' in the case of even though the same dot pattern is read, an audio file A is reproduced when the reading angle is 0 degree, and an audio file B is reproduced if the reading angle is 45 degrees.

In this angle reading mode, linking is performed by the paper controller and can be selected for each angle scope.

In a coordinate reading mode, one audio file can be linked to and reproduced by the code value of the read dot pattern, and another audio file can be linked to and reproduced by the coordinate value thereof.

The paper controller can be used to select priorities, such as, whether to link either a code value or a coordinate value that is defined in the dot pattern, or to link both the code value and coordinate value.

For example, the priority may be from the highest order (i) reproducing an audio file that is linked to the code value, (ii) reproducing an audio file that is linked to the coordinate file, (iii) reproducing an audio file that is linked to both of the code value and coordinate value, and (iv) reproducing an audio file that is linked to either code value or coordinate value. There can be considered that, if both of the code value and coordinate value are linked to audio files, the audio file that is linked to the code value is reproduced.

In a multilingual mode, a plurality of audio files can be linked to the read dot pattern and reproduced. Switching the speaking pen to any mode is performed by touching the paper controller.

For example, a dot pattern is superimposed on a text "Arigato" in Japanese and printed on a printed material, an audio file of "Thank you" is linked to the dot pattern in a state in which the speaking pen is switched to an English mode, and "Xie Xie" is linked to the dot pattern in a state in which the speaking pen is switched to Chinese mode. If the dot pattern is read again, the different audio file, "Thank you" in English mode and "Xie Xie" in Chinese mode, is reproduced.

Depending on the existence of the connection with the information processing device such as a PC (Personal Computer), the speaking pen can realize both functions of a function as an input-output device that depends on the information processing device and a function as an input-output device that can be used alone.

The function as an input-output device that depends on the information processing device is realized when connected with the information processing device without operating any of the above described buttons. The function as the input-output device that depends on the information processing device includes a normal mode and a mouse mode, and these two functions can be switched by operation of the seesaw button (upper side).

In the normal mode, the power is switched ON/OFF by long pressing the push button, and operation other than long pressing of the push button and other buttons are left to functions of applications of the information processing device side. There can be considered a method, as a recommended use method, in which (i) a push button functions as entering, starting reproducing of an activated content, ending reproducing of a reproducing content, pausing, (ii) a seesaw button (upper side) functions as returning the activated item in the menu to the previous one, returning of UNDO function, answering NO, canceling, and (iii) a seesaw button (lower side) functions as forwarding the activated item in the menu to the next one, proceeding of UNDO function, answering Yes, ending.

In the mouse mode, it is preferable to have (i) the push button function operation of a center button (The speaking pen scrolls by skidding on a mouse pad or is inclined in a scrolling direction while pressing the push button, provided, however, the front side of the speaking pen and the upward direction of the monitor screen should match. On the mouse pad, as the orientation of the coordinates of the mouse pad is recognized, there is no need to match the front side of the speaking pen and the upward direction of the monitor screen.), (ii) the seesaw button (upper side) function operation of a right click, and (iii) the seesaw button (lower side) function operation of a left click.

If the cursor is desired to be moved without using the mouse pad, the speaking pen is inclined in a direction in which the cursor is desired to be moved, provided, however, the front side of the speaking pen and the upward direction of the monitor screen should match. On the mouse pad, as the orientation of the coordinates of the mouse pad is recognized, there is no need to match the front side of the speaking pen and the upward direction of the monitor surface.

When the speaking pen is connected with the information processing device while operating the seesaw button (upper side), the driver or GAM (Grid Application Manager), that is described later, can be automatically installed in the information processing device.

When the speaking pen is connected with the information processing device while operating the seesaw button (lower side), the speaking pen is recognized as a USB memory by the information processing device, and link files and audio files can be moved or copied therebetween. Here, if a plurality of files are registered in the speaking pen side, the file that has been registered last becomes the active file.

Next, a basic use method of the above described GAM will be described with reference to FIGS. 42 and 43.

Figure 42:
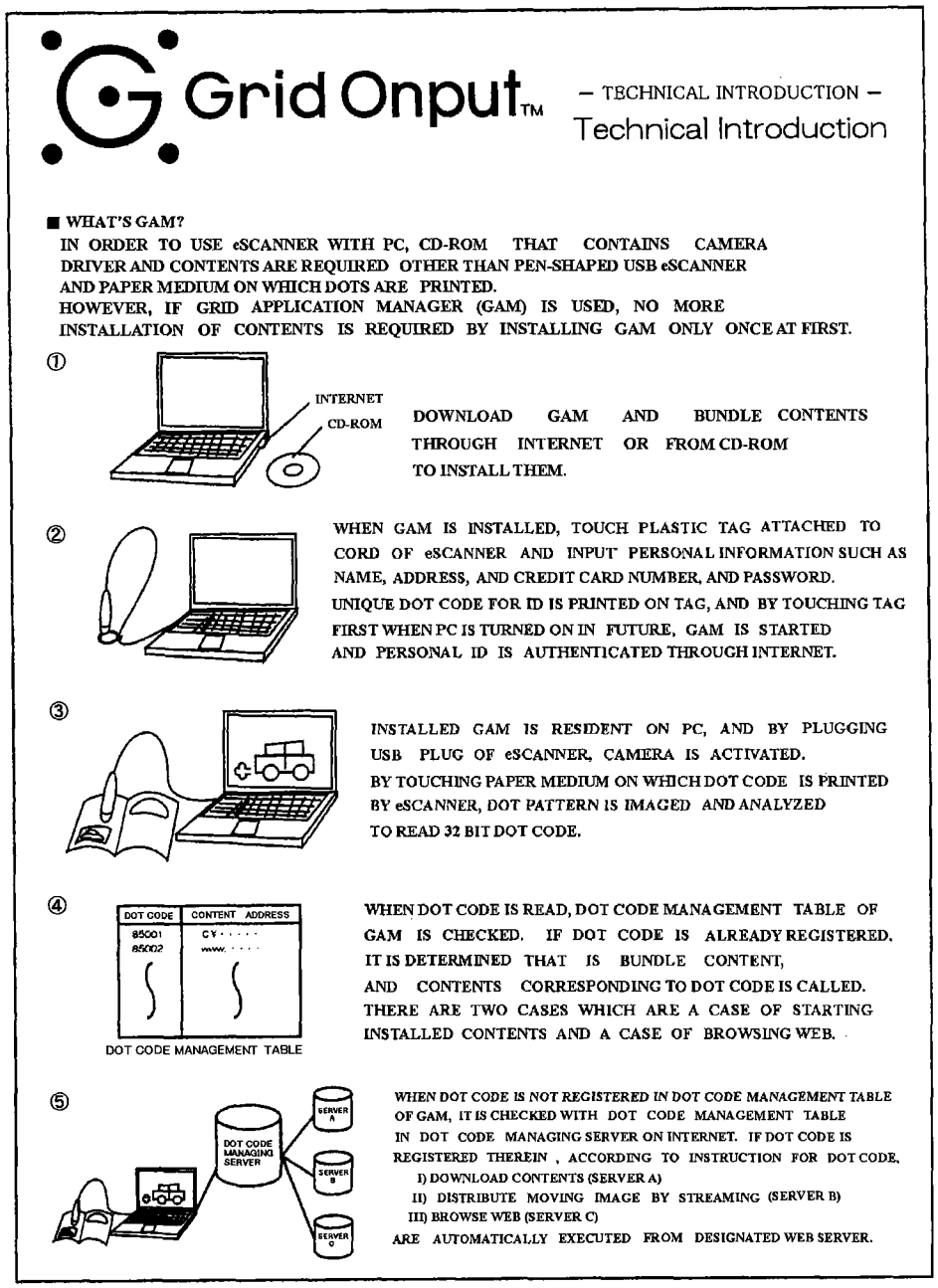
FIG. 42 is a diagram illustrating a basic use method of GAM.

FIGS. 42 and 43 are a handout form for introducing a technique as an embodiment of utilizing the scanner of the invention, an index table, a server management table, and the like.

As shown in this handout (FIGS. 42 and 43), the technique can be realized in Grid Onput (trade name).

FIGS. 42 and 43 shows an example of a case in which the scanner is used with GAM (Grid Application Manager; GAM is a general term of the application programs installed in the hard disc device of the personal computer) and a personal computer (PC) as hardware.

In FIGS. 42 and 43, (1) to (5) and (7) show actual operation examples. That is, as shown in (1) of FIG. 42, a user executes an install program, on the personal computer (PC), that is downloaded from a CD-ROM or downloaded by accessing a distribution server on the Internet, and registers GAM and the driver application on the OS (Operating System) as resident programs. Also, content data including applications, programs, images, motion pictures, and the like that are bundled in GAM is installed in the hard disc device (HD).

Next, the scanner is connected with a USB terminal, which is recognized by the resident driver program.

Next, if the front surface of the tag is read by the scanner, the captured image (a dot pattern) is retrieved by the personal computer (PC) through the USB cable, and deployed in the video memory (VRAM). GAM retrieved in the central processing unit (CPU) decodes the captured image (the dot pattern) to a dot code.

Here, if the scanner scans a tag for the first time, a screen that prompts an input of personal information corresponding to the tag is displayed on the display device (DISP) of the personal computer (PC). According to this screen display, the user registers personal information such as the name, address, and a credit card number. The personal information input in this way is registered in the management server table and used for authentication thereafter.

That is, upon starting up the personal computer (PC) thereafter, by scanning the tag using the scanner, the management server performs authentication and GAM is activated after completing this authentication.

Next, by scanning (reading) a paper medium and a paper controller that are printed with dot patterns using the scanner, the dot pattern is imaged and the captured image data is input to the personal computer and decoded to a dot code (code number) that is made of 32-bit numerical string.

Based on this dot code (a code number), the dot code management table (an index table) of GAM is referred to.

Here, if the dot code (a code number) has been registered in the index table, the dot code is recognized as content data that had been installed in the personal computer (PC), and the content data is read and reproduced. If the content data is a motion picture or an image, a movie and an image are displayed on the display device (DISP) by a corresponding video reproduction application program or image display program.

Also, if an address (URL) on the Internet is registered in a dot code (a code number) in the index table, a browsing program (e.g., Internet Explorer of Microsoft Inc.) is activated and the address is accessed.

By the way, as shown in (5) of FIG. 42, if the dot code (a code number) as the result of reading a dot pattern is not registered in a local (i.e., in the personal computer) dot code management table (an index table), a dot code management server on the Internet is referred to. Here, if the dot code (the code number) is registered in a management server table in the dot code management server, according to the instruction (a command) corresponding to the dot code (the code number), the following automatically starts, from the designated Web server, (i) a content is downloaded, specifically, a content is downloaded from a server A, (ii) streaming delivery of a motion picture, specifically, data delivery from a server B as a streaming delivery server, (ii) browsing Web, specifically, a Web file designated by the address (URL) of a server C is downloaded.

Next, when the content data is downloaded to the personal computer (PC), additional data (data comprising a set of a code number and an address) to the dot code management table (the index table) for activating the content data is also downloaded with the content data, and managed in the dot code management table (the index table) in the personal computer thereafter.

Therefore, when the same code number is read thereafter, without accessing the server A, B, or C on the Internet again, based on the dot code management table (the index table) that includes the newly added data, the content data downloaded in the hard disc device (HD) of the personal computer is reproduced.

Next, with reference to FIG. 44, an information input-output method using a map for inputting information will be described.

In the map of this embodiment, variety of lines that indicate transport information are visually provided including outlines indicating the width of roads, centerlines indicating the roads, texts and text strings, and the centerlines indicating the center of the roads are virtually defined.

Figure 44:
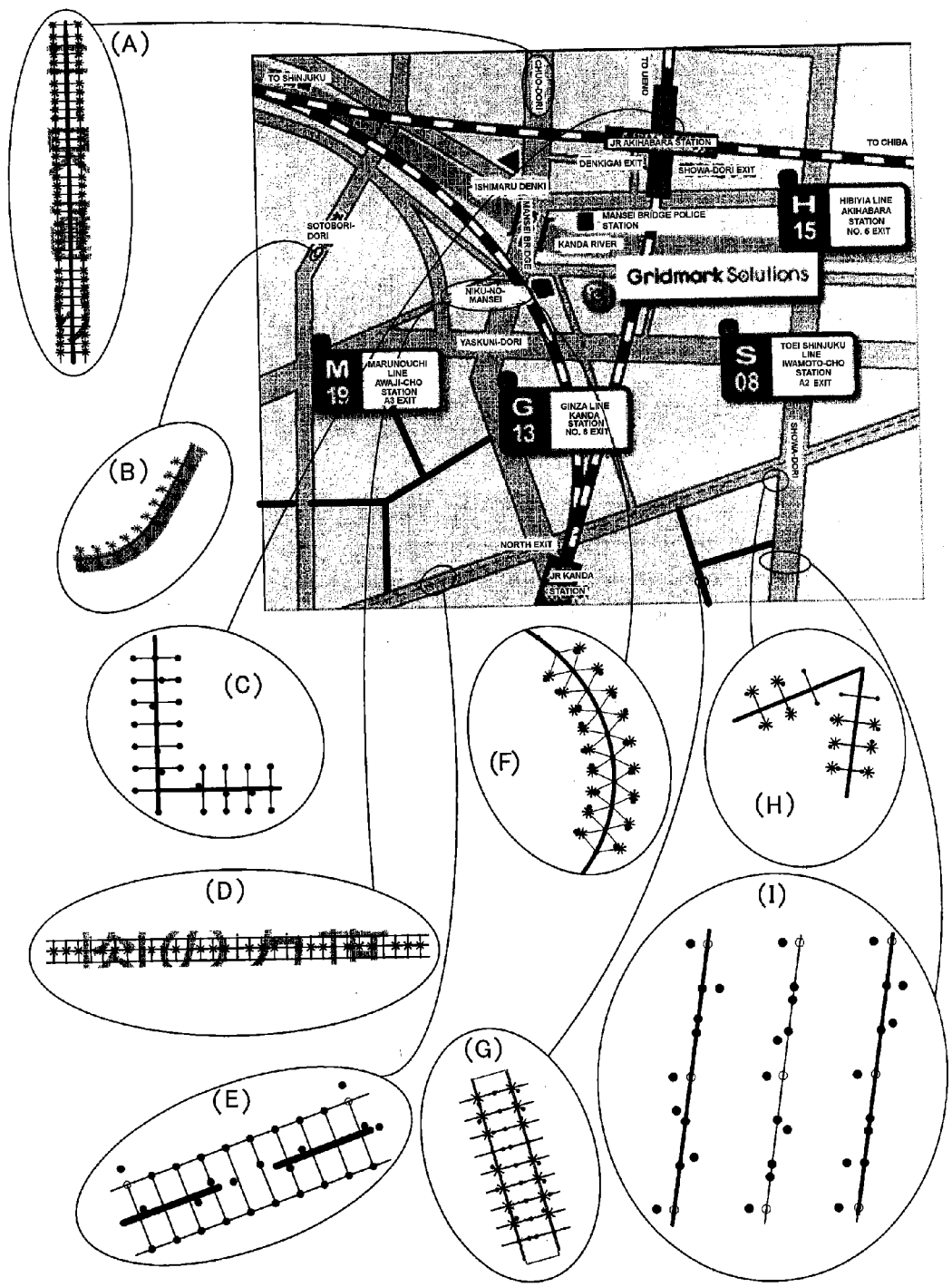
FIG. 44 is a diagram illustrating an information input-output method using a map for inputting information.

Also, a plurality of reference dots are continuously arranged at predetermined intervals on those lines, and the first virtual reference lines that connect the reference dots arranged in lines are defined on variety of lines that indicate transport information including outlines indicating the width of roads, centerlines indicating the roads, texts and text strings, or on virtual centerlines indicating the center of the roads as shown in the illustration of FIG. 44.

It should be noted that, as shown in the illustration of (E) in FIG. 44, instead of arranging reference dots on dotted centerlines that indicate roads, reference dots may be provided linearly along the centerlines to define the first virtual reference lines and the second virtual reference lines and virtual reference points may be defined on the centerlines.

In this way, stream dot patterns can be formed along roads etc., expressed by straight lines, polygonal lines, curved lines, solid lines, variety of dotted lines, thick lines, double lines, and the like, and coordinate information and/or code information can be read from any arbitrary positions using the optical reading unit.

Also, the stream dot patterns can be formed by defining the most appropriate intervals, numbers, sizes of dots based on the length of the roads, etc. indicated by those straight lines, polygonal lines, curved lines, solid lines, variety of dotted lines, thick lines, double lines, and the like.

(A) and (B) in FIG. 44 are diagrams showing examples of forming stream dot patterns on text strings of "Chuo-Dori Street" and "Niku-No-Mansei." (B) in FIG. 44 is a diagram showing a stream dot pattern formed on a text of "ri" in Japanese.

As shown in (D) in FIG. 44, as stream dot patterns are formed on a text string of "Niku-No-Mansei," when a user touches an arbitrary position of the text string, information relating to the text string, such as shop information, parking vacancy information, and service information, can be output.

(C) in FIG. 44 is a diagram showing an example of dot patterns formed along a solid line that indicates JR Akihabara Station comprising a plurality of line segments.

When the solid lines form an angle, it is preferable to discontinue dot patterns around the polygonal line as shown in (C) in FIG. 44.

This can prevent inputting and outputting of erroneous information by reading an information dot located around the end of continuously formed dot patterns, instead of reading an information dot that is intended to be read.

(F) in FIG. 44 is a diagram showing an example of stream dot patterns formed on a solid line that indicates a railway comprising curved lines. (H) in FIG. 44 is a diagram showing an example of stream dot patterns formed on the outline of a road comprising polygonal lines.

Also, (I) in FIG. 44 is a diagram showing stream dot patterns formed respectively on two visual outlines that indicates a road and on a virtual centerline that is defined at the middle of the outlines and indicates the middle of the road.

If the width of the road is narrow, stream dot patterns may be formed only along the outlines to input/output information. On the other hand, if the width of the road is wide, as shown in the illustration of (I) in FIG. 44, stream dot patterns are preferably formed in the middle of the road so that information can be read by touching any of the left and right outlines and the middle. It will be appreciated that, to unify the defined information, the same dot patterns may be used for the two visual outlines that indicate the road and the virtual centerline that indicates the middle of the road defined in the middle of the outlines, or as shown in the illustration of (I) in FIG. 44, different dot patterns may be used to define different information among the left and right sides and middle of the roads.

Also, (G) in FIG. 44 is a diagram showing an example in which stream dot patterns are formed on an actual thick line that indicates a road.

A useful Grid Map (a provisional name of a map using the dot pattern) can be provided by defining the names of the roads in code information that is converted from dot codes defined by the above-described stream dot pattern, and associating related information therewith. Also, detailed map information can be easily obtained by forming stream dot patterns at predetermined positions along texts and text strings that indicate a variety of map information including geographical names, facilities, intersections, and the like, and associating related information to the stream dot patterns. Further, as detailed map information can be obtained, easily viewable map can be provided by simplifying the texts and text strings that indicate map information as much as possible or by deleting the texts or text strings.

Also, icon portions may be printed on the lower side of the map and may be assigned functions of respective icons "Up," "Right," "Down," "Left," "Back" for moving an electronic map that is displayed on a display etc., that is connected with the input-output device, and functions of respective icons "Zoom in," "Standard," "Zoom out" for changing the size of the electronic map.

In addition to information related to the roads, the map portion may be printed with symbols that indicate other sight-seeing facilities, etc. In this area, dot patterns that signify X and Y coordinates corresponding to the positions of the sight-seeing facilities are printed, and the symbols are superimposingly printed with the dot patterns that are coded information etc., of the facilities, in addition to the X and Y coordinates corresponding to the positions of the sight-seeing facilities.

Next, the information input-output method using a drawing for inputting information, according to the invention, will be described with reference to FIG. 45.

In this embodiment, the medium for inputting information is a drawing such as CAD (Computer Aided Design). If the drawing is imaged by the pen type scanner (an optical reading unit), the captured image data is transmitted to the information processing device, the image data is converted to a dot code by the information processing device, a link table that corresponds to coordinate information and/or code information converted from the dot code is referred to, and information corresponding to the image content is displayed on the display device (a monitor) as an output unit. The display device displays electronic data that is installed in the information processing device and a text, a figure, a sound, a motion picture, and the like corresponding thereto. It will be appreciated that, if electronic data, a sound, and the like are not stored in the information processing device, the electronic data, sound, and the like can be downloaded from a server or other information processing device to be displayed on the display.

Figure 45:
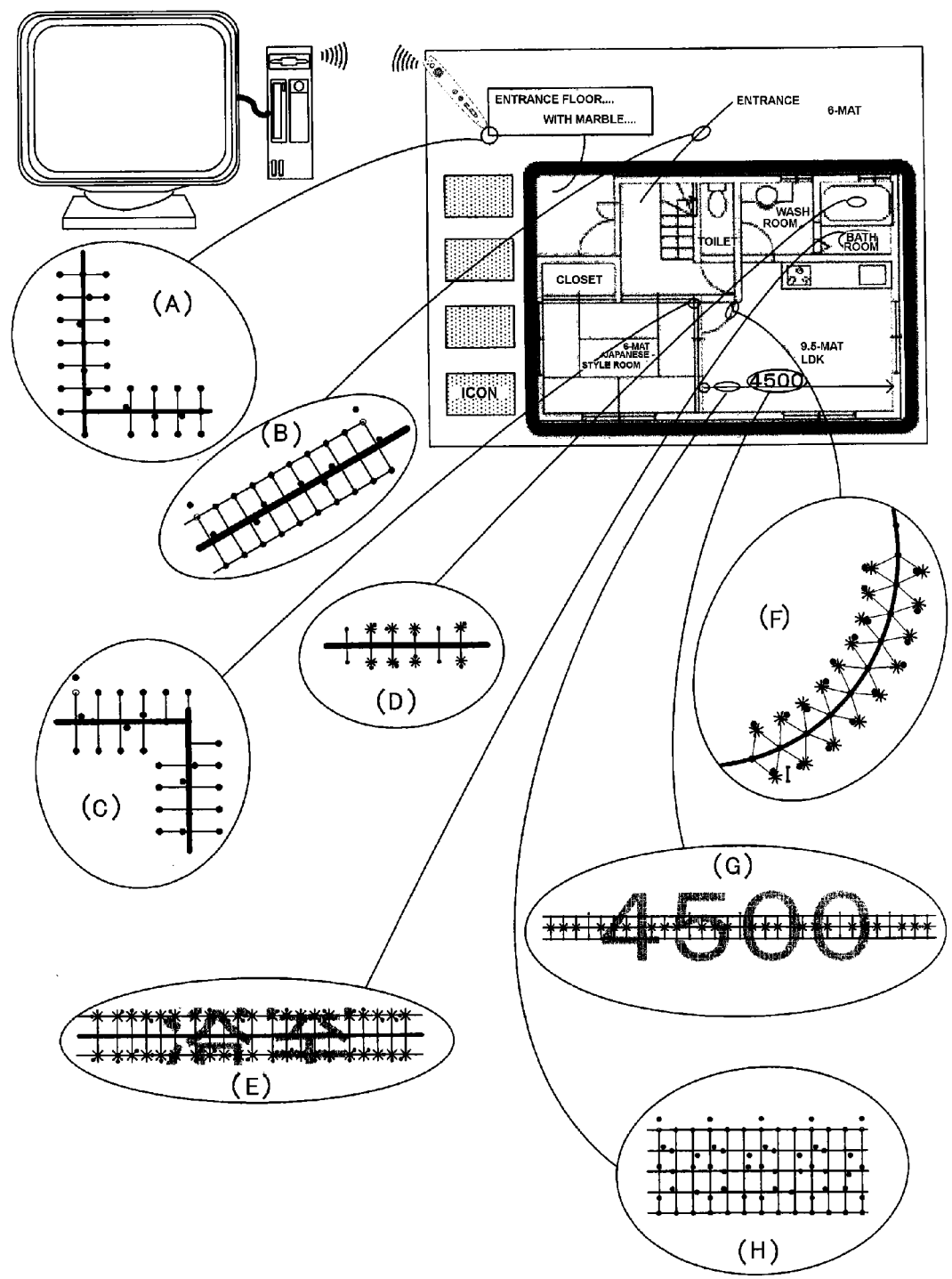
FIG. 45 is a diagram illustrating an information input-output method using a drawing for inputting information.

FIG. 45 shows an example of an information input-output method using a drawing for inputting information, according to the invention. On the drawing, design information of such as machines, architecture, architectural equipments, electric systems, and the like, and icon portions on which icons are printed for instructing operations for performing a variety of displays on the display device are formed at other positions on the medium.

While a dot pattern signifying a code corresponding to the operation instruction is printed on the area of each icon in the icon portion, the dot pattern printed, here, is not limited to the above-described stream dot pattern. A rectangular shaped dot pattern that is conventionally used may also be printed, in which, for example, a plurality of reference dots that define the size and the orientation of the block may be provided within an area of the block where an information dot is arranged, a plurality of virtual reference points that are defined from the reference points may be arranged, and an information dot that is defined by a distance and a direction from the virtual reference point may be arranged.

Stream dot patterns are printed on actual visual lines that constitute a variety of design information including, for example, outlines, indicating lines, lead lines, dimension lines, texts and text strings, and on virtual centerlines that indicate the middle of the object.

In FIG. 45, a stream dot pattern (A) is printed on a line that constitutes a block where descriptions of the entrance floor are described. A stream dot pattern (B) is printed on an indicating line that indicates the entrance. A stream dot pattern (C) is printed on a solid line that indicates the outline of the Japanese room of six-tatami mat size. A stream dot pattern (D) is printed on a virtual centerline that indicates the center of the bathtub. A stream dot pattern (E) is printed on a text string that indicates the bathroom. A stream dot pattern (F) is printed on a solid line that indicates the door. A stream dot pattern (G) is printed on a text "4500" that indicates the length of the dimension line. A stream dot pattern (H) is printed on a dimension line that indicates the horizontal width of the living room of nine-tatami mat size.

It will be appreciated that stream dot patterns may also be formed on texts or text strings of "Living Room 9.5 Tatami Mat Size," "Wash Room," "Closet," and the like described in FIG. 45.

The method for forming a stream dot pattern is, as in the above-described first step, continuously arranging a plurality of reference dots in a line at positions where information is desired to be input or output on the medium surface, and, as the second step, providing a first virtual reference line that connects the reference dots that are arranged in a line, so that the first virtual reference line superimposes on outlines, indicating lines, lead lines, dimensional lines, texts, or text strings, or on virtual centerlines that indicate the middle of the objects.

It will be appreciated that the reference dots may be provided near the variety of lines and only the first virtual reference lines may be defined thereon, or the reference dots and the first virtual reference lines may be provided on both sides of the variety of lines, and second virtual reference lines or fourth virtual references line may be provided on those lines.

The icon portion is printed on the left part of the drawing. Icons of "Up," "Right," "Down," "Left," "Back" for scrolling the electronic data and icons of "Zoom in," "Standard," "Zoom out" for changing the size of the electronic data are printed respectively.

According to the embodiment of the invention, by arranging stream dot patterns along the actual lines that are indicated by straight lines, polygonal lines, curved lines, solid lines, a variety of dotted lines, thick lines, double lines and the like, coordinate information and/or code information can be read from any arbitrary position using the optical reading unit. Further, by defining information for drawing the actual lines in the stream dot patterns along the actual lines (vector information), drawing, displaying, editing, can be done by CAD based on the read coordinate information and/or code information to output the drawing again.

Also, a useful Grid Drawing (a provisional term of a drawing using the dot pattern) can be provided, in which a variety of information can be obtained from one sheet of the drawing, by forming stream dot patterns along the actual lines that indicate objects as design subjects and/or along the texts and text strings indicated on the drawing, and associating the stream dot patterns with a variety of related information including the types of the objects, product numbers, specifications, colors, patterns, material, substance, attaching parts, processing methods, construction techniques, working schedules and the like.

Also, as the stream dot patterns may be formed on virtual centerlines that are defined near a variety of actual lines that the user can see, the association between the visual information captured by the input-output device and information to be output becomes clear without defining X and Y information by printing the dot patterns over the entire drawing.

Next, the following describes a use example of the drawing on which stream dot patterns are formed with reference to FIG. 45.

As shown in FIG. 45, the drawing (a medium) of the invention is used in combination with an electronic device such as a personal computer and a pen type scanner (an imaging unit). That is, the pen type scanner is connected with the computer wiredly through a USB cable or the like or wirelessly through an infrared communication, BLUETOOTH (registered trademark), or the like. The user clicks (images) an arbitrary position, a pillar, a wall, a door, a lead line, and the like on the drawing using the scanner.

The address of CAD data is registered in the icon that is formed by printing near the drawing, and, when the user clicks the icon, electronic data that is registered in the hard disk device of the personal computer or in a server is retrieved and output to be displayed on the display.

It should be noted that, while the scanner is connected with a computer in FIG. 45, the invention is not limited to this, and the scanner may be used in combination with other communication devices such as a mobile telephone, a PDA (Personal Data Assistant), and the like.

The personal computer in this embodiment preferably comprises, centering on the central processing unit (CPU), a main memory (MM), and a hard disk device (HD), a display device (DISP) as an output unit, and a keyboard (KBD) as an input unit that are connected through a bus.

Then, a scanner is connected as an imaging unit through the USB interface (USB I/F).

It should be noted that a printer, a speaker, and the like may also be connected as an output unit in addition to the display device (DISP).

Also, the bus (BUS) is connected to a general network (NW) such as the Internet through a network interface (NW I/F), and electronic drawing data, text information, image information, sound information, motion picture information, programs, and the like can be downloaded from a server which is not drawn.

The hard disk (HD) registers application programs, such as a dot pattern analysis program used in this embodiment with the operation system (OS), and data, such as electronic CAD data, text information, image information, sound information, motion picture information, and a variety of tables.

The central processing unit (CPU) executes and processes the application programs in the hard disk by sequentially retrieving the application programs through the bus (BUS) and the main memory (MM), as well as retrieves data and outputs the data to display on the display device (DISK whereby the functions described in this embodiment are realized.

DESCRIPTION OF NUMERALS AND SIGNS

1 DOT PATTERN
4 REFERENCE DOT
5 PRINTED MATERIAL
6 FIRST VIRTUAL REFERENCE LINE
7 SECOND VIRTUAL REFERENCE LINE
8 SENSOR UNIT
10 STORAGE UNIT
11 MAIN BODY PROCESSING PORTION
12 PROCESSING UNIT
13 INFRARED EMITTING UNIT
15 OUTPUT UNIT
16 COMMUNICATION CARD
17 INPUT UNIT
22 CONNECTION RECOGNITION UNIT
23 SERVER
24 GPS
25 LIQUID CRYSTAL MONITOR
27 CONTROL UNIT
33 OPTICAL READING UNIT
38 CONNECTION UNIT
40A MOUSE
41 MOUSE MAIN BODY
41C OPENING
42 POINTER LIGHT SOURCE
42A READING POINT
43 SWITCH
44 CCD CAMERA
58 EARPHONE
72 INFORMATION DOT
73 REFERENCE POINT DOT
74 VIRTUAL REFERENCE POINT
302 PRINTED MEDIUM
303 DISPLAY
306 LIGHT GUIDE
309 C-MOS SENSOR
311 PEN
599 CAMERA UNIT
812 DOT PATTERN FOR DIVIDING
816 INPUT-OUTPUT DEVICE
820 DOT PATTERN FOR DIVIDING/LINKING
826 FIRST PREDETERMINED DOT PATTERN
828 iTH PREDETERMINED DOT PATTERN
871 DOT PATTERN FOR STARTING/ENDING INPUT
1001 PEN TYPE SCANNER
1002 INFORMATION PROCESSING DEVICE
1003 MEMORY CARD SLOT
1004 MEMORY CARD
1005 MICROPHONE
1006 SOUND GENERATION DEVICE
1007 SPEAKER
1010 BATTERY
1015 CASE
1105 SCANNER PORTION
1111 DIFFUSER
1122 IRLED
1125 NOSE
1126 LENS
1130 BUTTON
1131 LIQUID CRYSTAL DISPLAY UNIT
1201 PERSONAL COMPUTER
1202 PDA
1209 WIRELESS INTERFACE CARD
1291 MICROPHONE
1301 MOUSE TYPE SCANNER
1302 GLASS COMPONENT
1331 PCB

The invention claimed is:

1. An input-output device comprising:
a storage unit that registers:
a link table that associates and registers a dot code which is at least one of a code value and a coordinate value with predetermined information; and
the predetermined information,
an optical reading unit that reads a dot pattern formed on a medium surface;
a processing unit that analyzes the dot pattern from image information of the dot pattern read by the optical reading unit and converts the dot pattern into the dot code;
a connection unit that wiredly or wirelessly connects an information processing device;
a connection recognition unit that recognizes whether or not a connection with the information processing device exists; and
a control unit that controls operation of the optical reading unit, the processing unit, the connection unit, the connection recognition unit or operation based on the predetermined information,
wherein the control unit switches operation based on whether or not the connection recognition unit recognizes a connection between the connection unit and the information processing device,
when the connection recognition unit recognizes a connection between the connection unit and the information processing device, the control unit transmits at least one of the dot code and the predetermined information that is associated and registered with the dot code through the connection unit to the information processing device, and
when the connection recognition unit does not recognize a connection between the connection unit and the information processing device, the control unit causes the input-output device alone to perform the processing corresponding to the predetermined information.

2. The input-output device according to claim 1, wherein when the connection recognition unit recognizes a connection between the connection unit and the information processing device,
the control unit switches operation, based on the predetermined information registered in the link table by being associated with the dot code, among:
transmitting the dot code through the connection unit; and
causing the input-output device alone to perform the processing corresponding to the predetermined information.

3. The input-output device according to claim 1, further comprising
an output unit that outputs by retrieving, from the storage unit, the content data that is associated with the dot code converted by the processing unit after reading the dot pattern by the optical reading unit; and
wherein the predetermined information is content data and/ or an operation instruction, and the processing corresponding to the predetermined information is outputting the content data from the output unit or controlling operation based on the operation instruction.

4. The input-output device according to claim 3, wherein when the connection recognition unit recognizes a connection between the connection unit and the information processing device, the control unit switches operation based on whether or not the storage unit registers content data that is associated and registered with the dot code in the link table, if the content data is registered, outputs the content data from the output unit, and if the content data is not registered, transmits the operation instruction for outputting the dot code converted by the processing unit or for outputting the content data to the information processing device through the connection unit to output the content data registered in a storage unit of the information processing device.

5. The input-output device according to claim 3, wherein the input-output device further comprises a link button, the control unit, when at least one predetermined dot pattern is read by the optical reading unit by operating the link button, associates the dot code converted by the processing unit with the predetermined content data, and registers association between the dot code and the content data to the link table of the storage unit.

6. The input-output device according to claim 3, wherein, when a dot pattern for linking that is formed in a predetermined area on a medium surface is read by the optical reading unit, the control unit, based on an operation instruction associated and registered with the dot code converted by the processing unit, switches operation for associating and registering the dot code corresponding to a predetermined dot pattern with the content data, when the predetermined dot pattern is read after reading the dot pattern for linking, the control unit associates the dot code converted by the processing unit with the predetermined content data, and registers association between the dot code and the content data to the link table of the storage unit.

7. The input-output device according to claim 3, wherein when a dot pattern for starting multi-linking formed in a predetermined area on a medium surface is read by the optical reading unit, the control unit, based on an operation instruction that is associated and registered with the dot code converted by the processing unit, switches operation for associating and registering a dot code corresponding to a predetermined dot pattern with the content data, when the predetermined dot pattern is continuously read twice or more after reading the dot pattern for starting multi-linking, the control unit associates the dot code converted by the processing unit with the predetermined content data, and registers association between the dot code and the content data to the link table of the storage unit, when the dot pattern for ending multi-linking formed in the predetermined area on the medium surface is read by the optical reading unit, the control unit ends operation for associating and registering the dot code with the content data.

8. The input-output device according to claim 3, wherein the input-output device further comprises an input unit for inputting content data, and the control unit starts/ends input of the content data by the input unit by operating an input start/end button further provided on the input-output device or by reading a dot pattern for starting/ending input formed in a predetermined area on a medium surface using the optical reading unit, and registers the content data input by the input unit to the storage unit.

9. The input-output device according to claim 8, wherein when a predetermined dot pattern is read by the optical reading unit while inputting content data by the input unit, the control unit ends input of the content data, registers the content data to a storage unit, associates a dot code converted by the processing unit with the content data, registers association between the dot code and the content data to the link table of the storage unit.

10. The input-output device according to claim 8, wherein when operation of a divide button further provided on the input-output device is performed or a dot pattern for dividing that is formed in a predetermined area on a medium surface is read N times by the optical reading unit while inputting the content data, the control unit partitions and registers content data from when starting input until operation of the divide button or when reading of the dot pattern for dividing that is formed in the predetermined area on the medium surface is performed by the optical reading unit as first content data to the storage unit, subsequently, when operation of the divide button is performed or the dot pattern for dividing that is formed in the predetermined area on the medium surface is read by the optical reading unit at least once while inputting the content data, the control unit partitions and registers content data from when i−1th division is performed until when ith division is performed as ith content data to the storage unit, and, at last, the control unit ends inputting of the content data by the input unit by operation of the input start/end button or by reading the dot pattern for starting/ending input that is formed in the predetermined area on the medium surface by the optical reading unit, and partitions and registers content data from when Nth division is performed until when input of the content data ends as N+1th content data to the storage unit.

11. The input-output device according to claim 10, wherein the control unit registers, in addition to a first file name indicating at least each first to Nth content data that was divided and registered, a second file name indicating content data that was divided and registered continuously next thereto to the storage unit.

12. The input-output device according to claim 10, wherein the control unit associates dot code that are defined by predetermined N+1 dot patterns and converted by the processing unit with the divided first to N+1th content data according to a predetermined method, registers association of the dot code and the divided content data to the link table of the storage unit, and, when the ith dot pattern is read by the optical reading unit, the control unit refers to the link table, retrieves the corresponding ith to N+1th content data from the storage unit according to a predetermined method, and continuously outputs through the output unit.

13. The input-output device according to claim 8, wherein, when a predetermined first dot pattern is read by operation of a divide/link button further provided on the input-output device or by reading a dot pattern for dividing/ linking formed in a predetermined area on a medium surface by the optical reading unit while inputting the content data, the control unit partitions and registers content data from when starting input until operation of the divide/link button or when reading of the dot pattern for dividing/linking that is formed in the predetermined area on the medium surface is performed by the optical reading unit as first content data to the storage unit, associates a dot code defined by the predetermined first dot pattern converted by the processing unit with the registered first content data, and registers association between the dot code and the first content data to the link table of the storage unit, subsequently, when a predetermined ith dot pattern is read by the optical reading unit by operating the divide/link button or by reading the dot pattern for dividing/linking formed in the predetermined area on the medium surface by the optical reading unit at least once while inputting the content data, if a number of operation of the divide/link button is N times (N is a natural number) including time when the first predetermined dot pattern is read, the control unit partitions and registers content data from when i–1th division is performed until when ith division is performed as ith content data to the storage unit, associates an ith dot code converted from the predetermined ith dot pattern by the processing unit with the registered ith content data, and registers association between the ith dot code and the ith content data to the link table of the storage unit, finally, the control unit ends input of the content data by the input unit by operation of the input start/end button or by reading the dot pattern for starting/ending input formed in a predetermined area on the medium surface by the optical reading unit, and, when the ith dot pattern is read once again by the optical reading unit, refers to the link table, retrieves the corresponding ith content data from the storage unit, and outputs through the output unit.

14. The input-output device according to claim 3, wherein the dot code defined in the dot pattern is associated with at least two pieces of content data, the association is further registered in the link table of the storage unit, and the control unit, when the dot pattern is read once again by the optical reading unit, refers to the link table, retrieves at least two pieces of corresponding content data in a predetermined order from the storage unit, and continuously outputs through the output unit.

15. The input-output device according to claim 3, wherein the dot pattern defines, in addition to a first dot code associated with the content data, at least one second to Nth dot code associated with other content data, when the dot pattern is read by the optical reading unit, the control unit refers to the link table, retrieves content data corresponding to the first dot code from the storage unit, and outputs through the output unit, subsequently, refers to the link table, retrieves content data corresponding to the at least one second to Nth dot code in a predetermined order from the storage unit, and continuously outputs through the output unit.

16. The input-output device according to claim 3, wherein the storage unit further registers a dot code linking table that associates and registers first to Nth dot code that are defined by the different dot patterns in a predetermined order, and the control unit, when ith dot pattern is read by the optical reading unit, refers to the dot code linking table using an ith dot code converted by the processing unit, searches the first to Nth dot code, then, refers to the link table in an order from the ith to Nth dot code, retrieves at least two pieces of corresponding content data from the storage unit, and continuously outputs through the output unit.

17. The input-output device according to claim 3, wherein the storage unit further registers, in addition to a first file name that indicates the content data, a second file name that indicates different content data, and, by treating the second file name that indicates the different content data as a first file name so as to link a second file name that indicates further different content data in a chained manner, registers a chained file name, the dot pattern defines a dot code that is associated with content data indicated by the file name, and the control unit, when the dot pattern is read by the optical reading unit, sequentially retrieves content data indicated by the file names registered in a chained manner in the storage unit from the storage unit, and continuously outputs through the output unit.

18. The input-output device according to claim 1, wherein the storage unit further registers a control code that is associated with the dot code in the link table, the control code is a code for controlling an electronic device, the control unit, when a dot pattern that defines the dot code is read by the optical reading unit, refers to the link table, converts a control code corresponding to the dot code into one or a plurality of optical signals or wireless signals, and outputs the one or plurality of optical signals or wireless signals through the output unit.

19. The input-output device according to claim 1, wherein the storage unit further registers one or a plurality of mouse operation codes that are associated with the dot code in the link table, and the control unit, when the control recognition unit recognizes a connection between the connection unit and the information processing device, and the dot pattern that defines the dot code is read by the optical reading unit, refers to the link table, and transmits an input device operation code corresponding to the dot code to the information processing device through the connection unit.

20. The input-output device according to claim 19, wherein, when the connection recognition unit recognizes a connection between the connection unit and the information processing device, the control unit comprises:

a normal mode in which a dot code converted by the processing unit is transmitted to the information processing device through the connection unit; and an input device mode in which an input device operation code corresponding to the dot code is transmitted to the information processing device through the connection unit, which can be switched by operation of a button separately provided on the input-output device or by an operation instruction registered by being associated with a dot code corresponding to a dot pattern formed in a predetermined area on a medium surface.

21. The input-output device according to claim 1, wherein the storage unit further registers a driver and/or content data to be used by connecting the input-output device with the information processing device, and the control unit, when the connection recognition unit recognizes a connection between the connection unit and the information processing device, automatically installs the driver and/or content data to the information processing device by operation of an install button further provided on the input-output device or by reading a dot pattern for installation formed in a predetermined area on a medium surface by the optical reading unit.

22. The input-output device according to claim 1, wherein when the connection recognition unit recognizes a connection between the connection unit and the information processing device, the control unit causes the input-output device to function as a storage medium by operation of a storage medium button further provided on the input-output device or by reading a dot pattern for storage medium formed in a predetermined area on a medium surface by the optical reading unit, and the link table and the predetermined information, which are registered in a storage unit of the input-output device or a storage unit of the information processing device, can be mutually copied, transferred, and deleted between the storage unit of the input-output device and the storage unit of the information processing device.

23. The input-output device according to claim 1, wherein the content data is audio data.

24. The input-output device according to claim 8, wherein the input unit is an audio input unit.

25. The input-output device according to claim 1, wherein the storage unit is detachably mounted on the input-output device.

26. The input-output device according to claim 1, wherein the storage unit comprises an internal memory and an external memory.

27. The input-output device according to claim 1, wherein the input-output device further comprises a text recognition unit that receives handwriting input operation by a user and recognizes a text or a text string including a plurality of character classes, such as hiragana, katakana, kanji, alphameric characters, symbols and the like, as a recognition result of receiving the handwriting input operation, the storage unit further registers a link table that associates and registers a text or a text string that is recognized by the text recognition unit and predetermined information, and the control unit, when receiving the handwriting input operation, recognizes a trajectory of the optical reading unit based on a coordinate value that is converted by the processing unit, recognizes a text or a text string corresponding to the trajectory by the text recognition unit, refers to the link table, and performs a process corresponding to the text or the text string that is recognized by the text recognition unit.

28. The input-output device according to claim 1, wherein the input-output device further comprises a text recognition unit that receives handwriting input operation by a user and recognizes a text or a text string including a plurality of character classes, such as hiragana, katakana, kanji, alphameric characters, symbols and the like, as a recognition result of receiving the handwriting input operation, and the control unit, when receiving the handwriting input operation, recognizes a trajectory of the optical reading unit based on a coordinate value that is converted by the processing unit, recognizes a text or a text string corresponding to the trajectory by the text recognition unit, converts the recognized text or text string into a text code or a text string code, and, when the connection recognition unit recognizes a connection between the connection unit and the information processing device, transmits the text code or text string code through the connection unit to the information processing device.

29. The input-output device according to claim 1, wherein the input-output device receives handwriting input operation by a user, and the control unit, when receiving the handwriting input operation, recognizes a trajectory of the optical reading unit based on a coordinate value that is converted by the processing unit, and, when the connection recognition unit recognizes a connection between the connection unit and the information processing device, transmits the trajectory to the information processing device through the connection unit.

30. An information input and output system including:
the input-output device of claim 28; and
an information processing device that is connected wiredly or wirelessly with the input-output device by the connection unit,
wherein the information processing device comprises:
a storage unit that registers a link table that associates and registers the text code or text string code with predetermined information;
an output unit that outputs the text code or text string code and/or content data;
a control unit that controls operation of the storage unit and the output unit and/or operation based on an operation instruction,
wherein the predetermined information is the content data and/or the operation instruction,
the control unit of the information processing device outputs, from the output unit, the text code or text string code transmitted from the input-output device via the connection unit, and/or
refers to a link table of the information processing device, and outputs content data corresponding to the text code or text string code from the output unit of the information processing device, or controls operation based on the operation instruction.

31. An information input-output system including:
the input-output device of claim 29; and
an information processing device that is connected wiredly or wirelessly with the input-output device by the connection unit,
wherein the information processing device comprises:
a text recognition unit that recognizes a text or a text string including a plurality of character classes, such as hiragana, katakana, kanji, alphameric characters, symbols and the like, as recognition result of receiving the handwriting input operation;
a storage unit that registers a link table that associates and registers the text and/or text string with predetermined information,
an output unit that outputs a text code or a text string code converted from the text or text string and/or a content data, and
a control unit that controls operation of the text recognition unit, the storage unit, and the output unit and/or operation based on an operation instruction,
wherein the predetermined information is the content data and/or the operation instruction,
the control unit of the information processing device recognizes, by the text recognition unit, a text or a text string that corresponds to the trajectory transmitted from the input-output device via the connection unit, converts into a text code or a text string code, and outputs the text code or text string code through the output unit, or refers to the link table and outputs content data corresponding to the text or text string from the output unit of the information processing device, or controls operation based on the operation instruction.

32. The input-output device according to claim 27, wherein the input-output device starts/ends receiving the handwriting input operation by operation of a further provided handwriting input start/end button or by reading a dot pattern for starting/ending handwriting input formed in a predetermined area on a medium surface by the optical reading unit.

33. The input-output device according to claim 27, wherein the input-output device further comprises a determination unit that determines whether the handwriting input operation by a user is received or not, an operation determination code for the determination unit to determine reception of the handwriting input operation is defined in at least part of the code value, and the control unit determines, by the determination unit, reception of the handwriting input operation for each time when a dot pattern is read by the optical reading unit based on the operation determination code.

34. The input-output device according to claim 27, wherein the dot code is the code value and the coordinate value, a writing area identification code for identifying a writing area used upon handwriting input by a user is defined in at least part of the code value, and the control unit identifies a writing area based on the writing area identification code and recognizes a trajectory on the writing area.

35. An information input-output system including:

the input-output device of claim 1; and an information processing device that is wiredly or wirelessly connected with the input-output device by the connection unit, wherein the input-output device receives handwriting input operation by a user, the information processing device comprises:

a determination unit that determines handwriting input operation received by the input-output device;

a text recognition unit that recognizes a text or a text string including a plurality of character classes, such as hiragana, katakana, kanji, alphameric characters, symbols and the like, as a recognition result of receiving the handwriting input operation;

a storage unit that registers a link table that associates and registers the text or text string with the predetermined information;

an output unit that outputs the content data; and a control unit that controls operation of the determination unit, the text recognition unit, the storage unit, and the output unit and/or operation based on the operation instruction, wherein the predetermined information is the content data and/or the operation instruction, a control unit of the input-output device transmits a dot code converted by the processing unit to the information processing device via the connection unit, the determination unit determines reception of handwriting input by a user based on an operation determination code that is defined in at least part of the code value, and the control unit of the information processing device recognizes a trajectory of the optical reading unit based on the coordinate value, recognizes a text or a text string corresponding to the trajectory by the text recognition unit, refers to the link table of the information processing device, and outputs content data corresponding to the text or text string recognized by the text recognition unit through the output unit, and/or controls operation based on the operation instruction.

36. The input-output device according to claim 1 wherein the dot pattern is formed by arranging one or a plurality of stream dot patterns arranged in accordance with the steps of:

disposing a plurality of reference dots continuously in a line in accordance with a predetermined rule;

providing a first virtual reference line that comprises a straight line, a polygonal line and/or a curved line that connects the plurality of reference dots;

providing at least one second virtual reference line that is defined at a predetermined position from the reference dots and/or the first virtual reference line and comprises a straight line and/or a curved line;

providing a plurality of virtual reference points at predetermined positions on the second virtual reference line; and disposing an information dot that defines X and Y coordinate values and/or a code value by a distance and a direction from the virtual reference point, at an end point of a vector expressed with the virtual reference point as a start point.

37. The input-output device according to claim 36, wherein, in the stream dot, a reference dot is further provided, at a predetermined position, that is a reference for defining the second virtual reference line or defining a direction of the dot pattern and a set of X and Y coordinate values and/or a code value.

38. The input-output device according to claim 1, wherein, when the connection recognition unit recognizes a connection between the connection unit and the information processing device, the control unit switches operation based on whether or not the dot code is associated and registered with the predetermined information in the link table, if registered, causes the input-output device alone to perform the processing corresponding to the predetermined information, and, if not registered, transmits the dot code to the information processing device through the connection unit.

39. The input-output device according to claim 1, wherein the predetermined information is an operation instruction, and the processing corresponding to the predetermined information is controlling operation based on the operation instruction.

40. The input-output device of claim 9, wherein when the predetermined dot pattern is read again by the optical reading unit, the control unit refers to the link table, retrieves the corresponding content data from the storage unit, and outputs through the output unit.

41. The input-output device according to claim 28, wherein the input-output device starts/ends receiving the handwriting input operation by operation of a further provided handwriting input start/end button or by reading a dot pattern for starting/ending handwriting input formed in a predetermined area on a medium surface by the optical reading unit.

42. The input-output device according to claim 28, wherein the input-output device further comprises a determination unit that determines whether the handwriting input operation by a user is received or not, an operation determination code for the determination unit to determine reception of the handwriting input operation is defined in at least part of the code value, and the control unit determines, by the determination unit, reception of the handwriting input operation for each time when a dot pattern is read by the optical reading unit based on the operation determination code.

43. The input-output device according to claim 28, wherein the dot code is the code value and the coordinate value, a writing area identification code for identifying a writing area used upon handwriting input by a user is defined in at least part of the code value, and the control unit identifies a writing area based on the writing area identification code and recognizes a trajectory on the writing area.

44. The input-output device according to claim 29, wherein the input-output device starts/ends receiving the handwriting input operation by operation of a further provided handwriting input start/end button or by reading a dot pattern for starting/ending handwriting input formed in a predetermined area on a medium surface by the optical reading unit.

45. The input-output device according to claim 29, wherein the input-output device further comprises a determination unit that determines whether the handwriting input operation by a user is received or not, an operation determination code for the determination unit to determine reception of the handwriting input operation is defined in at least part of the code value, and the control unit determines, by the determination unit, reception of the handwriting input operation for each time when a dot pattern is read by the optical reading unit based on the operation determination code.

46. The input-output device according to claim 29, wherein the dot code is the code value and the coordinate value a writing area identification code for identifying a writing area used upon handwriting input by a user is defined in at least part of the code value, and the control unit identifies a writing area based on the writing area identification code and recognizes a trajectory on the writing area.

* * * * *